(12) United States Patent
Garner

(10) Patent No.: US 8,862,527 B2
(45) Date of Patent: Oct. 14, 2014

(54) NEURAL NETWORKS AND METHOD FOR TRAINING NEURAL NETWORKS

(76) Inventor: Bernadette Garner, San Jose, CA (US)

( * ) Notice: Subject to any disclaimer, the term of this patent is extended or adjusted under 35 U.S.C. 154(b) by 1186 days.

(21) Appl. No.: 12/093,435

(22) PCT Filed: Nov. 15, 2006

(86) PCT No.: PCT/AU2006/001708
§ 371 (c)(1),
(2), (4) Date: May 12, 2008

(87) PCT Pub. No.: WO2007/056803
PCT Pub. Date: Aug. 24, 2007

(65) Prior Publication Data
US 2008/0281767 A1 Nov. 13, 2008

(30) Foreign Application Priority Data
Nov. 15, 2005 (AU) ................................ 2005906330

(51) Int. Cl.
*G06N 3/08* (2006.01)
(52) U.S. Cl.
CPC ....................................... *G06N 3/082* (2013.01)
USPC ........................................................... 706/25
(58) Field of Classification Search
None
See application file for complete search history.

(56) References Cited

U.S. PATENT DOCUMENTS 5,033,006 A 7/1991 Ishizuka et al.
5,129,039 A * 7/1992 Hiraiwa ........................... 706/25
5,664,067 A * 9/1997 Moed et al. ..................... 706/25

FOREIGN PATENT DOCUMENTS

EP 1283496 2/2003
WO 00/58908 A1 10/2000

OTHER PUBLICATIONS

Garner, B. M.; "A New Training Algorithm for Feedforward Neural Networks"; 2002; Proceedings of the International Conference on Artificial Intelligence; pp. 1293-1299.*
Garner, Bernadette; "A novel approach to training neurons with biological plausibility"; 2003; Elsevier Science B.V.; Neurocomputing 52-54; pp. 265-270.*
Xiong, Hui et al.; "Enhancing Data Analysis with Noise Removal"; 2006; IEEE Transactions on Knowledge and Data.*
Kwok, Tin-Yau et al.; "Objective Functions for Training New Hidden Units in Constructive Neural Networks"; 1997; IEEE Transactions on Neural Networks, vol. 8, No. 5; pp. 1131-1148.*
Hernandez, Mauricio A. et al.; "Real-world Data is Dirty: Data Cleansing and The Merge/Purge Problem"; 1998; Data Mining and Knowledge Discovery, 2; pp. 9-37.*
Xiong, Hui et al.; "Enhancing Data Analaysis with Noise Removal"; May 19, 2005; University of Minnesota; pp. 1-35.*

(Continued)

*Primary Examiner* — Stanley K Hill
(74) *Attorney, Agent, or Firm* — The Harris Firm

(57) ABSTRACT

Methods (30) for training an artificial neural network (NN) are disclosed. An example method (30) includes: initializing the NN by selecting an output of the NN to be trained and connecting an output neuron of the NN to input neuron(s) in an input layer of the NN for the selected output; preparing a data set to be learnt by the NN; and, applying the prepared data set to the NN to be learnt by applying an input vector of the prepared data set to the first hidden layer of the NN, or the output layer of the NN if the NN has no hidden layer(s), and determining whether at least one neuron for the selected output in each layer of the NN can learn to produce the associated output for the input vector.

30 Claims, 20 Drawing Sheets

(56) References Cited

OTHER PUBLICATIONS

Patent Cooperation Treaty, "International Search Report," for counterpart PCT Application Serial No. PCT/AU2006/001708 (6 pages).
International Searching Authority, "Written Opinion of the International Searching Authority," for counterpart PCT Application Serial No. PCT/AU2006/001708 mailed on Jan. 17, 2007 (7 pages).
International Preliminary Examining Authority, "Written Opinion of the International Preliminary Examining Authority," for counterpart PCT Application Serial No. PCT/AU2006/001708 mailed on Mar. 22, 2007 (6 pages).
Patent Cooperation Treaty, "International Preliminary Report on Patentability," for counterpart PCT Application Serial No. PCT/AU2006/001708 (8 pages).
Campbell, Colin, "Constructive Learning Techniques for Designing Neural Network Systems," in (ed. CT Leondes) 'Neural Network Systems, Technologies and Applications.' San Diego: Academic Press, 1997.
Aran, Oya et al., "An Incremental Neural Network Construction Algorithm for Training Multilayer Perceptrons", ICANN'03, Istanbul, Jun. 2003.
Azimi-Sadjadi, et al., "Recursive Dynamic Node Creation in Multilayer Neural Networks". In: IEEE Transactions on Neural Networks, vol. 4, No. 2, Mar. 1993.
Neural Networks, StatSoft, Inc. Oct. 19, 2005. Retrieved from the Internet: <URL: http://web.archive.org/web/20051019001928/http://www.statsoft.com/textbook/stneunet.html/ (32 pages).
Yadav, Singh, and Kaira, "Classification Using Single Neuron," in Proceedings of IEEE International Conference on Industrial Informatics, INDIN 2003, Aug. 21-24, 2003. pp. 124-129. Retrieved from the Internet: <URL:http://ieeexplorejeee.org/xpls/abs_all.jsp?arnumber=1300258>.
Fine, T.L., "Book Reviews: Fundamentals of Artificial Neural Networks," in IEEE Transactions on Information Theory, vol. 42, issue 4, Jul. 1996. pp. 1322-1324. Retrieved from the Internet: <URL:http://ieeexplore.ieee.org/xpls/abs_all.jsp?arnumber=508868>.
European Patent Office, Machine Translation of German Patent Publication No. EP 1283496A2 (4 pages).
Patent Cooperation Treaty, "Response to First Written Opinion" for counterpart PCT Application Serial No. PCT/AU2006/001708 submitted on Feb. 28, 2007, (4 pages).
Patent Cooperation Treaty, "Response to Second Written Opinion" for counterpart PCT Serial No. PCT/AU2006/001708 submitted on May 22, 2007, (4 pages).
Intellectual Property Office, First Examination Report, for New Zealand Patent Application No. 567815, issued on Nov. 9, 2009, 2 pages.
Chinese Patent Office, First Office Action, for Chinese Patent Application No. 200680042779.7, issued on Aug. 31, 2010, 4 pages. (Translation Not Provided).
European Patent Office, Supplementary Search Report, for European Patent Application No. 06804525.1, issued on Feb. 25, 2010, 8 pages.
B.M. Garner, "Symbols, Symbolic Processing and Neural Networks", Neural Computing Surveys, vol. 2, No. 1, Jan. 25, 1999, 6 pages.
B.M. Garner, "A training algorithm for Adaptive Feedforward Neural Networks that determines its own topology", Accepted for the 9th Aurstralian Conference on Neural Networks (ACNN '98): Feb. 11-13, 1998, Jan. 1998, 6 pages.
B.M. Garner, "A symbolic solution for adaptive feedforward neural networks found with a new training algorithm", Accepted for the 2nd International Conference on Computational Intelligence and Multimedia Applications (ICCIMA '98): Feb. 9-11, 1998, Jan. 8, 1998, 12 pages.
European Patent Office, Communication pursuant to Article 94(3) EPC, for European Patent Application No. 06804525.1, issued on Aug. 30, 2010, 1 page.
Bernadette Garner, "A sensitivity analysis for symbolically trained multilayer adaptive feedforward neural networks", A Masters Degree Thesis, Nov. 1997, 115 pages.

First Examination issued against corresponding Australian Patent Application No. 2006315074, on Jan. 6, 2012, 3 pages.
Second Office Action issued against corresponding European Patent Application No. 06804525.1 on Apr. 19, 2011, 11 pages.
First Office Action issued against corresponding Israeli Patent Application No. 191366 on Feb. 14, 2011, 11 pages.
English Translation of First Office Action issued against corresponding Israeli Patent Application No. 191366 on Feb. 14, 2012, 4 pages.
First Office Action issued against corresponding Japanese Patent Application No. 2008-539194 on Mar. 27, 2012, (Translation not provided), 4 pages.
Deed of Letters Patent Issued against corresponding New Zealand Patent Application No. 567815 on Dec. 5, 2011, 1 page.
New Zealand Intellectual Property Office, First Examination Report of Application Ser. No. NZ592709, May 13, 2011.
New Zealand Intellectual Property Office, Second Examination Report of Application Ser. No. NZ567815, May 27, 2011.
Japan Patent Office, English Translation of First Office Action of Application Ser. No. JP2008-539194, Mar. 21, 2012.
Bernadette Garner (As Applicant), Submission to European Patent Office in Application Ser. No. EP06804525-1, Apr. 4, 2012.
European Patent Office, Summons to Attend Oral Hearings in Application Ser. No. EP06804525-1, Oct. 4, 2012.
Korean Intellectual Property Office, Office Action in Application Ser. No. KR10-2008-7014170, Dec. 11, 2012.
Xie Y., et al., Analysis of the Effects of Quantization in Multilayer Neural Networks Using a Statistical Model, IEEE Transactions on Neural Networks, Mar. 1992, p. 334-338, vol. 3, No. 2.
Michie D., et al., Machine Learning, Neural and Statistical Classification, Feb. 1994, p. 1-290.
Jagota A., et al., Conectionist Symbol Processing: Dead or Alive?, Neural Computing Surveys 2, 1999, p. 1-40.
Turban E., et al., Advanced Topics and the Future, Expert Systems and Applied Artificial Intelligence, 1992, p. 622-624, Chapter 18, Macmillan.
Ash T., Dynamic Node Creation in Backpropagation Networks, Connection Science: International Conference on Neural Networks, ICS Report 8901, Feb. 1989, p. 1-12, vol. 1, No. 4, Institute of Cognitive Science, University of California, San Diego.
Taha A., et al., Chapter 3 The Simplex Method and Sensitivity Analysis, Operations Research: An Introduction, 8th ed., Aug. 2010, p. 1-2, 90-93, Prentice Hall.
Kohavi Z., et al., Switching and Finite Automata Theory, 3rd ed., 2009, p. 1-617, Cambridge University Press.
Stevenson M., et al., Sensitivity of Feedforward Neural Networks to Weight Errors, IEEE Transactions on Neural Networks, Mar. 1990, vol. 1, No. 1.
Spiegle M., et al., Vector Analysis and an Introduction to Tensor Analysis, Schaums Outline Series, Jun. 1959, p. 1-218, McGraw-Hill.
Carlsson M., et al., SICStus Prolog User's Manual, Dec. 2009, p. Jan. 1349, Swedish Institute of Computer Science, Kista, Sweden.
Andrews R., et al., Survey and Critique of Techniques for Extracting Rules from Trained Artificial Neural Networks, Knowledge-Based Systems, Dec. 1995, p. 373-389, vol. 8, No. 6.
Roy A., et al., An Algorithm to generate Radical Basis Function(RBF)-Like Nets for Classification Problems, Neural Networks, 1995, p. 179-201, vol. 8, No. 2, Elsevier Science Ltd.
Fahlman S., An Empirical Study of Learning Speed in Back-Propagation Networks, Sep. 1988, p. 1-17, Carnegie Mellon University Computer Science Department.
Oh S-H., et al., Sensitivity Analysis of Single Hidden-Layer Neural Networks with Threshold Functions, IEEE Transactions on Neural Networks, Jul. 1995, p. 1005-1007, vol. 6, No. 4.
Holzbaur C.,et al., OFAI clp (Q,R) Manual, ed. 1.3.3, Dec. 1995, p. 1-24, Austrian Research Institute for Artificial Intelligence, Vienna, Austria.
Obermayer K., et al., Neural Pattern Formation via a Competitive Hebbian Mechanism, Behavioral Brain Research, 1995, p. 161-167, vol. 66, Elsevier.
Freeman J., et al., Neural Networks Algorithms, Applications, and Programming Techniques, 1991 p. 1-401, Addison-Wesley Publishing Company.

(56) References Cited

OTHER PUBLICATIONS

Nejad A.F., et al., Bidirectional Neural Networks Reduce Generalisation Error, IEEE Conference on Neural Networks, 1995, p. 543-550, IEEE.
Klimasauskas C., A Technique for Explaining a Neural Network's Decision-Making Process, Neural Nets Tell Why Dr. Dobb's Journal, Apr. 1991, p. 16-24, vol. 16, No. 4.
Ramamoorthy C.V., et al., Knowledge and Data Engineering, IEEE Transactions on Knowledge and Data Engineering, Mar. 1989, p. 9-16, vol. 1, No. 1, IEEE.
Teng C., et al., Automated Learning for Reducing the Configuration of a Feedforward Neural Network, IEEE Transactions on Neural Networks, Sep. 1996, p. 1072-1085, vol. 7, No. 5, IEEE.
Vaughn L., Derivation of the Multilayer Perceptron Weight Constraints for Direct Network Interpretation and Knowledge Discovery, Neural Networks, 1999, p. 1259-1271, vol. 12, No. 9, Elsevier.
Hsin-Chia F., et al., Divide-and-Conquer Learning and Modular Perceptron Networks, IEEE Transactions on Neural Networks, Mar. 2001, p. 250-263, vol. 12, No. 2, IEEE.
Hassoun, M.H., Fundamentals of Artificial Neural Networks, 1995, p. 1-8, 36-48, 185-190, MIT Press, Massachusetts.
Elman J., Finding Structure in Time, Cognitive Science, Mar. 1990, p. 179-211, vol. 14, No. 2, Cognitive Science Society.
Fahlman S., et al., The Cascade-Correlation Learning Architecture, Aug. 1991, p. 1-13, Carnegie Mellon University Computer Science Department.
Alahakoon L., Data Mining with Structure Adapting Neural Networks, Ph.D. Thesis, Mar. 2000, p. 1-286, Monash University School of Computer Science and Software Engineering.
Werbos P., Backpropagation Through Time: What It Does and How to Do It, Proceedings of the IEEE, Oct. 1990, p. 1550-1560, vol. 78, No. 10, IEEE.
Beale R., et al., Neural Computing: an Introduction, 1992, p. 1-13, 39-61, 63-104, Bristol Institute of Physics, United Kingdom.
Arbel A., Exploring Interior-Point Linear Programming, 1993, p. 7-17, MIT Press, USA.
Ampazis N., et al., Levenberg-Marquardt Algorithm with Adaptive Momentum for the Efficient Training of Feedforward Networks, 2000, p. 126-131, IEEE.
Song Q., Robust Training Algorithm for a Perceptron Neuron, 1997, p. 1907-1912, IEEE.
Oh S-H., Generalization of the Cross-Entropy Error Function to Improve the Error Backpropagation Algorithm, 1997, p. 1856-1861, IEEE.
Hamey L., Analysis of the Error Surface of the XOR Network with Two Hidden Nodes, Seventh Australian Conf. Artificial Neural Networks, 1996, p. 179-183.
Lawrence S., et al., Overfitting and Neural Networks: Conjugate Gradient and Backpropagation, International Joint COnf. On Neural Networks, 2000, p. 114-119, IEEE.
Oliver J., et al., Introduction to Minimum Encoding Inference, Open University Tech Report 4-94, 1994, p. 1-24, Open University, United Kingdom.
Kohavi R., et al., Book Review Empirical Methods for Artificial Intelligence, International Journal of Neural Systems, 1995, p. 1-4.
Damminda L., Data Mining Structure Adapting Neural Networks, Ph.D. Thesis, Mar. 2000, p. 1-304, Monash University School of Computer Science and Software Engineering.
Hertz J., et al., Introduction to the Theory of Neural Computation, 1991, p. 1-10, Addison Wesley, Redwood City.
Kohavi Z., Switching and Finite Automata Theory, 1978, 2nd ed., Chap. 5, Magraw Hill.

\* cited by examiner

NEURAL NETWORKS AND METHOD FOR TRAINING NEURAL NETWORKS

FIELD OF THE INVENTION

The present invention relates generally to artificial neural networks and their operation, and relates particularly, though not exclusively, to an improved neural network training method and/or system that allows neurons to be added into a network as required during the training process.

BACKGROUND OF THE INVENTION

With the proliferation and size of data sets being generated over the pest decade or so, there has been much interest in developing tools that can be used to find relationships within data sets, where the data sets are not understood explicitly. It is desirable that the tools with which data can be explored are able to learn data sets consistently every time in a fixed amount of time to allow salient information about the relationships between the input and output to be easily determined.

One tool used to explore data is the feed-forward neural network. Feed-forward neural networks have attracted much attention over the past 40 years or so as they have been used to perform many diverse and difficult tasks with data sets. These include pattern classification, and function approximation, because they have the ability to 'generalise'. Hence neural networks (hereinafter simply referred to as a "NNs" or "NN") can be used in applications like non-linear system modeling and image compression and reconstruction.

NNs are of interest to many fields, these include science, commerce, medicine and industry as they can be given data sets where it is not known what relationships are inherent within the data and the NN can learn how to classify the data successfully.

In some cases the data may not have been subject to any prior classification, and in these circumstances it is common to use unsupervised training, such as self-organising maps, to classify the data. In other cases the data may have been previously broken into data samples that have been classified, and in these circumstances it is common to train a NN to be able to classify the additional unclassified data. In the latter case, a supervised learning algorithm is traditionally used. Classified input data examples have an associated output and during training, the NN learns to reproduce the desired output associated with the input vector. Feed-forward NNs are traditionally trained using supervised training methods.

Artificial NNs are composed of a number of neurons, which are sometimes called units or nodes. They take their inspiration from biological neurons. Neurons are connected together to form networks. Each neuron has input which may be from many other neurons. The neuron produces output in response to the input by either firing or not. The neuron's output may then provide input to many other neurons. This is the basic structure of a feed-forward NN.

Typically neurons form layers. In feed-forward NNs there are three types of layers, input, hidden and output layers. The first layer is the input layer, which has one or more neurons in it. There is also an output layer that may have one or more neurons as well. A NN may also have one or more hidden layers. All neurons in the input layer present their output to the next layer, which may be the output layer or the first hidden layer, if there are more than one hidden layers. If there is only one hidden layer, the neurons in the hidden layer will then in turn report their output to the output layer. If there are more than one hidden layers, then, those neurons will feed their output into the input of the neurons in the next hidden layer and so on, until the last hidden layer's neurons feed their output into the input of the output layer.

Other network architectures are possible, where the NN is specifically designed to learn a particular data set. This is seen especially in NNs learning sequences of input vectors, which may have feedback loops in the connections. These NNs am called recurrent feed-forward NNs and commonly the output of the NN can often be feedback into the input of the NN.

The first biological neuron model was developed by McCulloch and Pitt in 1943. This model became known as the McCulloch-Pitt neuron. The McCulloch Pitt neuron model or linear threshold gate (hereinafter simply referred to as "LTG" or "LTGs") is defined as having a number of input connections and each connection has a weight associated with it. The input is defined mathematically as a vector, $x_i \in \{0,1\}^n$, where n is a positive integer indicating the number of input into the LTG and i is the input vector. Since there are n input connections, the connection weights can be defined mathematically as a vector, w, where $w \in R^n$. Each input vector into the LTG is multiplied by its associated weight, this can be expressed mathematically as $x_i \cdot w$ and the result is compared to the LTGs threshold value, T, where $T \in R$. The output will be 1 if $x_i \cdot w \geq T$, otherwise $x_i \cdot w < T$ and outputs 0. In other words, the LTG uses the step, or Heaviside, function, as the activation function of the neuron.

The LTG can be defined mathematically using the following definitions:

$$w=\{w_1, w_2, \ldots w_n\} \text{ and } x_i=\{x_1, x_2, \ldots x_n\}$$

Let $net_n = x_i \cdot w$ and $x_i \in \{0,1\}^n$ and $w \in R^n$, then the behaviour of the LTG can be summarised in equation 1.1, as follows:

$$x_i \cdot w < T \to 0 \text{ and } x_i \cdot w \geq T \to 1 \quad (1.1)$$

Thus the output of the LTG, O, is binary $\{0,1\}$. The LTG will output 1 if the LTG is activated and 0 if it is not.

The LTG was modified with an additional bias input permanently set to 1 in 1962. The bias input absorbs the threshold value, which is then set to 0. The modified LTG model was renamed the perceptron. The perceptron model allowed threshold, T, to be removed from the $x_i \cdot w$, hence the equations become $x_i \cdot w < T \equiv x_i \cdot w - T < 0$ and $x_i \cdot w \geq T \equiv x_i \cdot w - T \geq 0$. Now, the threshold value can become another input into the neuron, with weight, $w_0$, and fixing the input into the neuron to 1 ensures that it is always present, so $T = 1 \cdot w_0$. The weight, $w_0$ is called the bias weight. So the equations become:

$$x_i \cdot w - w_0 < 0 \text{ and } x_i \cdot w - w_0 \geq 0.$$

In 1960, Rosenblatt focused attention on finding numeric values for weights using the perceptron model. From then until now, finding single numerical values for each of the weights in a neuron has been the established method of training neurons and NNs. There have been no attempts to directly find symbolic relationships between the weights and the thresholds, although it is recognised that the relationships formed by the neurons can be expressed using propositional logic. The rules within the data set that the NN learnt during training are encoded as numeric values, which may render them incompressible. There have been attempts to find the rules learnt by the NN from the numbers found by the weights and the thresholds. All these methods are an additional process after training which do not allow the rules to be read directly from the NN.

In 1962, Rosenblatt proved the convergence of the perceptron learning algorithm, which would iteratively find numbers that satisfy linearly separable data sets. The neuron learns by adapting the connection weights so that it will produce a desired output given specific input. Rosenblatt's training rule, as seen in equation 1.2, is that the weights, $w_j$, where $1 \leq j \leq n$ and n is the number of inputs into the perceptron, are modified based on the input, $x_i$, t is a time step, and a positive gain rate, $\eta$, where $0 \leq \eta \leq 1$. The Rosenblatt's rule works for binary output. If the output of the perceptron for a particular input is correct, then do nothing.

$$w_j(t+1) = w_j(t) \quad (1.2)$$

Otherwise, if the output is 0 and should be 1, then:

$$w_j(t+1) = w_j(t) + \eta x_i(t) \quad (1.3)$$

Or if the output is 1 and should be 0 then:

$$w_j(t+1) = w_j(t) - \eta x_i(t) \quad (1.4)$$

The idea of iteratively adjusting weights has now become the established method of training feed-forward NNs.

In 1969, it was found that Rosenblatt's learning algorithm would not work for more complex data sets. Minsky and Papert demonstrated that a single layer Perceptron could not solve the famous exclusive or (XOR) problem. The reason why it would not work is because iteration was used to find a single point in the weight-space.

Not all Boolean functions can be learnt by a single LTG. There are $2^n$ combinations of the n input variables, and when combined with the possible output, it means there exists $2^{2^n}$ unique Boolean functions (otherwise known as switching functions). Of the $2^{2^n}$ functions, only some of them can be represented by a single n-input LTG. Those Boolean functions where the input space is linearly separable can be represented by a single LTG, however additional LTGs are required to learn Boolean functions which are not linearly separable. XOR is an example of a Boolean function that is not linearly separable and hence cannot be learnt by a single LTG.

Using additional layers of LTGs would allow problems that are not linearly separable to be learnt by the NN, however, there was no training rule available that would allow the multiple layers of LTGs to be trained at the time.

As a result, the McCulloch-Pitt model of the neuron was abandoned, as there was no iterative method to find numerical values for the weights and thresholds that would allow multiple layers of LTGs to be trained. This was until backpropagation was developed.

In 1974, Werbos came up with the idea of error backpropagation (or "backpropagation"). Then later in 1986, Rumelhart and Hinton and also Williams in 1986, and in 1985 Parker, also came up with the same algorithm and it allowed the multi-layer NN model to be trained to find numerical values for the weights iteratively. This allowed the XOR problem to be solved as well as many other problems that the single layer perceptron could not solve. The McCulloch-Pitt's neuron model was again modified to use the sigmoid function instead of the step function as its activation function. The mathematical definition of the sigmoid function is given in equation 1.5.

$$O = 1/(1 + e^{-kx \cdot w}) \quad (1.5)$$

The perceptron commonly uses the sigmoid function as the perceptron's activation function. The term k controls the spread of the curve, and the sigmoid function approximates the step-function, as $k \to \infty$, the output, $O \to$ the step function. However, it is possible to use other activation functions such as $\tan h(kx \cdot w)$. This activation function is used if it is required that the NN can output negative numbers, as the range of the function goes from $-1$ to $+1$.

Backpropagation is based on Rosenblatt's learning algorithm, which is described by equations 1.2 to 1.4. It is a supervised learning algorithm and works by applying an input vector to the input layer of the NN. The input layer distributes this input to the first hidden layer. The output of each neuron in a layer is calculated according to equation 1.5, which becomes the input into the subsequent layer. This process of calculating the output (or activation) of a layer of neurons which becomes the input to the subsequent layer is repeated until the output of the NN can be calculated. There will be some error between the actual output and the desired output and the weights are modified according to the amount of error. The error in the output is fed back, or propagated back, through the NN, by adjusting the connection weights from the connections into the output layer to the connections on the hidden layers in turn, in order to reduce the error in the NN. The amount the weights are adjusted is directly proportional to the amount of error in the units.

The backpropagation delta rule is given in equation 1.6, where i is the layer, j is the perceptron from which the connection originates in layer i-1, and k is the perceptron to which the connection goes in layer i.

$$w_{ijk}^{new} = w_{ijk}^{old} + \Delta w_{ijk} \quad (1.6)$$

Where $$\Delta w_{ijk} = \eta \delta_{ijk} o_{ijk}$$

$\Delta w_{ijk}$ is the amount the weights are modified in an attempt to reduce the error in the numeric values on the weights in the NN. The amount that the weights are modified is based on the output of the neuron, $o_{ijk}$, gain term, $\eta$, which is also called the learning rate and the error in the output, $\delta_{ijk}$. The error in the NN is the difference between the actual output and the desired output of the NN.

When the NN is fully trained, it is said to be in a global minimum of the error function as the error in the NN is minimal. Since there are potentially many local minima in the error, the error can be thought of as a surface, which implies it can be a function. However the error function is not known for any NN. The error function can only be calculated empirically as it is based on the difference between the desired output and the actual output for all the input vectors applied to the NN. The term, $\delta_{ijk}$ is the first derivative (the derivative is based on the difference in the error in the output) of the error function. It is the error function that is to be minimised as backpropagation tries to minimise the error in the NN. By taking the gradient (first derivative) it is possible to determine how to change the weights to minimise the error in the NN. This is called gradient-descent.

Backpropagation is required to work on a fixed-sized NN, as there are no allowances in the algorithm for adding or removing neurons from the NN. When training a NN to learn a data set, a guess is made at how many layers and how many neurons in each layer are required to learn the data. After training there may be attempts to improve the trained NNs performance by pruning out neurons that are not required. But during training the number of neurons must remain static.

The traditional backpropagation algorithm can be summarised as follows: (a) Initialisation: Define the number of layers and the number of neurons for each layer in the NN and initialise the NNs weights to random values; (b) Apply an input vector from the training set to the NN. Calculate the output, using equation 1.5, for each neuron in the first layer after the input layer, and use this output as input to the next layer. Repeat this process for each layer of the NN until the output is calculated; (c) Modify the weights according to how much error is present in the NN using equation 1.6; and (d) Repeat steps b) and c) until the NN is deemed trained. The NN is considered trained when the error falls below some arbitrary value for some number of input vectors in the training set.

While there are many benefits associated with training NNs to learn data sets using backpropagation, backpropagation has its limitations. With backpropagation the NN can take a long time to learn a data set or worse still it may never learn a data set at all. In some cases it may not be possible to determine why a NN could not learn the data set and/or it is not possible to distinguish during training whether the NN will ever learn the data set or if its just taking a long time to learn.

With backpropagation the NN may be too small to learn the data. Traditionally, a NN designer must guess how many neurons to use in each hidden layer and also the number of hidden layers that are required to learn the data set. If the NN is too large then it may not be able to generalise properly. Hence, neurons am sometimes pruned from the NN in an attempt to improve this problem. The NN may get stuck in a local minimum of the error space. When the NN has learnt the data set, the NN is in a global minimum of the error space. As the shape of the error function is not known, it has areas of high error and low error. Since backpropagation only moves to minimise the error by examining the first derivative of the error function, it only examines the local region. The aim of training neurons in the hidden layer is to learn different features in the data set. However, when backpropagation propagates error back through the NN, all the weights are modified by some amount, thus possibly reducing each neurons unique association with particular features in the data set. This is possible since a neuron cannot determine whether other neurons in the same layer are learning the same features. This can cause the weights that have learnt a specific data feature to forget the feature.

The main problem with training NNs with backpropagation is that it is not possible to distinguish which of the above reasons is the cause of the NN not learning a data set. It may be learning the data set but its just slow, or it may never learn the data set because the NN is too small, or it may be stuck in a local minimum. A further and significant problem with backpropagation is that when the NN has learnt the data set, what the NN has learnt is incomprehensibly encoded in the weights and thresholds as numbers.

Due to the difficulties of training NNs with backpropagation, much research has gone into developing alternative algorithms to train feed-forward NNs.

Many algorithms have been developed as an alternative to backpropagation for training feed-forward NNs. There are two classes of alternative algorithms, which are: (1) Algorithms that require a fixed number of neurons or resources in the NN; and (2) Those that allow neurons to be allocated dynamically to the NN.

Most of these algorithms rely on having a fixed-sized NN and as a result suffer the same problems backpropagation experiences. One known method uses genetic algorithms to find the values of the weights. Genetic algorithms may avoid the local minima problem but take an indefinite amount of time to train, and also may not train properly because the NN is too small. Another alternative method is to use Radial Basis Functions (RBF) which uses only a single layer to learn the NN, but requires many more input vectors available to it to learn a data set than backpropagation requires. As a result of the problems associated with fixed-sized NNs, it is useful to allow the NN to grow as required to learn the data set.

Feed-forward NN training algorithms, which dynamically add neurons have been introduced as a solution to the problems of pre-defined structure as it gives the flexibility to add neurons only when necessary to ensure features in the data can be learnt. Hence a neuron is added when other neurons cannot learn particular features in the data set and as a result the trained NN can be used more effectively for ascertaining what rules have been learnt by the NN during training. A pre-defined network structure limits a NNs ability to learn data. NNs learn by adapting their weights, which correspond to synaptic weights in biological NNs. As discussed earlier, feed-forward NNs take their inspiration from biological NNs. However, biological NNs dynamically create connections to neurons as required.

There have been two approaches to structurally dynamic algorithms and these are: (1) Those that remove neurons from the NN. Two such approaches to removing neurons from a NN are: (i) Those that work during training such as Rumelhart's Weight Decay, which adds a penalty to the error minimization process; and (ii) The more common approach, those that remove neurons after training, such as Optimal Brain Surgeon, which calculates the impact on global error after removing a weight from the NN; and (2) Those that add neurons to the NN such as Cascade-Correlation Networks (hereinafter "CCN"), Dynamic Node Creation (hereinafter "DNC"), Meiosis and the class of hyperspherical classifiers such as, for example, Restricted Coulomb Energy Classifiers (hereinafter "RCEC") and Polynomial-Time-Trained Hyperspherical Classifiers (hereinafter "PTTHCs").

Though there have been many attempts to provide NN training algorithms that work by dynamically allocating neurons into a NN during training, it is considered that none are ideal for classifying data efficiently and/or accurately in a wide variety of circumstances.

The principle reason why NNs are of interest to science and/or industry is because of their ability to find relationships within data, that allows the data to be classified, and then be able to successfully classify input vectors, or patterns, that the NN was not exposed to during training. This powerful property is often referred to as the NNs' ability to 'generalise'. The input vectors that the NN was not exposed to during training are commonly referred to as unseen patterns or unseen input vectors. For NNs to be able to generalise they require training.

During training a NN learns salient features in the data set it is trained with and can then 'predict' the output of unseen input vectors. What the NN can classify depends on what the NN has been trained with.

It is the NNs ability to generalise that allows the NN to deal with noise in the data.

To ensure good generalisation, it is thought that many more training input vectors must be available than the number of weights there are to be trained in the NN.

A NN is deemed trained when it can successfully classify a high ratio of input vectors it has learnt and also the test set. However there may only be a limited number of classified data patterns available to train and test the NN with, so it must be considered how to divide the data set. There are a number of approaches of how to divide a data set to determine how well a NN has been trained so the NN can be tested.

The general method of determining whether a NN is trained is by calculating how much error there is in each input vector when using NNs trained with backpropagation. A skilled person will appreciate the approaches that have previously been used to ascertaining the error in a NN, and as such a detailed discussion of same will not be provided herein.

The attributes that can be used as grounds of comparison between training algorithms will, however, now be discussed.

There are a number of factors that may be considered when comparing learning algorithms so there is an objective measure of the performance.

Typically, in comparisons, the following four attributes of learning algorithms are considered: (1) Accuracy: This is the reliability of the rules learnt during training; (2) Speed: This is a measure of how long it takes for an input vector to be classified; (3) Time to learn: This is a measure of how long it takes to learn an input vector, and (4) Comprehensibility: This is the ability to be able to interpret the rules learnt so the rules can be applied in alternative methods. This strategy is difficult to quantify.

Two of these attributes will be further examined, that of the learning algorithm's time required to learn a data set and the comprehensibility of what has been learnt by the NN.

As discussed earlier, training a NN to learn a data set with backpropagation may require a long time in train as it is possible that the NN may never learn a data set. It has been said that the time it takes to train a fixed-size NN may be exponential. For this reason, how long it takes to train a NN has become a standard of comparison between alternative training algorithms. An ideal training algorithm would require minimal exposure to training input vectors. The minimum possible exposure to training input vectors in the optimal situation would be to expose the NN to each input vector only once to be fully trained. Such a training algorithm can be referred to as a single pass training algorithm.

Of the four attributes commonly used as a basis for comparison between algorithms that train feed-forward NNs, comprehensibility is the least quantifiable, especially for feed-forward NNs trained as numerical values, as the rules learnt by NNs during training are incomprehensibly encoded as numerical values. One method of being able to extract the rules learnt during training is by performing a sensitivity analysis. A sensitivity analysis can be referred to as a measure of robustness against errors.

Rule extraction is of interest as it gives users' confidence in the results produced by the system, and this is especially important when the NN is used in critical problem domains such as medical surgery, air traffic control and monitoring of nuclear power plants, or when theories are deduced from collected data by training NNs, such as in the case of astronomical data.

The rules that are desirable to guarantee comprehensibility are in the form of propositional logic rules relating the input together.

Sensitivity analyses are often performed on NNs, as it is one way of finding out what information has been stored within the NN. This makes performing a sensitivity analysis invaluable to NNs as the rules are encoded often incomprehensibly as numeric values as it is often desirable to find out what rules have been learnt by the NN.

There are two approaches that can be taken with performing a sensitivity analysis on a NN, these are: (1) The effect of modifying the weights; and (2) The effect of applying noisy input to the NN.

If the input space is well known, then it is possible to generate as many data points as necessary, and then finding the output of the NN for input vectors chosen by the following three methods: (1) Finding the output for every point in the data space. If the NN is trained with binary data, the data set is necessarily finite; (2) Randomly choosing data points from the input space; or (3) Selecting every $n^{th}$ data point (where n>1) in the input space. This allows an even distribution over the input space.

Data points can also be selected from regions of the input space where it is not known what the desired NN response will be. In this case, it will show how the NN will respond when given unknown data.

Now that it has been examined how to explore the input-space, the weight-space of neurons in a NN will now be examined.

A system has a number of components that are required to perform as specified which in turn allows the system to perform as required. When each component is performing as specified then the components are said to be in their optimal range.

A sensitivity analysis is an examination of the effect of departing from optimal values or ranges for the components in the system. In this case, the optimal ranges are for the weights in a trained NN. The upper and lower limits are established to find the range (or interval) the weights can vary over without changing the behaviour, in this case, of the NN. To perform a sensitivity analysis, each component in the system is tested in turn while all the other components remain static. The component being tested will be set at all possible values to determine how the system performs. During this process upper and/or lower limits are ascertained for the component which allow the system to behave optimally and it can be observed how the system behaves when the component moves out of these ranges. This process is called ranging. The upper and lower limits can be expressed as constraints It is considered that known sensitivity analyses do not generate propositional logic rules that relate the input variables together that will make what a NN has learnt comprehensible.

The objective of a sensitivity analysis is to be able to determine the shape of the volume as this defines the behaviour precisely of a component. However, it has not been possible to find the surfaces of the volume that cause the neuron to activate due to limitations of known NN training methods. The only way it has been possible to examine the surfaces is by determining the range of each of the weights with statistical methods. Knowledge of the actual surfaces of the volume would be ideal since they define the relationships that exist between the weights and from this the ranges of the weights can be determined if desired.

It is highly desirable to be able to determine what a feed-forward NN has learnt during training and as a result much research has been done on trying to ascertain what relationships exist within data and have been learnt by a NN. This has been called comprehensibility and is one attribute that contributes to determining how good a training algorithm is. The methods currently used to extract rules from the NN are performed after training has been completed.

The types of relationships that are desirable that are required to be found are given as prepositional logic. These requirements can be summarised by the following: (a) One that will define all the numeric solutions that satisfy the training conditions, and thus allows a sensitivity analysis to be performed on the NN easily; and (b) One that will allow the rules learnt by the NN during training to classify the data set to be easily read from the NN.

Of the known training algorithms mentioned above relating to various dynamic algorithms, the only one that comes close to allowing rules to be read directly from the NN is the hyperspherical classifiers, which form OR relationships between the regions. Hence regions cannot be combined with AND, as the regions in the input space belong to a certain category or not. If they do not belong in the region then a sphere is added to suppress the activation of neurons that should not, hence OR is adequate to express the input space.

The radius that defines the hyperspheres tends to 0 as the input space becomes complex and ultimately a hypersphere is added for each input vector. Although the regions defined by the neurons in the hidden layers approximate regions in the input space, they do not define it, except in the worst case where there are as many hyperspheres as data points. PTTHCs attempt to improve the coverage of the input space, and thus improve generalisation performance at the expense of computational complexity, and hence, is much slower.

CCN, Meiosis and DNC all train the weights as numbers and hence it is not easy to determine what relationships have been found within the data during training.

All of these algorithms dynamically allocate neurons to the NN with varying degrees of performance success with regard to generalisation. Some algorithms are better at some data sets than others, and all except the hyperspherical classifiers lose boundary condition information of the weight-space, and hence are not very useful for rule extraction.

Some algorithms learn some data sets quicker than others, such as the Meiosis algorithm which is based on annealing which tends to be slower even than backpropagation.

CCN and DNC are reported to have fast training times for specific data sets, but these are not single pass algorithms, as both rely on iteration to reduce the amount of error in the system before neurons are added into the NN.

As yet there has been no NN training algorithm that learns in a single pass that also adds neurons to the NN as required and allows rules to be read directly from the NN.

It is therefore an object of the present invention to provide a NN training method that is both relational and dynamic, in the sense that neurons can be allocated into a NN as required to learn a data set.

A further object of the present invention is to provide a NN training method that can learn a data set in a single pass.

Yet a further object of the present invention is to provide a NN training method that allows rules to be read directly from a NN.

SUMMARY OF THE INVENTION

According to one aspect of the present invention there is provided method for training an artificial NN, said method including the steps of: (i) initialising the NN by selecting an output of the NN to be trained and connecting an output neuron of the NN to input neuron(s) in an input layer of the NN for the selected output; (ii) preparing a data set to be learnt by the NN; and, (iii) applying the prepared data set to the NN to be learnt by applying an input vector of the prepared data set to the first hidden layer of the NN, or the output layer of the NN if the NN has no hidden layer(s), and determining whether at least one neuron for the selected output in each layer of the NN can learn to produce the associated output for the input vector, wherein: if at least one neuron for the selected output in each layer of the NN can learn to produce the associated output for the input vector, and if there are more input vectors of the prepared data set to learn, repeat step (iii) for the next input vector, else repeat steps (i) to (iii) for the next output of the NN if there are more outputs to be trained; if no neuron in a hidden layer for the selected output of the NN can learn to produce the associated output for the input vector, a new neuron is added to that layer to learn the associated output which could not be learnt by any other neurons in that layer for the selected output, and if there are more input vectors of the data set to learn, repeat step (iii) for the next input vector, else repeat steps (i) to (iii) for the next output of the NN if there are more outputs to be trained; if the output neuron for the selected output of the NN cannot learn to produce the associated output for the input vector, that output neuron becomes a neuron of a hidden layer of the NN, a new neuron is added to this hidden layer to learn the associated output which could not be learnt by the output neuron, and a new output neuron is added to the NN for the selected output, and if there are more input vectors of the data set to learn, repeat step (iii) for the next input vector, else repeat steps (i) to (iii) for the next output of the NN if there are more outputs to be trained.

According to a further aspect of the present invention there is provided method for training an artificial NN, said method including the steps of: (i) preparing a data set to be learnt by the NN; (ii) initialising the NN by selecting an output of the NN to be trained and connecting an output neuron of the NN to input neuron(s) in an input layer of the NN for the selected output; and, (iii) applying the prepared data set to the NN to be learnt by applying an input vector of the prepared data set to the first hidden layer of the NN, or the output layer of the NN if the NN has no hidden layer(s), and determining whether at least one neuron for the selected output in each layer of the NN can learn to produce the associated output for the input vector, wherein: if at least one neuron for the selected output in each layer of the NN can learn to produce the associated output for the input vector, and if there are more input vectors of the prepared data set to learn, repeat step (iii) for the next input vector, else repeat steps (ii) & (iii) for the next output of the NN if there are more outputs to be trained; if no neuron in a hidden layer for the selected output of the NN can learn to produce the associated output for the input vector, a new neuron is added to that layer to learn the associated output which could not be learnt by any other neurons in that layer, and if there are more input vectors of the data set to learn, repeat step (iii) for the next input vector, else repeat steps (ii) & (iii) for the next output of the NN if there are more outputs to be trained; if the output neuron for the selected output of the NN cannot learn to produce the associated output for the input vector, that output neuron becomes a neuron of a hidden layer of the NN, a new neuron is added to this hidden layer to learn the associated output which could not be learnt by the output neuron, and a new output neuron is added to the NN for the selected output, and if there are more input vectors of the data set to learn, repeat step (iii) for the next input vector, else repeat steps (ii) & (iii) for the next output of the NN if there are more outputs to be trained.

In a practical preferred embodiment of the methods for training a NN defined above, the neurons of the NN are Linear Threshold Gates (LTGs).

Preferably in said step (iii) of applying the prepared data set to the NN to be learnt, to determine whether an LTG can learn to produce the associated output for the input vector is to determine whether a relationship between weights and a threshold of the LTG has a solution given what the LTG has previously learnt. In a practical preferred embodiment, said relationship is a constraint, wherein the input vector and the LTG's weight vector form a relationship with the LTG's threshold based on the selected output of the NN. In this practical preferred embodiment, to learn a constraint is to be able to add the constraint to a constraints set of an LTG. To be able to add a constraint to a constraint set of an LTG there must be a solution between all the constraints.

Preferably the step of initialising the NN further includes the step of clearing the constraints set of the output LTG so that the constraints set of the output LTG is empty.

Preferably the step of preparing the data set to be learnt by the NN includes at least the following steps, each of which can be performed in any order converting the data set into a predefined data format before the data set is presented to the NN for training; determining whether there are any inconsistencies in the data set before the data set is presented to the NN for training; sorting the data set before the data set is presented to the NN for training; and, determining whether the 0 input vector is available in the data set before the data set is presented to the NN for training, and if the 0 input vector is available the data set, the data set is ordered so that the 0 input vector is presented to the NN to be trained first. In a practical preferred embodiment of said step of converting the data set into a predefined data format before the data set is presented to the NN for training, said predefined data format is binary or floating-point data format. Preferably said step of determining whether there are any inconsistencies in the data set before the data set is presented to the NN includes determining whether there are two or more identical input vectors which produce different output. In a practical preferred embodiment of said step of determining whether there are any inconsistencies in the data set, if two or more identical input vectors are determined to produce a different output, only one of the input vectors is used. Preferably said step of sorting the data set before the data set is presented to the NN for training includes: sorting the input vectors of the data set into two sets, separating those that output 1 from those that produce 0 for that output, and selecting one of the two sets to be trained first; sorting the data with a Self Organising Map (SOM); sorting the data using any other suitable method. It is also preferred that a single list for each input layer is created from the sorted data before the data is presented to the NN for training.

In a practical preferred embodiment, when a new LTG is added to a layer to learn a constraint that could not be learnt by any other LTG is that layer in accordance with step (iii): the new LTG is connected to all LTGs in the next layer which contribute to the selected output of the NN, and the constraints set of the LTGs in the next layer which receive input from the new LTG are updated to accept input from the new LTG; if the layer with the new LTG is not the first layer of the NN, the new LTG is connected to and receives input from all LTGs in a preceding layer which contribute to the selected output of the NN; and, the constraints set of the new LTG is updated to include a copy of the modified constraints set of the previous last LTG in that layer and the constraint which could not be learnt by any other LTG in that layer.

In a practical preferred embodiment, when a new output LTG is added to the NN in accordance with step (iii): the new output LTG is connected to and receives input from the LTGs in the hidden layer; if the hidden layer is not the first layer of the NN, the new LTG in the hidden layer is connected to and receives input from all LTGs in a preceding layer which contribute to the selected output of the NN; the constraints set of the new LTG added to the hidden layer is updated to include a copy of the modified constraints set of the previous output LTG in that layer and the constraint which could not be learnt by the previous output LTG; and, the new output LTG combines its inputs in a predefined logical relationship according to what could not be learnt by the previous output LTG. Preferably when a new output LTG is added to the NN in accordance with step (iii), the predefined logical relationship formed between the inputs into this new output LTG is logical OR, logical AND, or any other suitable logical relationship. In this practical preferred embodiment, logical OR is used if the input vector that could not be learnt by the previous output LTG produces an output 1, and logical AND is used if the input vector that could not be learnt by the previous output LTG produces an output 0.

According to yet a further aspect of the present invention there is provided a method for adding a new neuron into a layer of a NN during training, the new neuron being added to the NN when no other neuron in that layer for the selected output can learn a relationship associated with an input vector of a data set being learnt, said method including the steps of: updating the new neuron with a copy of all the modified data from a previous last neuron that contributes to the selected output of the NN in that layer and the relationship which could not be learnt by any other neuron in that layer; and, updating the output neuron(s) to accept input from the new neuron.

In a practical preferred embodiment, the neurons of the NN are LTGs.

Preferably said relationship is a relationship between weights and a threshold of an LTG. In a practical preferred embodiment, said relationship is a constraint, wherein the input vector of the data set and an LTG's weight vector form a relationship with the LTG's threshold based on the output of the NN.

According to yet a further aspect of the present invention there is provided a method for converting a data set, other than a binary format data set, into a binary format data set to be learnt by a NN, said method including the steps of (i) separately determining the number of bits for the representation of each attribute of the data set in binary; (ii) calculating the range of the attribute of the data set using the equation: range=(maximum−minimum)+1; and, encoding the range of the attribute of the data set into binary using the number of bits determined in step (i).

Preferably the method of converting a data set into a binary format data set is used in accordance with the data preparation step (step (ii) or step (i)) of the methods for training a NN defined above.

According to yet a further aspect of the present invention there is provided a method of sorting a data set to be trained by a NN, said method including the steps of: sorting the input vectors of the data set into two groups, separating those that output 1 from those that output 0, and, selecting one of the two groups to be learnt first by the NN.

According to yet a further aspect of the present invention there is provided a method for determining whether an input vector is known or unknown by a neuron, said method including the steps of: constructing a constraint and its complement from the input vector, alternately adding the constraint and its complement to the constraints set of the neuron; testing the constraints set to determine if them is a solution in either case, wherein: if there is no solution for the constraint or its complement, it is determined that the input vector is known by the neuron; and wherein if there is a solution when both the constraint and its complement are alternately added to the constraints set; it is determined that the input vector is not known by the neuron.

Preferably said constraints set is a constraints set of a neuron of a NN which is constructed from LTG neurons. It is also preferred that said method is used to determine the output of unseen input vectors of a NN trained in accordance with the methods for training a NN defined above. In a practical preferred embodiment, wherein said method is used to determine unseen input vectors of a LTG of a NN trained in accordance with the methods for training a NN of the present invention, the default output for an unseen input vector is 1 or 0, depending on the data set.

According to yet a further aspect of the present invention there is provided a method for determining the minimum activation volume (MAV) of a constraints set, said method including the steps of: (i) removing each constraint from the constraints set one at a time while leaving the remaining constraints in the constraints set unchanged; (ii) adding the complement of the removed constraint to the constraints set;

(iii) testing the new constraints set to see if there is a solution, wherein: if there is a solution, the original constraint removed from the constraints set is added to a constraints set defining the MAV, the complement of the constraint that was added to the constraints set is removed and the original constraint is returned to the constraints set, and if there is more constraints in the constraints set to test, repeat steps (i) to (iii), else the MAV is the set of constraints contained within the constraints set defining the MAV; if there is no solution, the complement of the constraint that was added to the constraints set is removed and the original constraint is returned to the constraints set, and if there are more constraints in the constraints set to test, repeat steps (i) to (iii), else the MAV is the set of constraints contained within the constraints set defining the MAV.

Preferably said constraints set is a constraints set of a neuron of a NN which is constructed from LTG neurons. In a practical preferred embodiment, said method is used to determine the MAV for each LTG in a NN trained in accordance with the methods for training a NN defined above.

ADVANTAGES OF THE INVENTION

The present invention in one aspect provides a novel approach to training neurons. This approach defines relationships between input connections into a neuron and an output, thus it makes the task of rule extraction simple. The method of training neurons according to the invention allows generalisation and data learnt to be recalled as with neurons trained with traditional methods. In addition, it uses a simple test to determine whether a neuron can or cannot learn an input vector. This test forms a natural criterion for adding one or more neurons into a NN to learn a feature in a data set. Neurons can either be allocated to hidden layers, or a new output layer can be added according to the complexity of a data set.

Hence the NN training method of the present invention can be termed a Dynamical Relational (hereinafter "DR") training method.

Since a NN trained according to the DR training method of the invention can be tested to determine whether an input vector can be learnt and a neuron can be dynamically allocated to the NN only as required, data can be learnt as it is presented to the NN in a single pass.

Traditional approaches to training feed-forward NNs require a fixed-size NN, and it is necessary to guess how many hidden layers of neurons and how many neurons in each hidden layer are needed for the NN to learn a data set. Guessing the size of a NN is a significant problem because if it is too small it will not be able to learn the data set, and if it is too large it may degrade the NNs performance. The best solution to the problem of guessing the size of the NN is to use a training method that will dynamically allocate neurons into the NN as required, and only if required. Hence, dynamic allocation of neurons into a NN overcomes the problems associated with fixed-sized NNs. According to the DR training method of the present invention, a neuron can be allocated into a NN only if the NN cannot learn an input vector. When a new neuron is allocated to the NN it forms a prepositional logic relationship to the neurons already in the NN, hence the training method of the invention is relational.

Each input vector is learnt as it is presented to a NN. This means that the DR training method of the invention can learn data in a single pass.

The method of training neurons according to the invention allows information about a data set to be learnt and which will also identify input vectors that cause neurons to be added to a NN as well as indicating which input vectors are essential to the classification of the data set. The method of the invention also provides for sharp boundaries in the input space, while still providing most, if not all, of the benefits of other algorithms that train feed-forward NNs.

The present invention in a further aspect provides a method for converting data into an appropriate format before the data is presented to a NN for training. There are many advantages associated with the conversion of data before training. One advantage is that data conversion minimises the number of inputs presented to a NN for training, while still accurately encoding the data. In the case of the DR training method of the present invention, the minimisation of the number of inputs presented to a NN translates into faster training time, given that each time an input vector is learnt by the NN, the constraints must be tested to determine whether it can be learnt by the NN.

The present invention in yet a further aspect provides a method of sorting data before the data is presented to a NN for training. Pre-sorting data before training improves the efficiency of the classification of data. Pre-sorting is preferably used in situations where a trained NN performs poorly. Pre-sorting is highly recommended whenever a data set to be learnt by a NN is sufficiently complex to require the addition of neurons into the NN.

The method of converting data into an appropriate format before training, and the method of sorting data before the data is presented to a NN for training are both considered useful for all NN training methods. These aspects of the invention are therefore independent and not limited to the DR training method of the present invention.

During testing, a significant benefit is that the data learnt by a NN can be recalled with 100% accuracy. The present invention in yet a further aspect provides a method which can be used to determine whether a NN knows what the output for unseen input vectors is and can clearly identify which input vectors are unknown. Thus the NN can indicate when it does not know a feature of the data set and can identify which input vectors it requires additional training on.

The objective of performing a sensitivity analysis on a trained NN has been to try to determine the range of values that weights can take in an attempt to determine what the neuron and thus NN have learnt.

A significant benefit of the DR training method of the present invention is that the boundaries of the region in the weight-space can be determined after a NN is trained. In yet a further aspect, the present invention takes this further by providing a method that allows the actual surfaces of the weight-space to be found, rather than simply the range of values each weight can take. From this, what rules a neuron and hence a NN has learnt during training can be determined.

The DR training method of the invention preserves most, if not all, of the existing advantages and usefulness of traditional feed forward NNs training methods, yet removes the major limitation of requiring the NN to be a fixed-size and it also does not suffer from the local minima problem as it learns in a single pass. The DR training method of the invention along with all other aspects of the invention will be extremely useful for all applications that use feed-forward NNs. The aim of artificial NNs is to simulate biological learning, however known systems have failed to achieve this goal. The DR training method of the invention is believed to provide a plausible biological learning strategy that is relevant to neuroscience, neurobiology, biological modelling of neurons, and possibly cell biology.

The rules extraction method, that is the method of determining the actual surface of the weight-space, and the method of determining whether input vectors are known or unknown of the present invention are not limited to NNs. These methods may also be useful for other fields which use systems of constraints, such as Constraint-Satisfaction Problems (hereinafter "CSP" or "CSPs"), optimisation or operational research type problems, or for the analysis of strings of data, as for example DNA. These aspects of the present invention are therefore independent and not limited to the DR training method of the present invention.

Finally, as the DR training method of the invention allows rules to be extracted from a NN, more confidence in what the NN has learnt and the output produced by a NN will result. Hence the methods of the present invention will improve confidence in systems that use feed-forward NNs.

BRIEF DESCRIPTION OF THE DRAWINGS

In order that the invention may be more clearly understood and put into practical effect there shall now be described in detail preferred constructions of a method and/or system for training a NN in accordance with the invention. The ensuing description is given by way of non-limitative example only and is with reference to the accompanying drawings, wherein.

DETAILED DESCRIPTION OF THE PREFERRED EMBODIMENTS

Detailed preferred constructions of the present invention will now be described with reference to the accompanying drawings. By way of a preferred embodiment only, the LTG neuron model will be used for the following discussion. It should be understood that many other neuron models are available and hence could be used to construct NNs in accordance with the DR training method or algorithm of the present invention. The invention is therefore not limited to the specific neuron model shown in the accompanying drawings. Any reference to "LTG" or "LTGs" throughout the ensuing description should therefore be construed as simply meaning "any suitable neuron model".

The DR training algorithm of the present invention, along with other aspects of the invention as will now be described can be implemented using any suitable computer software and/or hardware. The present invention is therefore not limited to any particular practical implementation. For the purpose of evaluating the performance of the DR training algorithm of the invention and to conduct experiments to prove that the algorithm and other aspects of the invention worked as expected, the algorithm was programmed as code and implemented using software on a computer.

Figure 1:
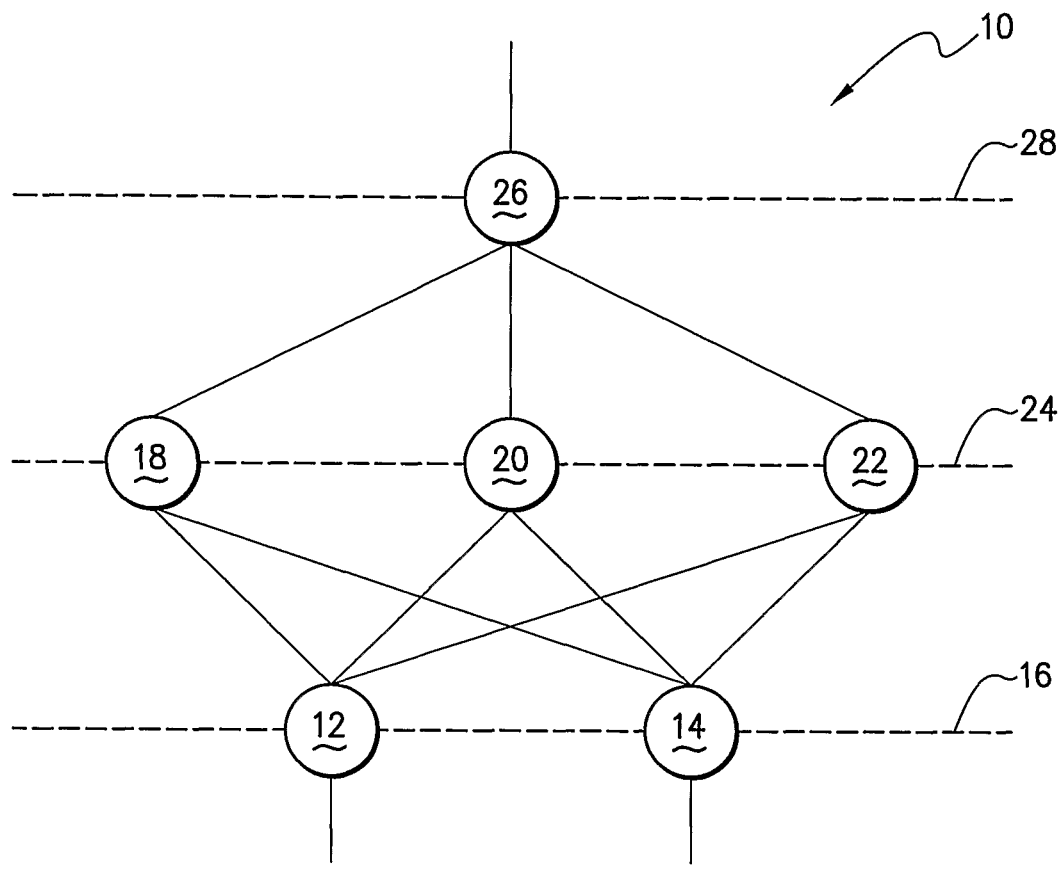
FIG. 1 schematically shows an example of the basic structure of a 2-input, 1-output feed-forward NN.

A NN is a combination of neurons that are connected together in varying configurations to form a network. The basic structure of a 2-input feed-forward NN 10 is shown schematically in FIG. 1 by way of an example. NN 10 includes two input neurons 12,14 disposed in a first or input layer 16. Each input neuron 12,14 presents its output to three neurons 18,20,22 disposed in a hidden layer 24. Hidden layer neurons 18,20,22 in turn each present their output to a single neuron 26 disposed in an output layer 28.

NNs are used to determine relationships within data sets. Before a NN is trained, the available data is divided into two sets, one that will be used for training, and the other that will be used for testing. The training set is used to train a NN. The test data set is reserved until after a NN is trained. The test data set is presented to a NN after training to determine whether the NN has learnt the data sufficiently well or whether the NN is missing some aspect of the data. Throughout the ensuing description, any reference to "training a NN" or "training" is intended to refer to the training of a NN with a training data set.

Most NN training algorithms find single numeric values that attempt to satisfy the training conditions, and learn by iteratively modifying weight values based on the error between the desired output of the NN and the actual output.

The DR training algorithm of the present invention takes a different approach to training neurons. This training algorithm is not based on finding single values for the weights that satisfy the training conditions. Instead, the DR training algorithm of the invention finds all the values of the weights that will satisfy the training conditions. To do this the input vectors are preferably converted into a constraint that relates the input weights to the threshold. Each neuron has a set of input weights, which form relationships with each other and the threshold that satisfy the training conditions. Adding a constraint to the neuron places another constraint on the region in the weight-space that will cause the neuron to activate.

Although the invention is described with reference to the input vectors being converted into constraints, it should be understood that the present invention is not just limited to the use of constraints. The constraints only represent relationships between the input weights and the threshold. The same relationships could be expressed in other ways, as for example electronically or magnetically, and as such the present invention is not limited to the specific example provided.

Using this method of training neurons allows a NN to be formed by dynamically adding neurons into a NN. This method provides a precise criterion for adding neurons to the NN, and neurons can be added in the standard feed-forward topology, which was described earlier.

This method of training neurons allows a data set to be learnt in a single pass. Also, since the constraints define relationships between the weights and the thresholds of each neuron and when neurons are added to the NN they are added according to prepositional logic, it becomes a simple matter to extract the rules learnt during training.

For a NN to learn a data set with the DR training algorithm of the present invention, a sequence of processes is preferably engaged upon. Each data set is unique and has a number of outputs and this depends on the data set. This sequence can be briefly summarised as follows: (1) Initialisation of the NN; (2) Preparing the data to be learnt by the NN; (3) Applying the data to be learnt by the NN; and (4) Allocating neurons to the NN as required.

As already discussed, the neuron being used in accordance with the preferred embodiment of the invention is the LTG or McCulloch-Pitt neuron, which has been modified to include a constraint set. The initialisation phase (1) for LTGs entails connecting the input neurons to the output neurons, and selecting an output to be trained first.

The data preparation phase (2) preferably involves a number of steps for preparing the data to be learnt by a NN, of which the following are noted: (i) If the data presented to a NN is not in an appropriate format suitable for training, then the data set is preferably converted to an appropriate format before being presented to the NN. In accordance with a preferred embodiment of the present invention, the appropriate data format is binary data. Hence, a data set to be trained with the DR training method of the present invention is converted to binary before being presented to a NN. Any suitable method of digitising data can be used. In accordance with a further aspect of the present invention, a discussion of suitable methods of digitising data is provided later in this description where the results of experiments are discussed. Although binary data is presented as being a preferred data format for training, it should be understood that the DR training algorithm of the invention could also work with other data formats, as for example, floating-point data, and as such the invention should not be construed as limited to the specific example given; and (ii) Since the DR training algorithm of the invention is a single pass algorithm, some attention is preferably given to the order of presentation of input vectors, as this can effect what rules the NN learns and how well it performs. Although worth considering, the order of presentation of input vectors is not essential as the DR training algorithm of the invention constructs a NN that can detect and report on which input vectors cause neurons to be added to the NN. This step is preferably used in situations where the trained. NN performs poorly. This step is highly recommended whenever the data set is sufficiently complex to require the addition of LTGs into the NN.

The next phase (3) applies data to the NN input where it is preferably converted to a constraint, which is a relationship between the weights and the LTG's threshold to be learnt. If there are hidden layers, then the output of the LTGs becomes input into the next layer LTGs which in turn transform the input vector they receive into constraints which they can hopefully learn. This process is repeated until the NN produces the desired output. Hit can be learnt by the NN, then training continues with the next input vector, otherwise the process moves to the next phase (4) of adding one or more LTGs to the NN.

There are at least two possible scenarios where an input vector cannot be learnt. These are: (i) If a hidden layer could not learn the input vector, a new LTG is added to the hidden layer; and, (ii) If the output layer could not learn its input vector, in this case a new layer is added to the NN and the old output becomes an LTG in the hidden layer. Another LTG is then added to this new hidden layer to learn what the old output unit could not learn and both these LTGs are connected to the new output, which combines the output.

After LTGs have been allocated to the NN, it is important that: (a) New LTGs are connected to the existing LTGs in the NN; (b) The constraints set of the newly added LTGs are set to empty or the constraints from the previous last LTGs are copied to the new LTGs; and, (c) It is ensured that the addition of new LTGs does not cause the NN to forget what it has previously learnt. It is essential that newly added LTGs allow the NN to still produce what the NN previously learnt, as this is a single pass training algorithm.

Although the DR training algorithm of the present invention is presented in terms of a sequence of process which are numbered (1) to (4), it should be appreciated that these steps or at least aspects of each of these steps may be performed in an order other than that presented. For example, in the case of steps (1) and (2), the available data set may be converted to an appropriate data format before the output of a NN to be trained is selected (see FIG. 2). Similarly, in the case of step (4), a new hidden layer LTG may be added to a NN before a new output LTG is added, and visa versa. The DR training algorithm of the present invention is therefore not limited to the specific order of steps or sequences provided.

A preferred embodiment of the DR training algorithm of the present invention along with other aspects of the invention will now be presented according to the phases outlined above: (1) initialisation of the NN; (2) data preparation; (3) presenting the data to the NN to be learnt; and (4) finally allocating LTGs, if required.

Description of the DR Training Algorithm

Figure 2:
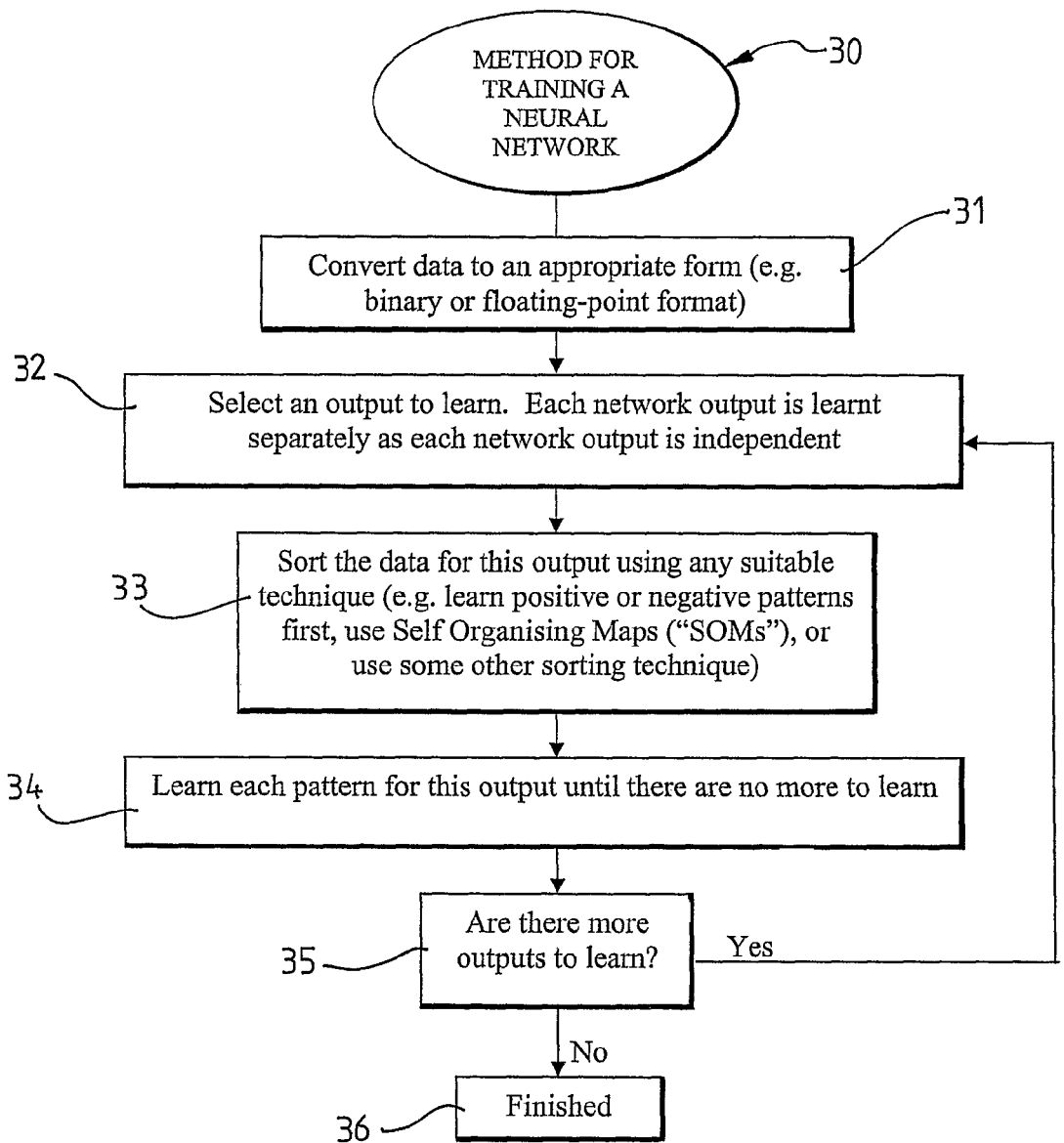
FIG. 2 is a flow diagram illustrating a method for training a NN, made in accordance with a preferred embodiment of the invention.

In FIG. 2 there is shown a flow diagram of a NN training method or algorithm 30 made in accordance with a preferred embodiment of the present invention.

The training process is commenced with an input layer of LTGs. The DR training algorithm 30 for dynamically adding LTGs into a NN is now summarised and presented in the following steps:

(1) Initialisation of the NN

The initialisation of a NN in accordance with DR training algorithm 30 is generally represented by block 32 in FIG. 2. The process of initialising the NN, in block 32, preferably involves the following steps:
- a) Each dimension of the output vector is trained separately. Select the dimension $O_j$, to be learnt
- b) Set the constraints set of the output LTG $O_j$, to empty.
- c) Fully connect the output LTG $O_j$ to the input layer.

(2) Preparing the Data to be Learnt by the NN

The process of preparing the data to be learnt by a NN in accordance with DR training algorithm 30 is generally represented by blocks 31 and 33 in FIG. 2. The process of preparing the data to be learnt by a NN preferably involves at least the following steps:
- a) Since DR training algorithm 30 of the invention preferably works with binary data, it may be necessary to convert the data set to binary before training as is shown in block 31 of FIG. 2. In accordance with a further aspect of the present invention, a discussion of suitable techniques of converting various types of data sets to binary before being presented to a NN for training will be provided later. It should be understood that other data formats can be used in accordance with DR training algorithm 30 of the present invention and as such block 31 simply refers to the conversion of the available data set into any suitable data format.
- b) Determine whether there is any inconsistent data in the training set. Inconsistent data occurs where there are two or more identical input vectors, $x_i$, that produce different output. An example of inconsistent data is $x_i \rightarrow 0$ and $x_i \rightarrow 1$, where the same input vector appears more than once in the data set and produces different output. If there are any inconsistencies only one of the input vectors $x_i$ should be used. While the NN will be able to learn this data, the NN will not perform well. If the NN learns inconsistent data it will output 0, for all input. It is preferred that a check be performed on input vectors to determine whether there is inconsistent output to avoid this situation. This process of determining whether there is any inconsistent data in the training set is not specifically shown in FIG. 2, however, the same could be performed as part of blocks 31 or 33.
- c) The data to be learnt is preferably sorted using any suitable sorting technique as is shown in block 33 of FIG. 2. It is possible for DR training algorithm 30 to learn data randomly, however the resultant NN produced may not classify the data efficiently. Hence, preferred sorting techniques include:
    Sort the input vectors into 2 groups, separating those that output 1 from those that produce 0 for that output. Separate the input vectors into two sets, those that output 1 and those that output 0. Either of these two sets can be learnt first; or
    Sort the data with a SOM (Self Organising Map).
As already discussed, the present invention is not limited to any specific sorting technique.
- d) A single list is created from the sets of input vectors. This step is part of the sorting step represented by block 33.
- e) Determine whether the 0 input vector is available in the data set to be learnt. This 0 vector has all input dimensions set to 0. If this input vector is available, sort this input vector to be learnt first regardless of its output. It is preferred that the 0 vector be available for training and is learnt first regardless of what it's output is, however, if it is not available, it is not important. Once again, this step is part of the sorting step represented by block 33.

(3) Applying the Data to be Learnt by the NN

The process of applying data to be learnt by a NN in accordance with DR training algorithm 30 is generally represented by block 34 in FIG. 2. In block 34 it can be seen that each pattern (or combination of an input vector and its associated output) is learnt for an output of a NN until there are no more to learn. A preferred embodiment of a process 40 of learning a single pattern for an output in accordance with DR training algorithm 30 is provided in FIG. 3.

Process 40 starts at block 41 with the first layer of the NN. Then, for each input vector in the training set:
- a) At blocks 42, a constraint based on the input vector that is being applied to the input layer is constructed for each LTG in the next layer. To create the constraint, the definition of the LTG is used (this was discussed earlier where LTGs were defined), the input vector $x_i$ and the LTG's weight vector, w, forms a relationship with the LTG's threshold, T, based on the output of the NN. Hence if the LTG is to produce 1, the constraint constructed is:

$x_i \cdot w \geq T \rightarrow 1$

Or if the output is 0, then the constraint produced is:

$x_i \cdot w < T \rightarrow 0$

- b) Also at blocks 42, a test is performed to determine if the constraint constructed from the input vector $x_i$ can be learnt by any LTG in this layer. To learn a constraint is to be able to add the constraint to the constraint set of an LTG. A constraint can be added if a numerical solution can be found. It is of no interest what the numerical solution is to the algorithm, it is only essential that one can be found. This is equivalent to there must be an intersection between the constraints. This test constitutes the criterion for adding LTGs into the NN. If none of the LTGs can learn the constraint formed from the input vector, then this becomes the criterion for allocating new LTG(s) into the NN.

If the LTG can learn the input vector, the constraint is added to the LTG's constraints set at block 43. Adding a new constraint reduces the region in the LTG's weight-space that will allow the LTG to be activated. The output from this layer is then applied to the next layer at block 45 and process 40 is repeated (returns to blocks 42) until the NN outputs the correct output. At block 44, it is determined whether the current layer is the output layer and if it is process 40 concludes at block 46, wherein the next pattern is learnt if there are any more patterns to learn. If at some point an input vector cannot be learnt in a layer, it becomes grounds for allocating LTGs (which is illustrated by blocks 47 to 49 of FIG. 3—see Step 4 which follows). Each layer must have an LTG that can output the desired output of the NN. The purpose of the layer that receives input from the previous layer is to combine the output of the previous layer to produce the desired output of the NN.

As already mention, if at block 45, after a check at block 44, the NN outputs the correct response and there are more input vectors to be learnt, then process 40 returns to the beginning of step 3 (blocks 42).

If at block 44 the NN produces the correct response and there are no more input vectors to be learnt, then this training output of the NN is finished training and process 40 concludes at block 46, wherein the next pattern is learnt if there are any more patterns to learn.

If at block 35 it is determined by DR training algorithm 30 that there are more outputs of the NN to be trained, then the DR training process returns to initialisation step 1 (block 32) as is shown in FIG. 2.

(4) The Allocation of New LTG(s) to the NN as Required

Figure 3:
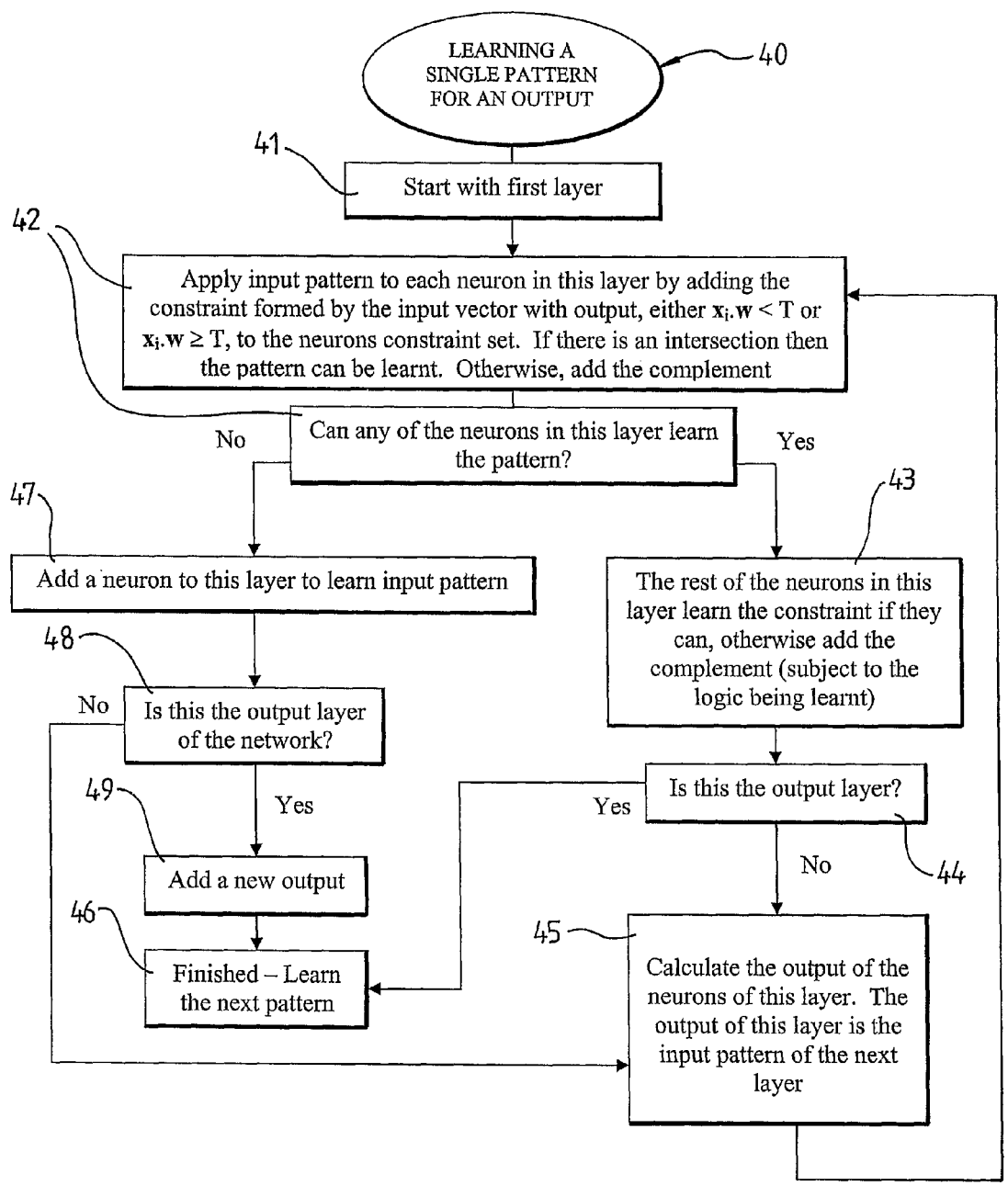
FIG. 3 is a flow diagram illustrating a preferred method of learning a single pattern for an output of a NN trained in accordance with the method for training a NN of FIG. 2.

The process of allocating new LTGs into a NN as required is generally represented by blocks 47 to 49 in FIG. 3. Block 47 illustrates the allocation of a new LTG into a hidden layer of a NN, whilst block 49 illustrates the allocation of a new output LTG into a NN. A preferred embodiment of a process 50 for allocating new hidden layer LTGs into a NN is illustrated in the flow diagram of FIG. 4. Similarly, a preferred embodiment of a process 60 for allocating new output LTGs into a NN is illustrated in the flow diagram of FIG. 5. To provide a better understanding of these processes 50,60 of allocating new LTGs into a NN, reference will also be made to FIGS. 6a & 6b, which schematically illustrate the construction of a NN 70 in accordance with processes 50,60 of DR training algorithm 30 of the present invention.

In the preferred process 40 of learning a single pattern for an output shown in FIG. 3, the allocation of new hidden layer LTGs into a NN (block 47) is shown as being performed before the allocation of new output LTGs (block 49). In FIG. 3, it is shown that if an LTG cannot learn the input vector (or pattern) at blocks 42, a new LTG is added to the current (hidden) layer to learn the input vector at block 47. After a new LTG is added to the current layer at block 47, a test is performed at block 48 to determine if the current layer is the output layer of the NN. If at block 48 it is determined that the current layer is not the output layer of the NN, process 40 continues at block 45 wherein the output from this (current) layer is then applied to the next layer. Process 40 is then repeated (returns to blocks 42) until the NN outputs the correct output as discussed earlier. If at block 48 it is determined that the current layer is the output layer of the NN, process 40 continues at block 49, wherein a new output LTG is added to the NN. After a new output LTG is allocated to the NN at block 49, process 40 concludes at block 46, wherein the next pattern is learnt if there are anymore patterns to learn.

Although process 40 of FIG. 3 shows the allocation of new LTGs into a hidden layer (block 47) before new output LTGs are allocated (block 49) into a NN, it should be appreciated that new output LTGs could be allocated to a NN before the allocation of new hidden layer LTGs. The invention is therefore not limited to the specific example provided. To illustrate that new output LTGs can be allocated to a NN before the allocation of new hidden layer LTGs in accordance with DR training algorithm 30 of the present invention, the allocation of LTGs into NN 70 of FIGS. 6a & 6b will now be presented in the reverse order to that shown in the preferred process 40 of FIG. 3.

Figure 6A:
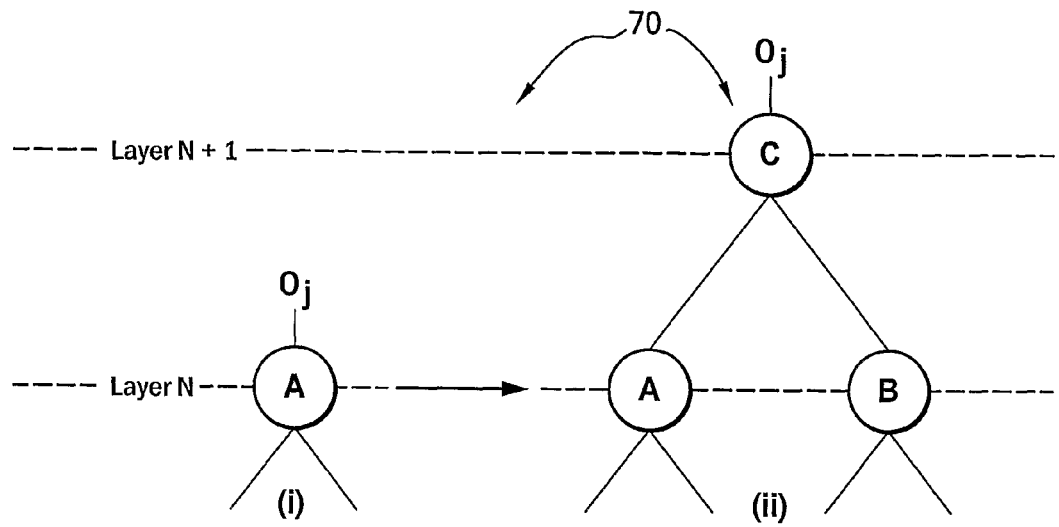
FIGS. 6a & 6b schematically show how new neurons are allocated into a NN in accordance with a preferred embodiment of the NN training method of the present invention.

The process 60 of allocating new output LTGs into NN 70 (FIGS. 6a & 6b) will now be described with reference to FIG. 5:

If the output LTG cannot produce the required output for the input vector at blocks 42 (FIG. 3) then a new output LTG is allocated to NN 70 as in FIG. 6a, and as is illustrated by block 49 of FIG. 3.

I. The current output LTG, LTG A, see FIG. 6a(i), is in Layer N. Another LTG, LTG B, is added to Layer N, see FIG. 6a(ii). The constraint set for LTG B is preferably initialised to an empty set. The allocation of the new LTG, LTGB, into Layer N of NN 70 is not illustrated in the flow diagram of FIG. 5, but is to be understood as being part of block 61 which will now be described. Similarly, the allocation of new LTG, LTG B, into Layer N could occur after the allocation of new output LTG, LTG C, in Layer N+1.

II. At block 61, a new output layer is added, Layer N+1, with a single new LTG, LTG C in this layer for output $O_j$. LTG C's constraint set is then preferably initialised in accordance with steps V and VI.

III. If Layer N>1, at block 62, connections are added to new LTG, LTG B, from the LTGs in the previous layer, Layer N−1 (not shown), that are connected to LTG A.

IV. Also at block 62, the output of each of LTG A and LTG B in Layer N are connected to the input of new output LTG, LTG C, in Layer N+1.

V. If the input vector to be learnt produces an output 0 then, at block 63:
 a) New LTG B, in Layer N, is trained to learn the input into this layer's constraint. These LTGs, LTG B and LTG C, are being added because LTG A could not learn the input.
 b) The constraints from LTG A are copied into the constraint set of the new LTG, LTG B, setting all the constraints to be the threshold in LTG B.
 c) The constraints that form an AND are added to new output LTG, LTG C, Layer N+1, between LTG A and LTG B in Layer N.

VI. If the input vector to be learnt produces an output 1 then, at block 64:
 a) New LTG B, in Layer N is trained to learn this input's constraint.
 b) The constraints from LTG A are copied into the constraint set of the new LTG, LTG B, setting all the constraints to be <the threshold in LTG B.
 c) The constraints that form an OR are added to new output LTG, LTG C in Layer N+1, between LTG A and LTG B in Layer N.

Figure 6B:
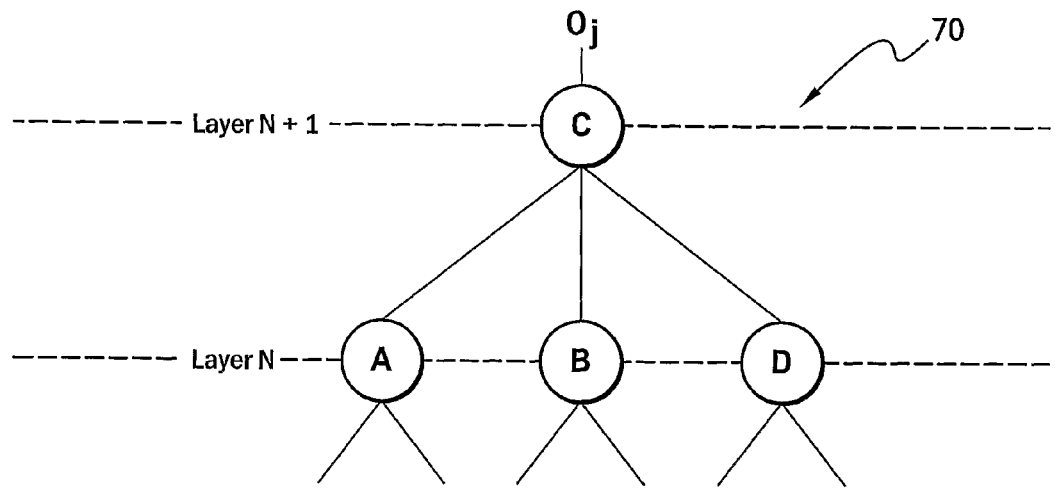

If none of the LTGs in Layer N can learn to produce the required output at blocks 42 (FIG. 3), a new LTG, LTG D, is allocated to that layer, Layer N, in NN 70 as in FIG. 6b, and as is illustrated by block 47 of FIG. 3.

The process 50 of allocating new hidden layer LTGs into NN 70 (FIGS. 6a & 6b) will now be described with reference to FIG. 4:

I. At block 51, an additional LTG, LTG D, is added to Layer N, where none of the LTG's could learn the data. The constraint set is then preferably initialised in accordance with steps V and VI. The remaining steps, Steps II to VI, are generally interchangeable and hence the order of these procedural steps can vary to that shown in FIG. 4.

II. At block 53, connections from the output of LTG D are made to all LTGs in Layer N+1 that form an output layer for Layer N, for this NN output, $O_j$. At block 54, the LTGs in Layer N+1 (in this case LTG C) are updated so that they know what to do with input from the new LTG, LTG D, based on what wouldn't be learnt by the other LTGs, LTG A & B, in Layer N.

III. If Layer N>1, then at block 52 input connections are added into LTG D from all LTGs that form an input in the previous layer, Layer N−1 (not shown), for this NN output, $O_j$.

IV. At block 55, new LTG, LTG D, is trained to learn the input vector that could not be learnt by Layer N. To provide a better understanding of the process (block 55)

of training the new LTG, LTG D, to learn the input vector that could not be learnt by other LTGs in Layer N, a further block, block 56, is provided which includes a more detailed breakdown of the preferred procedure involved.

V. If the input vector to be learnt produces an output 0 then, at blocks 57 and 58:
  a) The constraints in the previous last LTG, LTG B, are copied (block 57) in this layer, Layer N, into the constraints set of the new LTG, LTG D, setting (block 58) all the constraints to be ≥the new threshold.
  b) LTG C forms an AND in its constraints set for the input from LTG D and the other LTGs in Layer N, see block 54. The logic is (A . . . B) AND D.

VI. If the input vector to be learnt produces an output 1 then, at blocks 57 and 59:
  a) The constraints in the previous last LTG, LTG B, in this layer, Layer N, are copied (block 57) into the constraints set of the new LTG, LTG D, setting (block 59) all the constraints to be <the new threshold.
  b) LTG C forms an OR in its constraints set for the input from LTG D and the other LTGs in Layer N, see block 54. The logic is (A . . . B) OR D.

Referring back to FIG. 3, if after the allocation of new LTG, LTG D, at block 47, NN 70 outputs the correct response and there are more input vectors to be learnt (block 48), then process 40 returns to the beginning of step 3 (block 42 via block 45).

Again referring to FIG. 3, if after the allocation of new LTG, LTG D, at block 47, NN 70 outputs the correct response and there are no more input vectors to be learnt but there are more outputs to be learnt (block 48), then process 40 returns to initialisation step 1 (block 32 of FIG. 2).

It should be appreciated that other combinations of logic are possible when copying the constraints from the previous last LTG, LTG B, to the new LTG, LTG D, in Layer N. The specific example that has been provided is simply a preferred logic arrangement that works in both cases (processes 50,60) of allocating LTGs into NN 70. The specific learning logic used is not essential to the invention, however, the data must be copied across in some form otherwise NN 70 will completely forget everything else it has learnt.

It should now be appreciated that the allocation of LTGs into NN 70 in accordance with DR training algorithm 30 can be performed in any order. Hence, in accordance with FIGS. 6a & 6b, LTG D could have been added to Layer N before LTG C was added to the new output layer, Layer N+1. Similarly, it should also be appreciated that the procedural steps, Steps I to VI, in both cases (processes 50,60) of allocating LTGs into NN 70 are generally interchangeable and as such the invention is not limited to the specific order of steps provided.

Detailed Description of the Phases of the DR Training Algorithm

In an effort to provide a better understanding of DR training algorithm 30 and other aspects of the present invention a more detailed description of each the phases or steps of algorithm 30 will now be provided. This training algorithm 30 is based on feed-forward NN architecture, which however varies from the traditional approach to training NNs of LTGs that attempt to find single numerical values to satisfy the training conditions. As already briefly discussed, this approach instead finds regions in the weight-space that satisfy the training conditions for each LTG, which learns in a single pass of the training data set, allows LTGs to be allocated dynamically to the NN, can determine whether an input vector can be classified, and allows rules learnt during training to be easily extracted from the NN.

Initialisation:

See particularly, block 32 of DR training algorithm 30 of FIG. 2. There are preferably at least two steps in the commencement of training an output, the selection of which output to train, and the addition of the output LTG for that output.

The first step, selecting an output to learn: The NN learns to produce each output of the NN separately for the data set. Each output, or dimension of the output vector, is treated as a separate learning process. This is justified because each dimension of the output vector is independent.

Each LTG, regardless of the training algorithm functions independently of others in that layer whether the layer is a hidden or output layer of a NN, despite sharing a common input. This can cause problems with NNs trained with backpropagation, i.e. when the error in the NN is being feed back through the NN, it is not possible to determine which weights should be increased or decreased. Fahlman et al. called this the credit assignment problem. This new algorithm 30 exploits the independent behaviour of each LTG and trains each output LTG separately. This forms the primary principle of how the NN is constructed. Once the dimension of the output vector has been selected, the output LTG is added to the NN.

The second step, adding the output LTG: Initially, the input layer's LTGs are fully connected to the output layer LTGs. Also, the constraint set in the output LTG is preferably empty. The data can now be prepared to be learnt by the output LTG.

Data Preparation:

See particularly, blocks 31 and 33 of DR training algorithm 30 of FIG. 2. Since this is a single pass training algorithm, the order that data is presented to the NN to be learnt is important. There are preferably at least four steps involved in preparing the data.

The first step, if data to be presented to a NN is not in an appropriate format suitable for training, then the data set is preferably converted to an appropriate format before being presented to the NN, as represented by block 31 of FIG. 2.

The second step, data is checked for inconsistencies: Inconsistent data causes problems when training a NN. Data needs to be checked for inconsistencies, as there are two or more instances of input vector $x_i$ which produce conflicting output. In other words, when $x_i$ produces an output 0 as well as 1. Although the NN can learn this data, the data is inconsistent and it is preferred that the NN is trained with unique input vectors to avoid this problem. This step can be performed at either block 31 or block 33 of DR training algorithm 30 of FIG. 2.

The third step, ordering the data in the training set before training the NN: Learning the 0 vector causes instability for many systems including the simplex methods with negative constraints and feed-forward NNs trained with backpropagation to learn data sets where the input vector 0 requires output to be 1. The reason why it is problematic for NNs is that the threshold in the neuron is required to be negative. DR training algorithm 30 of the present invention avoids this situation by ordering the data in the training set before training the NN. The 0 vector is defined as the input vector where all the input dimensions are 0. For example, the 0 vector for a neuron or NN with 3 inputs is [0 0 0]. When the 0 vector is available in the training set, it is learnt first by the NN, as this avoids the instability the NN may experience if the 0 vector causes the NN to output 1.

The fourth step, if the input vector 0 is known, it should be learnt first, if it is available. Then the input vectors are preferably sorted, at block 33, into some order prior to training the NN, especially if LTGs are required to be allocated to the NN during training. The algorithm 30 of the present invention does not have an in-built search mechanism as data is learnt as it is presented to the NN. This is because DR learning trains the NN in a single pass so it must be able to learn all data sets as presented.

In accordance with a further aspect of the present invention, a preferred method of sorting (block 33) is to sort the data into sets that produce 1 and 0 respectively, and learn those vectors that produce 1 or 0 first, depending on the data set. As a rough guide line, if 0→0, then learn those vectors that output 0 first, else learn the vectors that output 1 first.

Another possible sorting method is to use SOM, Self Organising Maps, which simulates one of the biological brain's sorting techniques. The biological brain uses a mechanism similar to SOM on the surface of the cortex. SOM works by organising or sorting input vectors into a two-dimensional class representation of features in the data set. The features classify input vectors without reference to their output. Input vectors that are classified as belonging to certain features in the SOM can be separated and sorted into features and collected to be fed into the training mechanism. In this way, DR learning can cluster LTGs together that learn how to classify specific features in the data set.

This structure can be imagined as 3-dimensional, the 2-dimension SOM and the third dimension is the DR trained NN. A simplistic view of the biological brain which is roughly dome-shaped, with a SOM is on the surface and feedforward NNs emanating from the surface. One possible model may be that the cortex is made up of layers of SOM connected together with feedforward neurons.

It should be appreciated that there are potentially many other sorting techniques that can be used with DR training algorithm 30 of the present invention and as such the invention is not limited to the specific examples provided.

Applying Data to the NN:

See particularly, blocks 34 and 35 of DR training algorithm 30 of FIG. 2, and in more detail, process 40 of FIG. 3. DR training algorithm 30 of the present invention preferably uses LTGs, which have been previously described. Further still, DR training algorithm 30 preferably uses the Heaviside, or step, function as its transfer function. This type of gate is preferably used because it provides sharp boundaries between the classes in the input space and divides the classes of input vectors cleanly.

DR training algorithm 30 of the invention works well with the LTG because it does not find single numerical values for the weights and threshold that satisfy the training conditions; instead it learns by constraining the LTG's weight-space. So instead of finding a single value in the weight-space to satisfy the weights and thresholds, regions of space are found. The constraints are formed from the input vector and the desired output, which is in accordance with the concepts of supervised training.

The threshold, T, in the LTG is treated as a constant. It has been showed by Kohavi that the threshold in an LTG can be treated as such. Kohavi uses complement weights (using logical NOT) to account for thresholds that are both $T \leq 0$ and $T > 0$. In the training algorithm 30 of the present invention the data determines whether the $T \leq 0$ or $T > 0$ during training.

The only modification made to the original LTG is the inclusion of a constraint set, which is initialised to being empty. This is required for implementation purposes as it is used to store what the LTG has learnt about relationships between the weights and the neuron's threshold. As already discussed, the present invention is not limited to the use of constraints alone. The constraints only represent relationships between the input weights and the threshold and are simply a preferred feature of the invention.

A discussion of how the constraints are built that train a single LTG will now be provided.

Building the Constraints for a Single LTG:

See particularly, the preferred process 40, in FIG. 3, for learning a single pattern for an output in accordance with DR training algorithm 30. The LTG is presented input vectors (or patterns) that it is to learn at blocks 42. These input vectors are converted into constraints, which are recorded in the LTG's constraint set Prior to learning, the constraint set is preferably initialised to empty.

To begin training, the first step (blocks 42) in constructing the constraints is to apply each input vector, $x_i$, to the LTG's incoming weight vector, w, to produce $x_i \cdot w$. The product, $x_i \cdot w$, has at least two possible relationships with the LTG's threshold, T, based on equation 1.1 that defines the behaviour of an LTG. These two possible relationships each produce an associated output. The relationship to T and the associated output are expressed in equation 2.1 and 2.2.

$$x_i \cdot w \geq T \rightarrow 1 \quad (2.1)$$

or $$x_i \cdot w < T \rightarrow 0 \quad (2.2)$$

Supervised learning was explained earlier in this specification. Using the principle of supervised learning, if the output required is 1, then the required constraint is $x_i \cdot w \geq T$. Likewise, if the output to be produced is 0, then w is constrained such that $x_i \cdot w < T$. The new constraint is now added to that LTG's constraint set, given that this constraint along with the others previously added has a solution. This will be discussed in more detail later. The process of adding constraints, constructed from the input vector and the LTG's weights, to the LTG's constraint set is repeated for all n input vectors in the training set.

Figure 7:
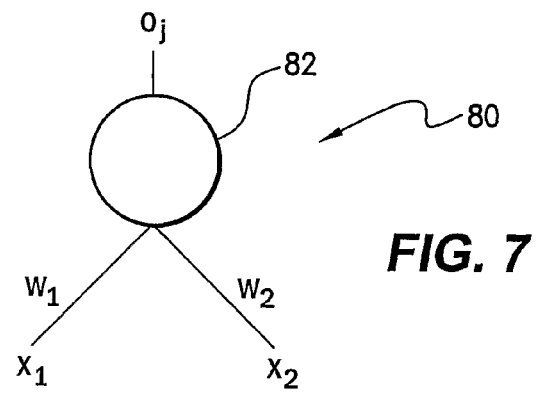
FIG. 7 schematically shows an example of the basic structure of a 2-input LTG NN.

FIG. 7 shows an example of a 2-input LTG NN 80. In this example, let the weight vector be $[w_1 \ w_2]^T$, the input vector be $[x_1 \ x_2]$, and $[O_j]$ be the output of the LTG. If the output is to be 1, for the input [0 1], then the constraint on the LTG 82 will be $w_2 \geq T$. If another input vector [1 1] is expected to produce an output 0, then the constraint $w_1 + w_2 < T$ is also added. These two inputs will result in a constraint set for this LTG 82 of $\{w_2 \geq T, w_1 + w_2 < T\}$. By building constraints sets, LTG 82 learns to classify the input/output.

It has now been shown how to construct the constraints from input vectors that will train the LTG. But before any new input vector can be learnt and its associated constraint added to the constraint set for the LTG, it must be verified whether the LTG can learn the constraint that the input vector forms. A discussion of the criterion for learning an input vector will now be provided which will determine whether a new input vector can be learnt and hence whether the constraint is added to the LTG's constraint set.

Criterion for Learning an Input Vector:

See particularly, blocks 42 of process 40 in FIG. 3. The most fundamental issue when adding constraints to the LTG's constraint set is to determine whether it can learn what it is being taught. This was covered in more detail earlier in this specification.

Testing whether an LTG can learn the input vector is fundamental to building a NN of LTGs. If a single LTG cannot learn all the data, then additional LTGs are required.

As DR training algorithm 30 of the present invention converts the input vector and the associated output into a constraint, the new constraint can be tested to determine whether there is a solution in the weight-space with all the constraints the LTG has already learnt. This may be done using the simplex method. This test ensures that numerical values can be found for the weights and the thresholds, although it is not necessary to find specific numbers for each of the weights and thresholds. It is enough to know numerical solutions can be found, which satisfy the constraints.

A discussion of why finding a general solution to the learning problem is preferable to finding a specific numerical solution for each of the weights and thresholds will now be provided.

Traditionally, single numeric values were found for each of the weights because it was not possible to find a general solution.

If a solution can be found for the weights in NNs trained with traditional training methods, such as backpropagation, then there are an infinite number of solutions for all the weights when the weights are chosen from $w \in R^n$. This infinite number of solutions forms a region in the weight-space for each LTG. The solution that is typically chosen with back-propagation tends to be the first set of numeric values found that produces a NN within a pre-designated error tolerance. The w found for each LTG, is a single value of this region in the LTG's weight-space.

This solution for the weight values attempts to be a kind of average based on the input values applied to the NN during training, where extremes are lost because the range of values is lost to find a single solution.

The method of training neurons according to the present invention allows all the information learnt during training to be preserved as a general solution is found. A general solution allows the region in the weight-space to be analysed to find the boundaries between weights that do and do not cause the LTG to activate. The general solution defines relative relationships as it would seem that all things are relative to each other, and can only be understood in relation to all else. Finding a general solution allows relationships between the weights to be analysed, and as a result allows the relationship between the input to be analysed. Finally, if it is absolutely necessary, specific numerical values can be found that definitely embody the relationships within the data set.

Hence, there is a test available to determine whether new constraints can be learnt by the LTG trained with the DR training algorithm 30 of the present invention. This test is also the criterion for adding LTGs to the NN. If an input vector cannot be learnt, then a LTG is added to the NN.

Figure 4:
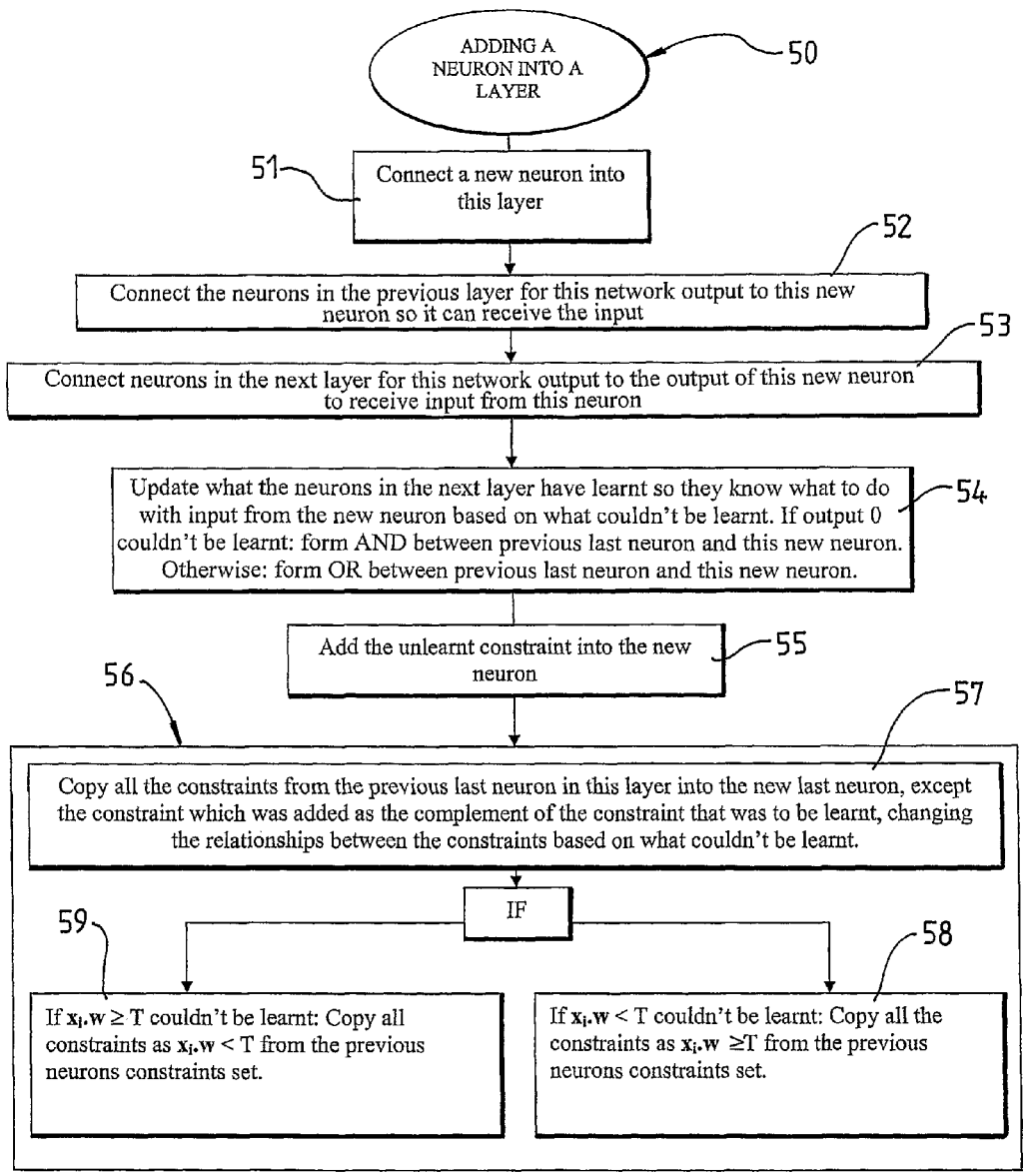
FIG. 4 is a flow diagram illustrating a preferred method of allocating a new neuron into a hidden layer of a NN trained in accordance with the method for training a NN of FIG. 2.
Figure 5:
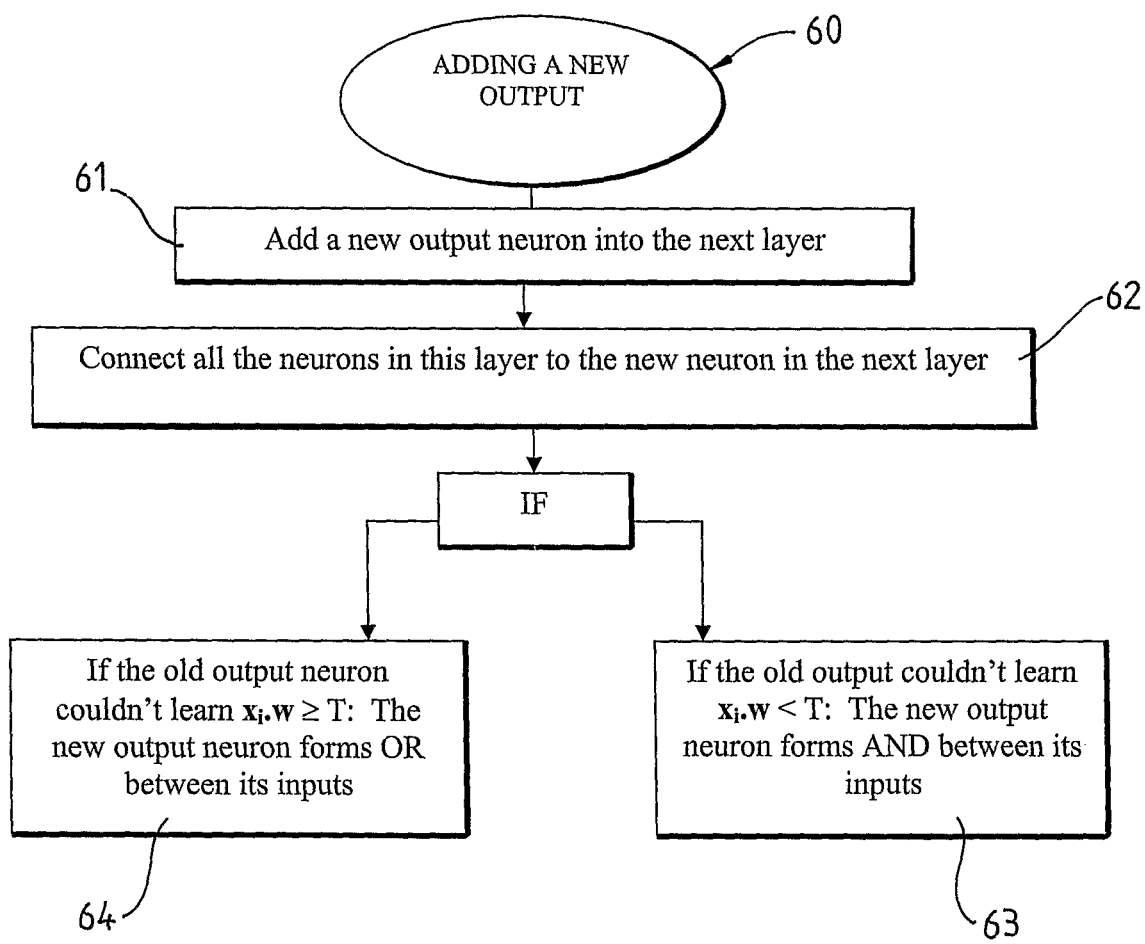
FIG. 5 is a flow diagram illustrating a preferred method of allocating a new output neuron into a NN trained in accordance with the method for training a NN of FIG. 2.

Allocation of LTGs to the NN:

See particularly blocks 47 and 49 of process 40 of FIG. 3, and the preferred processes 50,60, in FIGS. 4 & 5, for allocating LTGs into a NN in accordance with DR training algorithm 30 of the present invention. It has been shown above how to train a single LTG. The behaviour of a single LTG forms the foundation for building a NN of LTGs. Training a single LTG includes the following three steps:

1) Converting input vectors into relationships between the weights and the thresholds;
2) Determining whether the LTG can learn a new input vector. The criterion for whether a LTG can learn an input vector is determined by whether a numerical solution can be found when a constraint is added to the LTG's constraint set; and
3) If the LTG can learn the input vector, the constraint constructed from the input vector is added to the LTG's constraints set.

If the LTG could not learn the input vector, at blocks 42, then additional LTGs are required. Hence, step 2 forms the fundamental criterion for allocating LTGs to a NN. It will now be shown how to add LTGs to build a NN.

LTGs are allocated only when an input vector cannot produce the required output. This process includes the following steps:
1) Form connections between new LTGs and to the LTGs already in the NN (blocks 52 and 53 of FIG. 4, and block 62 of FIG. 5); and
2) Ensure the new LTGs do not cause the NN to forget what it has already learnt.

The discussion that now follows will address each of these processes in more detail. First the general approach to NN architecture will be addressed. Then the selection of an output and the justification for separating the output into separate problems will be addressed.

NN Architecture:

Initially the input LTGs are fully connected to the output LTGs. The number of input and output LTGs depends on the data set being learnt by a NN. Each output is considered an independent learning task of the other outputs (block 32 of FIG. 2).

Figure 8:
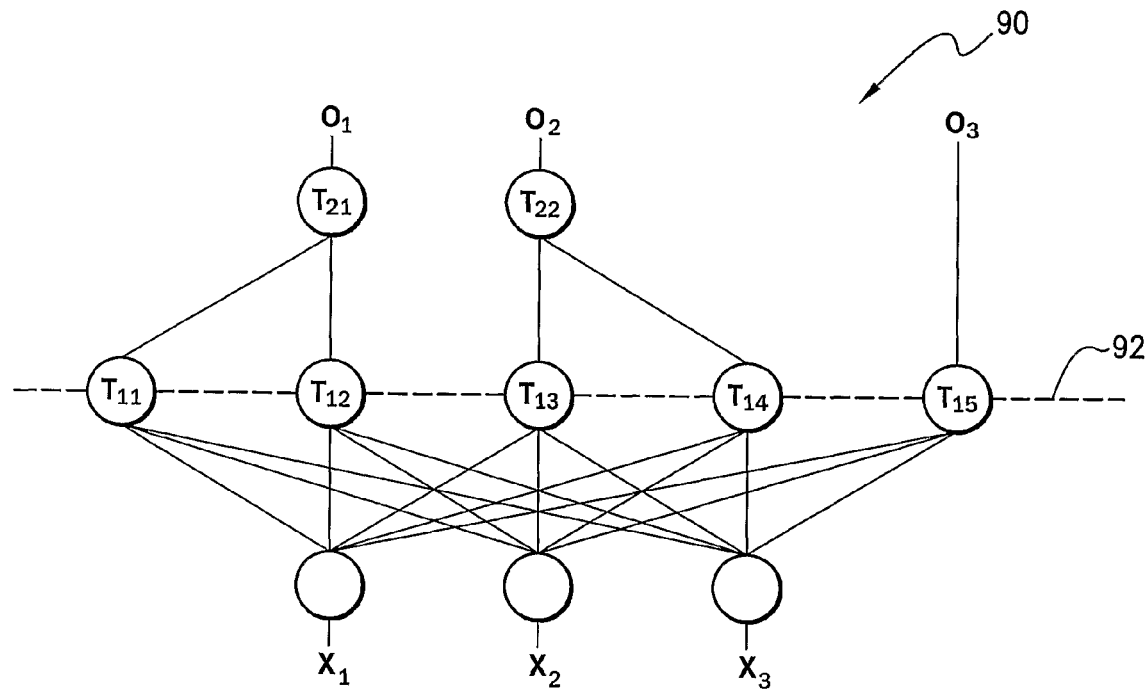
FIG. 8 schematically shows a preferred embodiment of a NN with three outputs that has been trained in accordance with the NN training method of the present invention, using the Modulo-8 Problem.

For the purpose of this discussion, NNs with a single output will be considered first. DR training algorithm 30 of the invention grows the topology across and up, and forms a NN similar to traditional NN formed when using backpropagation. It may allocate units to a hidden layer (process 50 of FIG. 4), and may add a new output layer (process 60 of FIG. 5), which contains a single LTG. The previous output layer then becomes a hidden layer in the NN. This new hidden layer has an additional LTG allocated to it (block 47 of FIG. 3) to learn what the other LTG in that layer could not learn. An example of a NN 90 with three outputs $O_1, O_2, O_3$ is shown in FIG. 8. NN 90 has been trained with the DR training algorithm 30 of the invention with the Modulo-8 Problem data set.

In NN 90 illustrated in FIG. 8, it can be seen that $O_3$ did not require a hidden layer to be able to produce the required solution after full training. However $O_1$ and $O_2$ did require hidden layers. At the beginning of training, the LTGs with thresholds $T_{11}$ and $T_{13}$ were the original outputs. However they could not learn the data so $T_{12}$ was added to the hidden layer 92 and $T_{21}$ became the output for $O_1$. Similarly, $T_{14}$ was added when $T_{13}$ could not produce $O_2$.

The convention that is used in this specification for naming LTGs is that the LTG has a threshold, T, and belongs in a layer, L. Since every function can be learnt in no more than three layers, only a single digit is allocated to identify the layer. Each layer has a number, N, of LTGs in it, and these are numbered across k=1 ... N, in that layer. Each LTG can be referenced as $LTG_{Lk}$, and has a threshold associated with it, which is referred to as $T_{Lk}$. Each LTG has a set of input connection weights. The individual components of the weight vector are referenced as $w_{Lkj}$, where j is the LTG in the previous layer from which the input was received.

Building the NN:

LTGs are only added to a NN when an input vector cannot be learnt by the NN (see blocks 42). There are two occasions when LTGs need to be added to a NN: (1) The first occurs when an output cannot produce the required output (block 49); and (2) The second occurs when no LTG in a hidden layer can learn an input vector (block 47). As discussed earlier, the allocation of output LTGs and hidden layer LTGs into a NN can occur in any order.

The things that preferably need to be considered when adding LTGs into a NN are:
a) All the connections required to be made from existing LTGs in the NN are made to the new LTG (blocks 52 & 53 of FIG. 4, and block 62 of FIG. 5);

b) After adding a new LTG into the NN, it is important that the newly added LTGs learn all that has been previously learnt by the NN (block 55). This prevents a condition called forgetfulness, as it means that what was previously learnt by the NN may be forgotten. How this is avoided will be discussed when addressing learning logic later in this specification; and c) LTGs that already exist within the NN, which are to receive input from the newly allocated LTG have to be prepared to accept the input (block 54). If the LTGs that are to receive this new input from the newly allocated LTG are not prepared they will ignore the output of the new LTG.

Adding LTGs into the Hidden Layer:

See particularly, process 50, in FIG. 4, for allocating new LTGs into a hidden layer of a NN in accordance with DR training algorithm 30 of the present invention. This discussion will consider the situation where an input vector is first applied to a NN with only one output. The constraint is formed with the first LTG in the first hidden layer. If the first LTG in the layer cannot learn the constraint determined by the test discussed earlier (blocks 42 of FIG. 3), the next LTG in this layer attempts to learn the constraint formed from the input vector with its output and so on, until one of the LTGs in the layer learns it. However, if none of the LTGs in the layer can learn the constraint, then an additional LTG must be added to the layer to learn it (block 47). This was illustrated in the NN 70 of FIG. 6b, where LTG D was added into Layer N.

For example, when LTG A or LTG B, in FIG. 6b, cannot learn a new input vector, LTG D is added into Layer N as shown. LTG D learns the new constraint based on the input into this layer, Layer N (block 55 or 56). The output of this new LTG, LTG D, also becomes input (blocks 53 & 54) into the output LTG, LTG C in output layer, Layer N+1, of NN 70 having output $O_j$.

An arbitrary hidden layer will now be considered. When an input vector is applied to a NN, each LTG in the first hidden layer will respond by being activated or not depending on the LTG's training. These LTGs responses serve as an input vector to the next layer which in turn will respond given their training and so on. If any hidden layer cannot learn to classify the input it receives (blocks 42) as a result of any input vector, a new LTG is added into the layer (see FIG. 4). This process of adding LTGs into the hidden layer is repeated until all the input data has been learnt.

A preferred formalisation or process 50 for dynamically allocating LTGs into established hidden layers is given in the following algorithm:

a) Form connections to all the LTGs in layer N−1 (block 52). These connections act as input to the newly allocated LTG;

b) Form connections to all the LTGs in layer N+1 (block 53), for the output being learnt These connections act as output from the newly allocated LTG;

c) The LTGs in layer N+1 form logic relationships between the existing LTGs in layers N and the new LTG (block 54); and d) The newly allocated LTG is prepared with what the other LTGs in layer N have learnt (block 55 or 56).

Figure 9:
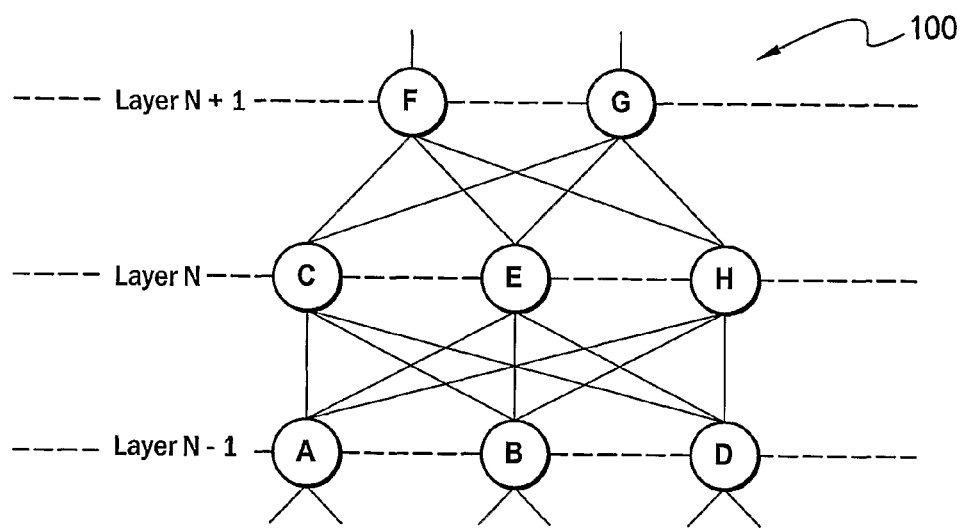
FIG. 9 schematically shows how neurons are allocated into hidden layers of a NN in accordance with a preferred embodiment of the NN training method of the present invention.

The connection formation is illustrated in FIG. 9 where a NN 100 has been built after being trained with sufficiently complex data.

LTG H is allocated into NN 100 in Layer N (block 51). Output connections from LTG H are formed to the inputs of LTGs F and G, in the next hidden layer, Layer N+1, and not an output layer (block 53). This was seen earlier where it was discussed that each output is solved as a separate learning task. Input connections are established from the LTGs, LTGs A, B & D, in the previous layer, Layer N−1 (block 52).

To summarise, if none of the hidden layer LTGs can learn the constraint formed by input into that layer, i.e. there is no solution, then an LTG is added to the hidden layer. The new LTG has its output connected to all LTGs in next layer that are relevant to $O_j$. If the output LTG cannot learn an input constraint, then the current output layer LTG becomes a hidden layer and a new output is added as output to the NN in accordance with process 60 of FIG. 5.

Now that it has been discussed how to add LTGs into the hidden layers, it will now be examined how to add a new output to the NN.

Figure 10A:
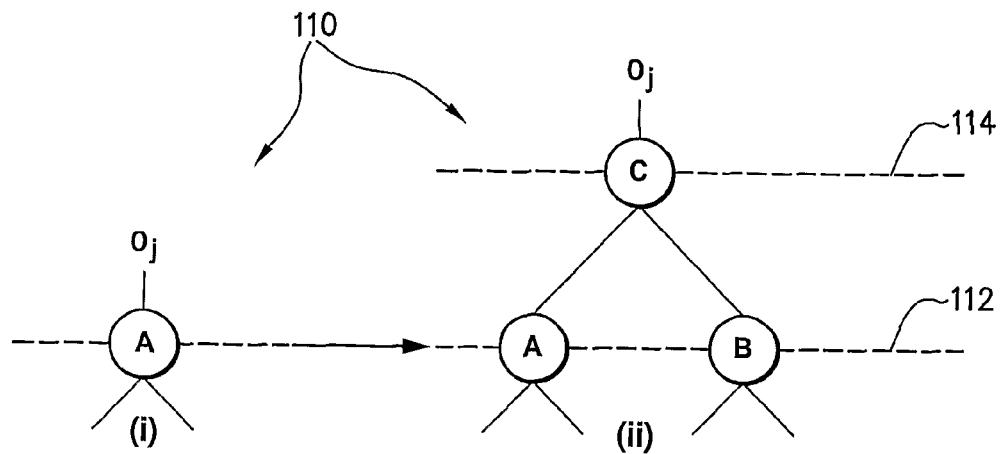
FIGS. 10a & 10b schematically show how new output layers are added to a NN in accordance with a preferred embodiment of the NN training method of the present invention.

Adding a New Output:

See particularly, process 60, in FIG. 5, for allocating new output LTGs into a NN in accordance with DR training algorithm 30 of the present invention. After selecting the output, $O_j$ to train (block 32 of FIG. 2), all the input sources are connected directly to the single output LTG, as was described earlier. The single output LTG is trained by successively applying input vectors to the LTG and forming constraints, as was also described earlier with reference to FIG. 3. In FIG. 10a(i) there is shown a schematic diagram of a NN 110 having a single LTG, LTG A, arranged in an output layer 112, with output $O_j$, which is currently being trained.

The constraints in LTG A's constraint set are tested with each constraint the input vector forms (blocks 42). The test that is used was provided earlier.

If the new constraint has a solution with the existing constraints set then it is added to the constraint set. If, however, there is no solution (at blocks 42) then another output layer 114 is added, and a new LTG, LTG C, is added (block 61) as shown in FIG. 10a(ii). LTG C becomes the new output LTG, $O_j$, of NN 110. Since there was an LTG, LTG A, in a hidden layer 112 (originally output layer 112) that could not learn an input vector, a new LTG, LTG B, is added to hidden layer 112, (also at block 61) as shown in FIG. 10a(ii). The input vector that LTG A could not learn can now be learnt by LTG B. The output of LTG A and LTG B are connected to the input of LTG C in output layer 114 (block 62). LTGs A and B now form a hidden layer 112 of NN 110.

Figure 10B:
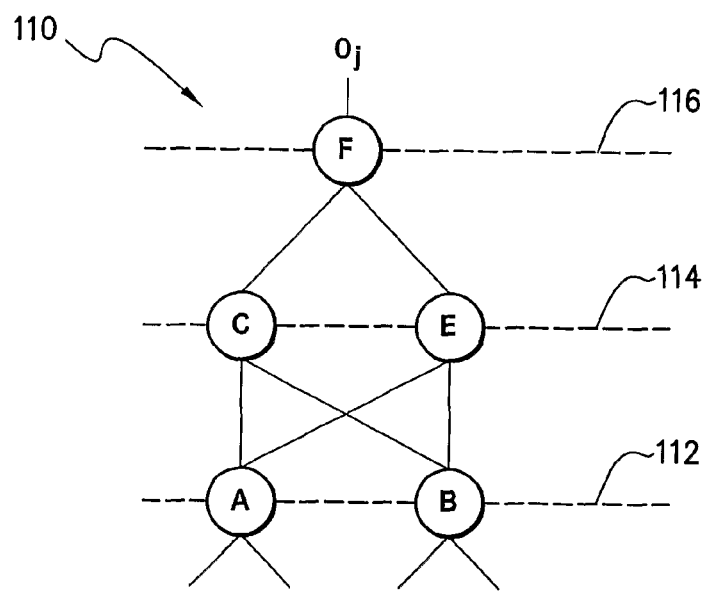

Again if LTG C of NN 110, in FIG. 10b, cannot learn some input, a new hidden layer 114 (previously output layer 114) is added and a new output layer 116 is created. In this way, new hidden layers are created and output layers are added. See FIG. 10b, where new hidden layer LTG, LTG E is added to hidden Layer 114, and new output LTG, LTG F, is added to new output layer 116.

To summarise, if an output LTG cannot learn the input vector, then another LTG is added to the same layer as the current output layer and all inputs are connected directly to it. This LTG learns the input the old output could not learn. An additional LTG is added to the next layer. The inputs to this LTG are the old output of the NN, and the newly added LTG to that layer.

Now it has been established how to add connections to the LTGs dynamically allocated to the NN, it is important to consider how to train the LTGs so that the NN will continue to reproduce what has previously been learnt. This will now be discussed.

Learning Logic:

Since DR training algorithm 30 of the present invention is a single pass algorithm, when LTGs are added into a NN, the NN must still produce the correct response to input vectors previously learnt. Hence the addition of LTGs should not cause a NN to forget what it has learnt before. This could occur when: (a) An LTG is allocated to a hidden layer; or (b) A new output layer is added to the NN. In this case a new LTG is being allocated into a hidden layer.

To avoid this problem: (a) The newly allocated LTG into the hidden layer must be prepared with what the other LTGs have learnt in this layer (block 55 or 56 of FIG. 4), according to specific logic rules; and, (b) Also the layer of LTGs, which receives input directly from the layer in which the newly allocated LTG has been allocated to, is required to have what they have learnt updated based on the desired behaviour of the newly allocated LTG (block 54). This case covers the allocation of a new output layer.

Consideration will now be given to what the newly allocated LTG learns. Firstly, a NN with no hidden layers will be considered, such as the NN shown in FIG. 10a(i).

There are at least two conditions when a LTG cannot learn an input vector and these are: (1) When the input vector being learnt is required to output 1 but the LTG can only output 0 for this input vector based on what it has previously learnt; and, (2) When the input vector being learnt is required to output 0 but the LTG can only output 1 for this input vector based on what it has previously learnt.

As was discussed earlier, in this situation a new output is allocated to the NN, as is shown in FIG. 10a(ii).

There are at least two possible ways that the subsequent layer can combine input from the hidden layer that the LTG has been allocated to and these are: (1) The output LTG combines the input vector from the hidden layer LTGs with logical OR (block 64); and, (2) The output LTG combines the input vector from the hidden layer LTGs with logical AND (block 63).

Learning OR:

See particularly, block 64 of process 60 of FIG. 5. Initially, consideration will be given to an input vector the old LTG could not learn. If the vector is supposed to cause the NN to output 1, and the LTG can only output 0 as a result of what the LTG has previously learnt, then the new output needs to form an OR between its inputs.

Referring again to FIG. 10a(ii), it is still required that the output of NN 110, LTG C, is activated when LTG A is activated, but in this case LTG A is required to be activated and it cannot, so LTG B learns this feature in the input. LTG B also is required to learn input vectors previously learnt by NN 110. This ensures that LTG B does not cause the output to be activated when it should not. To do this, all the constraints in LTG A's constraint set are copied to LTG B's constraint set, however all constraints are learnt as <T. LTG B has learnt the new constraint that LTG A could not learn and will be activated by the detection of this input vector. This causes LTG C to be activated as it has learnt to OR its two inputs and it outputs 1 as required.

Learning AND:

See particularly, block 63 of process 60 of FIG. 5. If the output is required to be 0 and the LTG outputs 1 instead, then the new output learns to AND the input from LTG A and the newly allocated LTG, LTG B. In this case the constraints are copied from LTG A's constraints set as ≥T, except if 0<T is in LTG A's constraint set. In this case the constraint is copied over as is.

In the case when LTGs are further allocated to an existing hidden layer, the constraints are copied and modified accordingly from the previous LTG (LTG B) in that layer, as described above. However if the LTG is added to Layer N, then what the LTGs have learnt in Layer N+1 requires modification.

The logic the next layer learns is ( . . . ($x_1$ $Op_1$ $x_2$) $Op_2$ $x_3$) $Op_3$ $x_4$) . . . ) where $Op_1$ . . . $Op_N$ are logical AND or OR, and $x_1$ . . . $x_N$ are the input received from the hidden layer that was allocated a new LTG. If the newly allocated LTG is allocated to an existing hidden layer, then the LTGs that receive input from this layer may require its constraints based on the logic to be updated. For instance, if the layer has the existing logic ($x_1$ AND $x_2$) it will have constraints $\{w_{n1}+w_{n2} \geq T_n, w_{n1}<T_n, w_{n2}<T_n, 0<T_n\}$. If the logic becomes ($x_1$ AND $x_2$) AND $x_3$ then the constraints set becomes $\{w_{n1}+w_{n2}+w_{n3} \geq T_n, w_{n1}+w_{n3}<T_n, w_{n2}+w_{n3}<T_n, w_{n3}<T_n, w_{n1}+w_{n2}<T_n, w_{n1}<T_n, w_{n2}<T_n, 0<T_n\}$.

The logic learnt by LTGs in a layer when an input vector can be learnt is in in accordance with the logic they are added to the NN. If the LTG is added to form an AND then the LTG learns the constraint $x_i \cdot w \geq T$ and if the LTG is added to form an OR then the LTG learns $x_i \cdot w < T$.

Description of Full Learning and Generalisation

It will now be demonstrated that a NN is fully trained, or in other words, that the NN can reproduce what it has learnt, and can also generalise. First it will be demonstrated that the LTG can recover input that it has learnt and hence it is fully trained.

Full Training of the LTG:

When the LTG is trained, the resulting set of constraints can be used to determine the output of the LTG. This is done by applying input to the trained LTG's constraint set, and using equation 1.1, which defines the behaviour of the McCulloch-Pitt LTG. This is illustrated in the following example.

Consider a 2-input LTG 82, as shown in FIG. 7, trained to produce the following constraint set: $\{w_1+w_2<T, w_2 \geq T\}$. Then applying the input vector [1 1], the LTG will produce a 0 output because $1 \cdot w_1 + 1 \cdot w_2 = w_1+w_2<T$. Therefore, the numerical values for weights are not required for the LTG to be fully trained.

The above argument demonstrates that an LTG can reproduce what it has learnt without finding numeric values for the weights and threshold. Also it demonstrates that what has been learnt by the trained NN can be recalled with 100% accuracy.

While the present invention is primarily concerned with training NNs to determine the appropriate output associated with input vectors, a discussion on the data used to train the NNs, and two problems that can cause problems during training will also be provided.

Generalisation:

The preferred embodiment of the invention uses feed-forward NNs as they can be trained with a sample data set and then may successfully classify data patterns that have been previously unseen by the NN during training. This is called generalisation.

While it might be desirable to have a black box NN classification system where little is known about the data space, there are at least two aspects to data, which are vitally important when training a NN and these are listed as follows: (1) One of the problems confronting a large and noisy data set is that it may have contradictions, for example, there is some input vector $x_i$, if $x_i \rightarrow 0$ in one example, and $x_i \rightarrow 1$ in another, then the NN will experience difficulties learning this vector. This problem is common to all learning algorithms; and, (2) Ensuring the training sample used to train a NN is representational of the data set. This will now be addressed in more detail as follows.

Each data set has some number of features in it. It is hoped that the data set the NN is exposed to during training represents all the features necessary to fully train the NN. However, there is no way to determine that the training set is representational of all the features in the full data set when the data set is large and little understood. In this case the data set is referred to as 'unknown'.

By testing the trained NN, it is possible to determine if the NN has learnt all the features in the data set. Testing the NN with additional classified input vectors is a preferred method of achieving this. A discussion on dividing the data set for training feed-forward NNs has been provided earlier. However, other features in the data set may not become apparent even then, if the data set is not well understood and large.

A discussion of why deduction will not always work will now be provided. Deduction will fail when there are missing features in the training data set and this problem can be termed 'insufficient training'.

Insufficient Training of a LTG:

Each data set, with which an LTG is to be trained, may have any number of data features. The training data set may have some number of these features represented within it; however there is no guarantee that all the features present within an unknown data set are also represented in the training set.

Hence, if there are features which are not represented within the training data set, then the LTG has not been exposed to all the features in the data set during training. Thus, when the LTG is tested with the unseen input vectors it may output the wrong result. Hence, why the LTG can be referred to as insufficiently trained.

For example, consider the 2-input LTG 82 shown in FIG. 7, trained with only two input vectors: [0 0]→0 and [0 1]→1.

As yet LTG 82 has not been exposed to any vector where the first bit in the input vector has been set, hence it may not accurately classify [1 0] and [1 1]. The constraint set that this LTG 82 learns from the above training set is $\{0<T, w_2 \geq T\}$, and although there is some information about $w_2$, no relationships to $w_1$ have been established. For instance, it is unknown what relationship $w_1+w_2$ or $w_1$ has to T. As a result it may not be possible to deduce the output for input vectors [1 1] and [1 0]. In terms of the logic relationships formed between the input, these may be $x_2$, $x_1$ OR $x_2$, or $x_1$ XOR $x_2$, but it is not possible to tell which it is without further information.

In accordance with DR training algorithm 30 of the present invention, if an LTG is insufficiently trained, then it will preferably output 1, but this depends on the data set and could instead output 0. In other words, the LTG will remain active until it has learnt how to respond to the data input. However, this may be varied according to the data set being learnt by the NN.

It should therefore be understood that LTGs can have trouble outputting the correct response if there are missing features in the training set. This is also a problem that other neurons experience, which are trained with other training methods, such as backpropagation. However, unlike perceptrons trained with backpropagation, it is possible for DR training algorithm 30 of the present invention to identify when the LTG has not yet learnt how to classify a data pattern. In other words, an LTG trained with DR training algorithm 30 of the invention can indicate when it does not know how to correctly classify an input vector.

A discussion of one of the LTGs most useful properties will now be provided, namely the LTG's ability to be able to deduce the output of unseen input vectors given sufficient training.

Deducing Unseen Input Vectors:

When a NN is being trained, it is trained with a set of input vectors, and then tested with a number of input vectors that the NN has not been exposed to during training. These input vectors are referred to as 'unseen' and determine whether the NN can correctly determine their associated output.

For the NN to be able to determine the classification of data patterns that were not seen during training, it requires the NN to be able to deduce the classification of the unseen input vector from what it has previously learnt. It may not be possible to correctly deduce the output since there is no guarantee that all features have been learnt during training, except by exposing the LTG to all possible input vectors and their associated output Often not all data patterns, or input vectors, are available and it may not be known how to classify them even if they were found by fully enumerating the input data set. It is unlikely that there will be a way to determine if a training set, which is only a proportion of an input data set, is representational of that data set the NN is being trained to learn. As a result it is only possible to show that by training with a specific data set, the output of unseen data patterns can be determined correctly by the NN in some cases.

Proposition 3.1:

If the relationship to the threshold of the LTG for an unseen input vector can be deduced from the constraints it has previously learnt, it will be able to determine the output for the unseen input vector.

Figure 11:
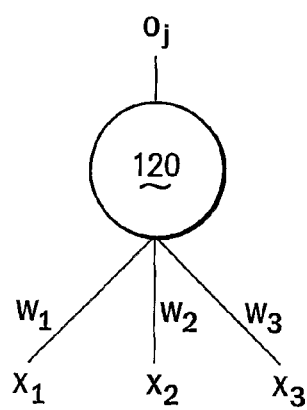
FIG. 11 schematically shows an example of the basic structure of a 3-input LTG NN.

Consider the LTG 120 shown in FIG. 11, the LTG is trained using the following input and output vectors: [0 0 0]→0; [0 0 1]→1; [0 1 0]→1; and [1 1 1]→0.

Then LTG 120 will have the following set of constraints: $\{0<T, w_3 \geq T, w_2 \geq T, w_1+w_2+w_3<T\}$.

The input vector [1 0 0] has not been seen by LTG 120 during training, and the required output for this vector is 0. If LTG 120 is unable to deduce the relationship to the threshold, it will not be able to determine the output is 0.

Since $0<T$, $w_2 \geq T$ and $w_3 \geq T$ then T, $w_2$ and $w_3$ are all positive numbers, with $w_2$ and $w_3 \geq T$. T. Hence, $w_2+w_3$ must also be $\geq T$. However, $w_1+w_2+w_3<T$ which implies $w_1$ is small and negative and hence $<T$. Therefore input vector [1 0 0] when applied to LTG 120 and using equation 1.1 that defines the behaviour of the LTG, $1 \cdot w_1+0 \cdot w_2+0 \cdot w_3=w_1<T$ is deduced. Therefore the LTG will output 0.

Hence, LTG 120 is able to deduce the correct output. Because LTG 120 was able to derive the correct output, it is shown that it can deduce output given that it has been trained sufficiently.

As DR training algorithm 30 of the present invention preferably uses LTGs to construct a NN, the principles of deduction can be used in accordance with the invention to deduce the classification of unseen input vectors of a NN. Alternatively, a different method of determining the classification of data patterns that were not seen during training could also be used in accordance with a further aspect of the present invention. This alternative method of determining the classification of data patterns, or determining whether input vectors of a constraints set are known or unknown, will now be described.

A novel test will now be given to determine if a NN has learnt how to classify an input vector regardless of whether the vector has been learnt explicitly. The following test indicates if the NN output is known for an input vector.

Testing Whether the LTG Knows the Input Vector:

It is preferred to be able to find classifications of patterns, or input vectors, from a trained LTG. When an input vector is applied to a trained LTG it will do one of the following: (1) Activate; (2) Fail to activate; or (3) It may not know how to classify the input vector, which is a result of insufficient training.

Traditional training algorithms have failed to allow an LTG to identify the situation when the LTG does not know how to classify an input vector. DR training algorithm 30 of the present invention allows the identification of input vectors that the LTG does not know how to classify.

In accordance with a further aspect of the present invention, a preferred embodiment of a method 130 of determining whether an input vector of a constraints set is known or unknown will now be described with reference to the flow diagram of FIG. 12. It is preferred that the constraints set is a constraints set of a neuron of a NN trained in accordance with DR training algorithm 30 of the present invention. It should be appreciated that the method 130 of determining whether an input vector is known or unknown is not limited to NNs. It is considered that method 130 of classifying input vectors could also be useful for other fields which use systems of constraints, such as the analysis of strings of data, as for example DNA. Similarly, method 130 of classifying input vectors could also be used for CSPs and operational research applications. This aspect of the present invention is therefore independent and not limited to use with DR training algorithm 30 of the present invention.

The description of method 130 of classifying input vectors which now follows will be described in terms of determining the output of an LTG trained in accordance with DR training algorithm 30 of the present invention. This description is merely an example of one possible use of the method 130 of the present invention.

To determine whether an LTG has been insufficiently trained, or in other words, does not know how to classify an input vector, $x_i$, first, at block 131, the constraint and its complement are constructed from the input vector as was described earlier. The constraints formed will be: $x_i \cdot w < T$ and its complement $x_i \cdot w \geq T$, or $x_i \cdot w \geq T$ and its complement $x_i \cdot w < T$.

It is assumed that the output associated with this input vector is not yet known. The constraint $x_i \cdot w < T$ or $x_i \cdot w \geq T$ is added to the trained LTGs constraint set and then tested using any suitable constraints satisfaction algorithm at block 132 to determine whether there is an a solution (either a numerical solution can be found, but it is not important to find a specific solution, or equivalently an intersection of the volumes defined by the constraints can be found as illustrated in FIG. 12). If there is no solution, then the LTG must output 1 or 0 which is represented by block 133, and the LTG is sufficiently trained and knows how to classify this input vector. In other words, there must be a solution for $x_i \cdot w \geq T$ or $x_i \cdot w < T$.

However, at block 132, if there was a solution when the constraint $x_i \cdot w < T$ or $x_i \cdot w \geq T$ was added to the trained LTG's constraint set, then at block 134, the constraint $x_i \cdot w < T$ or $x_i \cdot w \geq T$ is removed and its complement is added instead. If there is no solution when a check is performed at block 135, then the LTG knows how to classify this input vector and will output 0 or 1 as represented by block 136.

If however, when a check is preformed at block 135, the LTG had a solution when the constraints and its complement were added alternatively at block 134, then it is not known how the input vector is to be classified as it has been insufficiently trained which is represented by block 137. It should be appreciated that the order of these steps is not essential.

Any suitable constraint satisfaction method or algorithm can be used to test whether the constraints can be learnt. It is not important to find specific numerical solutions for the weight and threshold values, but it is essential to determine whether they can be found. This can be stated equivalently as finding an intersection in the volumes defined by the constraints.

Figure 13:
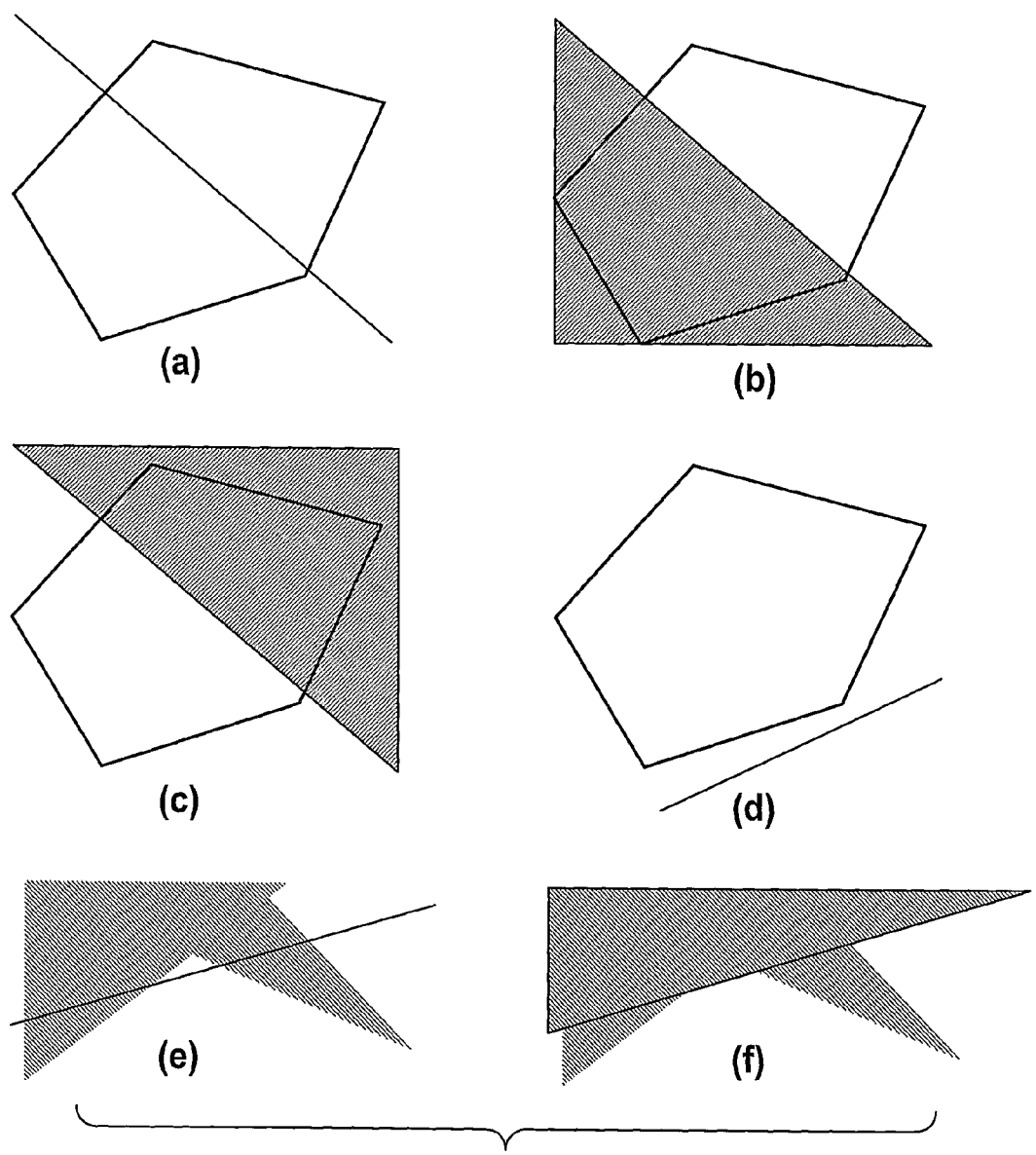
FIG. 13 shows generalised diagrams of the weight-space of trained LTGs.

When the input vector is converted into a constraint, it forms a plane in the weight-space of the LTG. Each time an input vector is learnt by the LTG, it forms a plane that bisects the weight-space, reducing the volume that satisfies the training conditions. This is demonstrated in FIG. 13(*a*), where the enclosed concave region is the weight-space that satisfies the training conditions learnt so far. The plane bisecting the region is formed from the input vector being presented to the LTG. In this situation the LTG can learn either $x_i \cdot w < T$ or $x_i \cdot w \geq T$, as seen in FIGS. 13(*b*) and 13(*c*), respectively. In this case it is not known how to classify the input vector. In FIG. 13(*d*) the LTG can only learn the region above, but not below the plane, hence the output will be determined by the constraint that intersects the volume in the weight-space that satisfies the training conditions.

In FIG. 13(*e*) the plane formed by $x_i \cdot w = T$ intersects the convex volume, but in FIG. 13(*f*), only one constraint formed with that plane can be learnt by the LTG. The convex region reduces to a concave region since interest is only given to the region formed by the intersection of all these constraints.

If the input vector happened to be in the training set, then it will form one of the surfaces on the volume that is defined by the constraints set that was constructed during training, and the input vector will thus be known.

To summarise, both the constraint and its complement are formed from the input vector (blocks 131 & 134) and tested with the trained LTG's constraint set for the existence of an intersection (blocks 132 & 135). If either of the constraints cannot lead to a solution (blocks 133 & 136), then it implies that the features in this input vector have been learnt during training. However, if there are solutions (block 137) available for both constraints with what the LTG has already learnt, then there are features missing from the training set. The above property can be formally states as follows:

Theorem:

By alternately adding to the list of constraints that the LTG has learnt, the constraint $x_i \cdot w < T$ or $x_i \cdot w \geq T$ and its complement (blocks 131 & 134), and then testing for an intersection (blocks 132 & 135), it can be determined whether the vector $x_i$ has been learnt. If there is a solution in both cases (block 137), then the constraint has not been learnt. However, if only $x_i \cdot w < T$ or its complement have a solution with the constraints previously learnt then this vector has been learnt by the LTG (blocks 133 & 136).

Proof:

In FIG. 13, two representations of volumes defined by what the LTG has learnt are illustrated in the diagram of a weight-space given. Concave regions are demonstrated in FIGS. 13(*a*) to 13(*d*), and the convex regions are demonstrated in FIGS. 13(*e*) & 13(*f*). The plane formed by the vector is applied to the weight-space, i.e. $x_i \cdot w = T$. It will either not intersect the defined volumes, as in FIG. 13(*d*) or will, as in all other cases. If it does not intersect, then the input vector has been learnt. In this case it will either cause the LTG to activate or not, depending on which volume, i.e. $x_i \cdot w < T$ or $x_i \cdot w \geq T$ intersects the volume formed by the constraints the LTG has already learnt Otherwise $x_i \cdot w$ has not been learnt.

In the case where the plane intersects a convex region such as in FIGS. 13(*e*) & 13(*f*), only one of these can be learnt, as the region must be common to all the constraints that the LTG has previously learnt (note that the region in FIGS. 13(*e*) & 13(*f*) reduces to a concave region since interest is only given to the common region of both, i.e.: their intersection). To demonstrate that this is so, an example will now be given.

Consider the 3-input LTG 120 given in FIG. 11. If LTG 120 is trained with the following input vectors, [0 1 0]→1 and [0 1 1]→0, then the constraint set LTG 120 has learnt is $\{w_2 \geq T, w_2 + w_3 < T\}$. The output for vectors [1 0 0] and [0 0 1] are to be determined.

For the input vector [1 0 0], the plane $w_1 = T$ is found to intersect the region $\{w_2 \geq T, w_2 + w_3 < T\}$ so both $w_1 < T$ and $w_1 \geq T$ intersect the region learnt by LTG 120. Hence, LTG 120 does not know what the output should be. It was stated earlier that the output should be 1, but this can be modified according to the data set being learnt, if required.

For the input vector [0 0 1], the plane $w_3=T$ is found not to intersect the region $\{w_2 \geq T, w_2+w_3<T\}$, and the only region to do so is $w_3<T$. Hence, it is known that the output for the vector [0 0 1] will be 0.

While not very much is known about the input space, the DR training algorithm 30 for training LTGs according to the invention does give a lot of information about the weight-space.

The addition of each constraint to the constraint set reduces the region in the weight-space that satisfies all the training conditions for this LTG.

In should now be understood that a preferred way in which to determine the output of an input vector is to compare the two possible constraints that it may form with the threshold with the constraints the LTG has learnt. It will either cause the LTG to activate or not, or it will not know the correct output.

Now that it has been demonstrated how a NN can be trained and tested to deduce unseen input, a fully worked example will now be given to demonstrate DR training algorithm 30 of the present invention and generalisation.

Example of Use of the DR Training Algorithm Given the Modulo-8 Problem

The details of DR training algorithm 30 of the present invention are exemplified in the discussion that follows. In this example a preferred embodiment of a NN 140 that solves the modulo-8 problem is used. The data set includes a three-dimensional input vector of a binary number and the output is the next binary number in the sequence. The input vector [1 0 1] is chosen at random and reserved for testing. The constraint sets are created that train the NN 140, then it is shown that the NN can deduce the output for the input vector [1 0 1] which is [1 1 0].

The data set is listed in Table 1 and has the following inputs and the associated outputs.

TABLE 1

The input and output vectors that define modulo-8.

| Input vector | | | Output vector | | |
|---|---|---|---|---|---|
| $X_1$ | $x_2$ | $x_3$ | $O_1$ | $O_2$ | $O_3$ |
| 0 | 0 | 0 | 0 | 0 | 1 |
| 0 | 0 | 1 | 0 | 1 | 0 |
| 0 | 1 | 0 | 0 | 1 | 1 |
| 0 | 1 | 1 | 1 | 0 | 0 |
| 1 | 0 | 0 | 1 | 0 | 1 |
| 1 | 0 | 1 | 1 | 1 | 0 |
| 1 | 1 | 0 | 1 | 1 | 1 |
| 1 | 1 | 1 | 0 | 0 | 0 |

Figure 14A:
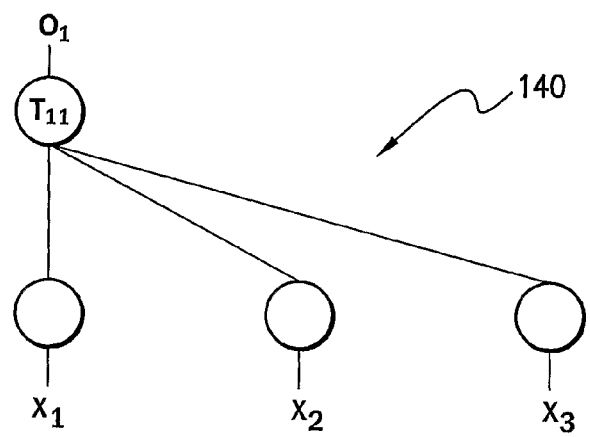
FIGS. 14a to 14g schematically show, in accordance with a preferred embodiment, a NN trained with the NN training method of the present invention that can solve the Modulo-8 Problem.

Constructing the Constraints Sets:

The input vector is defined as $[x_1\ x_2\ x_3]$ and the output vector $[O_1\ O_2\ O_3]$. The first output in the output vector is selected to be trained first (block 32 of FIG. 2). LTGs will be referred to by the subscripts their thresholds have. For instance, $LTG_{11}$ has threshold $T_{11}$. First, it is determined whether the 0, [0 0 0] in this case, vector is available to be learnt. It is and so the vector $\{0<T_{11}\}$ is added to the constraint set. The input vectors are ordered (block 33) so that the vectors that output 1 in the position in the output vector, which is currently being trained, are learnt first. See FIG. 14a.

The training for output $O_1$, in accordance with process 40 of FIG. 3, causes $LTG_{11}$ to be defined as: $\{0<T_{11}, w_{113}<T_{11}, w_{112}<T_{11}, w_{112}+w_{113}\geq T_{11}, w_{111}\geq T_{11}, w_{111}+w_{112}\geq T_{11}\}$.

Figure 14B:
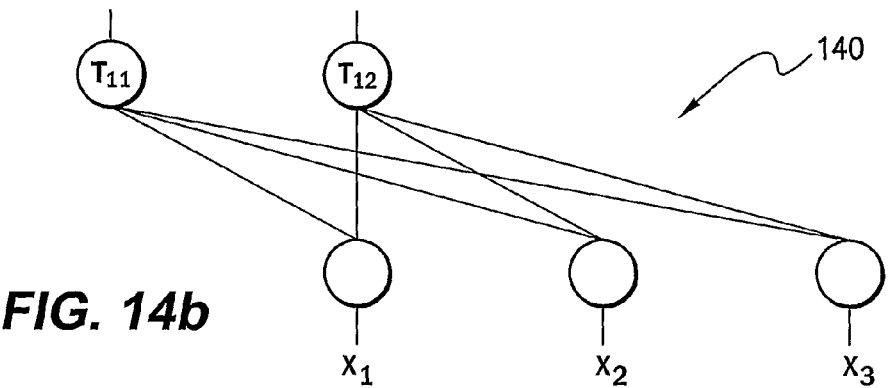

This has a solution when checked at blocks 42. However, adding the following constraint does not have a solution: $w_{111}+w_{112}+w_{113}<T_{11}$ Hence $LTG_{11}$ will output a 1 instead of 0 for input vector [1 1 1]. A new LTG, $LTG_{12}$, is added into NN 140 in accordance with process 50 of FIG. 4 to learn the input vector [1 1 1]. See FIG. 14b for the new topology of NN 140. Constraint $\{w_{121}+w_{122}+w_{123}<T_{12}\}$ is added to $LTG_{12}$'s constraint set (block 55). The information that $LTG_{11}$ has learnt is copied over and modified and $LTG_{12}$'s constraint set becomes: $\{w_{121}+w_{122}+w_{123}<T_{12}, 0\geq T_{12}, w_{123}\geq T_{12}, w_{122}\geq T_{12}, w_{122}+w_{123}\geq T_{12}, w_{121}\geq T_{12}, w_{121}+w_{122}\geq T_{12}\}$.

Figure 14C:
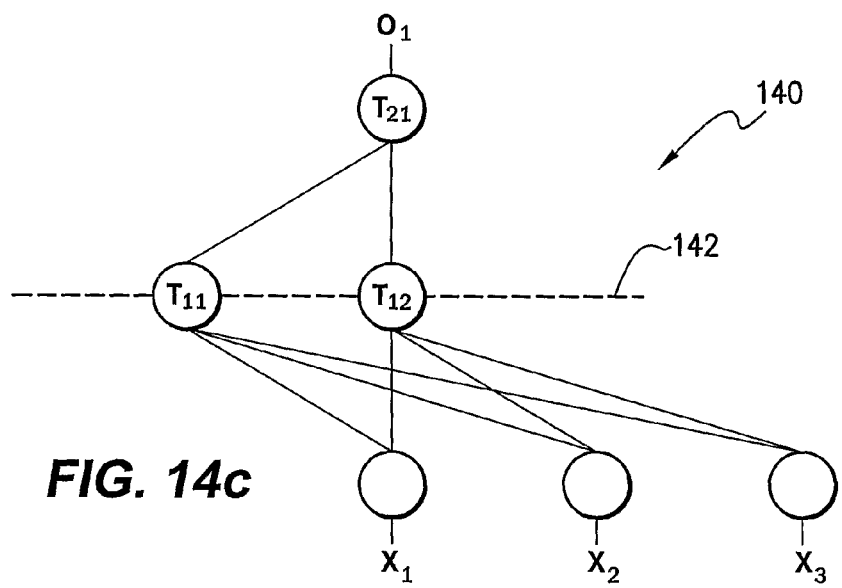

Since $LTG_{11}$ is currently the output (check block 48), a new output LTG, $LTG_{21}$ is added to NN 140 in accordance with process 60 of FIG. 5. See FIG. 14c for the new topology of NN 140. Since the output was 1 instead of 0, this means that the new output, $LTG_{21}$, will form an AND between $LTG_{11}$ and $LTG_{12}$ (block 63).

Since $LTG_{21}$ is to form AND between its input, its constraints set becomes: $\{0<T_{21}, w_{211}<T_{21}, w_{211}+w_{212}\geq T_{21}, w_{212}<T_{21}\}$.

The constraints sets for the 3 LTGs required to learn the first output, $O_1$ are: $LTG_{11}$: $\{0<T_{11}, w_{113}<T_{11}, w_{112}<T_{11}, w_{112}+w_{113}\geq T_{11}, w_{111}\geq T_{11}, w_{111}+w_{112}\geq T_{11}, w_{111}+w_{112}+w_{113}\geq T_{11}\}$; $LTG_{12}$: $\{w_{121}+w_{122}+w_{123}<T_{12}, 0\geq T_{12}, w_{123}\geq T_{12}, w_{122}\geq T_{12}, w_{122}+w_{123}\geq T_{12}, w_{121}\geq T_{12}, w_{121}+w_{122}\geq T_{12}\}$; and $LTG_{21}$: $\{w_{211}<T_{21}, w_{211}+w_{212}\geq T_{21}, w_{212}<T_{21}, 0<T_{21}\}$.

Figure 14D:
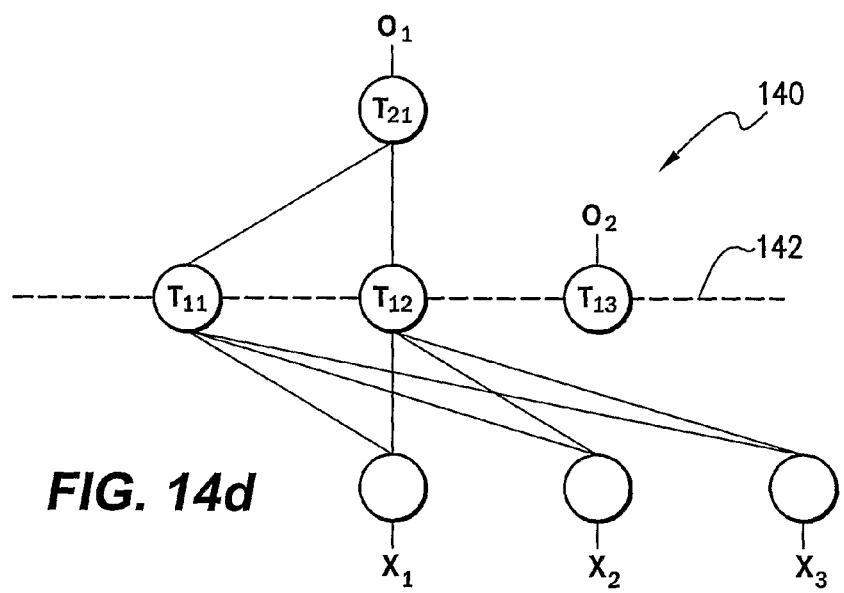

Now that the output for output, $O_1$ has been trained, the process moves to training output $O_2$ (returns to block 32 after a check at block 35). The data is ordered (block 33) as listed in Table 2. It is important to note that input vector [1 0 1] has been left out for testing purposes. FIG. 14d gives a schematic diagram of the initial output LTG, $LTG_{13}$ for $O_2$, with existing NN 140.

TABLE 2

The 2$^{nd}$ output for the Modulo-8 Data Set.

| Input | | | Output |
|---|---|---|---|
| $x_1$ | $x_2$ | $x_3$ | $O_2$ |
| 0 | 0 | 0 | 0 |
| 0 | 0 | 1 | 1 |
| 0 | 1 | 0 | 1 |
| 1 | 0 | 1 | 1 |
| 0 | 1 | 1 | 0 |
| 1 | 0 | 0 | 0 |
| 1 | 1 | 1 | 0 |

$LTG_{13}$ learns (block 34) the constraints $\{0<T_{13}, w_{133}\geq T_{13}, w_{132}\geq T_{13}, w_{131}+w_{123}\geq T_{13}\}$.

Figure 14E:
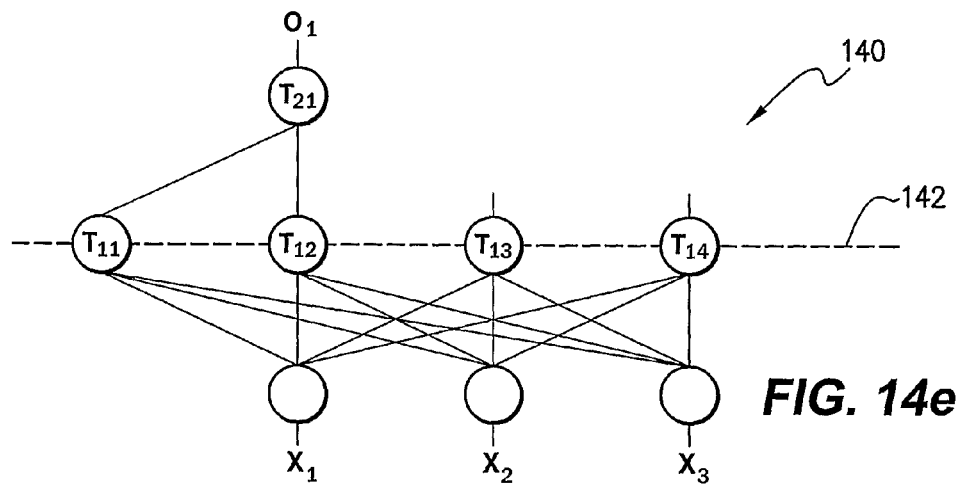

However adding the constraint for input vector [0 1 1] to the constraint set, $w_{133}+w_{132}<T_{13}$ has no solution when checked at blocks 42 of process 40 in FIG. 3. A new LTG, $LTG_{14}$ is allocated to NN 140 to form a hidden layer 142 with $LTG_{13}$ in accordance with process 50 illustrated in FIG. 4. $LTG_{14}$ will learn (block 55) the constraint $w_{143}+w_{142}<T_{14}$ for input vector [0 1 1]. See FIG. 14e for the new topology of NN 140.

Since $LTG_{13}$ outputs 1 instead of the required 0 for input vector [0 1 1], it means the output LTG must form an AND between its input (block 54).

Figure 14F:
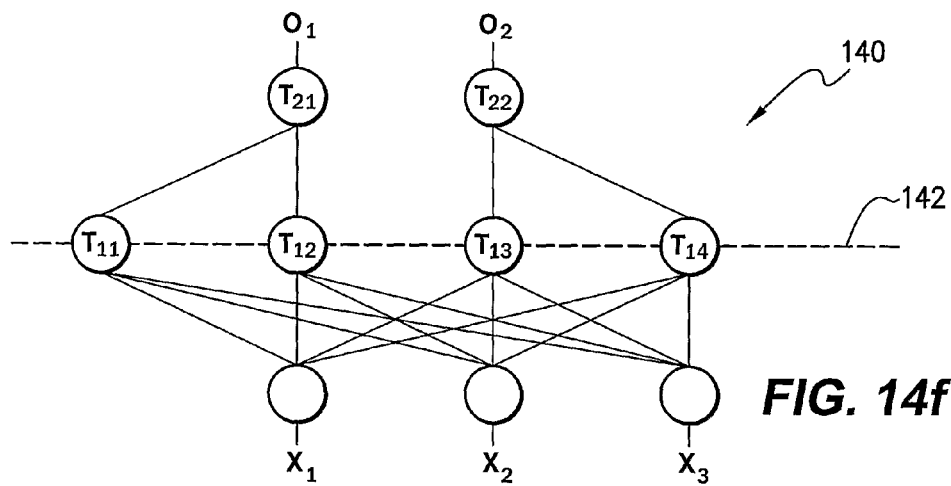

Hence why new $LTG_{14}$ is added to learn this condition, and $LTG_{14}$ learns the input vector [0 1 1]. $LTG_{14}$: $\{0\geq T_{14}, w_{143}+w_{143}<T_{145}, w_{143}\geq T_{143}, w_{142}\geq T_{14}\}$ Again a new output LTG, $LTG_{22}$ is added for output $O_2$ in accordance with process 60 of FIG. 5, which learns to combine its input by using AND (block 63), so it produces the constraint set: $\{0<T_{22}, w_{223}<T_{22}, w_{223}+w_{224}\geq T_{22}, w_{224}<T_{22}\}$. See FIG. 14f for the schematic of new topology of NN 140.

$LTG_{13}$ learns the next vector [1 0 0], and its constraint set becomes: $LTG_{13}$: $\{0<T_{13}, w_{133}\geq T_{13}, w_{132}\geq T_{13}, w_{131}<T_{13}, w_{131}+w_{132}\geq T_{13}\}$. The constraint set for $LTG_{14}$ becomes: $LTG_{14}$: $\{w_{143}+w_{143}<T_{14}, w_{143}\geq T_{14}, w_{142}\geq T_{14}, 0\geq T_{14}, w_{141}\geq T_{14}\}$.

The constraint the final vector [1 1 1] forms cannot be learnt by $LTG_{13}$ but it can be learnt by $LTG_{14}$, so the final constraints' sets for all three LTGs are listed here: $LTG_{13}$: $\{0<T_{13}, w_{133}\geq T_{13}, w_{132}\geq T_{13}, w_{131}<T_{13}, w_{131}+w_{132}\geq T_{13}, w_{131}+w_{132}+w_{133}\geq T_{13}, w_{133}+w_{132}\geq T_{13}\}$; $LTG_{14}$: $\{0\geq T_{14}, w_{143}+w_{142}<T_{14}, w_{143}+w_{142}+w_{141}<T_{14}, w_{143}\geq T_{14}, w_{142}\geq T_{14}, w_{141}\geq T_{14}, w_{141}+w_{142}\geq T_{14}\}$; and $LTG_{22}$: $\{0<T_{22}, w_{223}<T_{22}, w_{223}+w_{224}\geq T_{22}, w_{224}\geq T_{22}\}$.

Figure 14G:
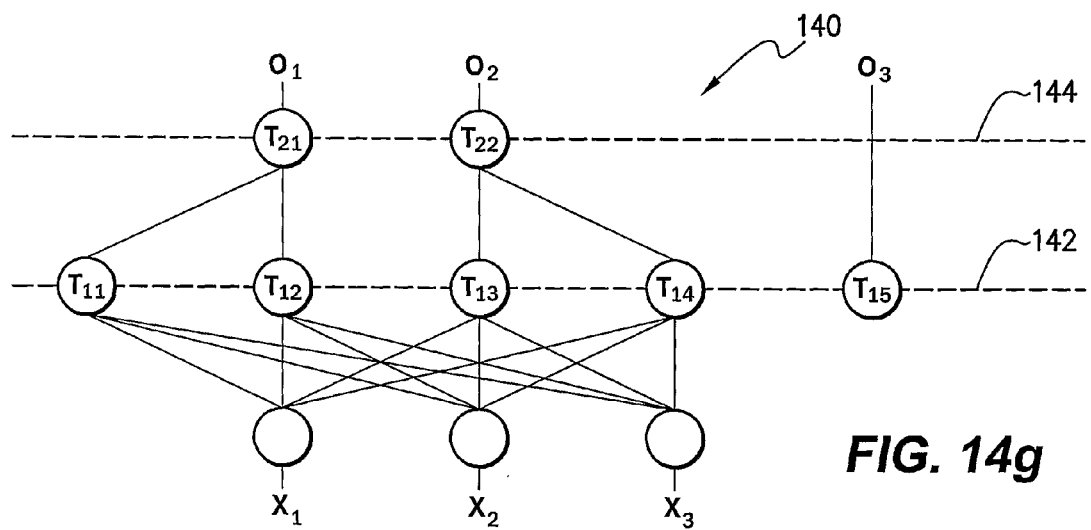

Now that the second output has been trained, the last output, $O_3$ must be trained (returns to block 32 after a check at block 35). It is initially found at block 34 (using process 40 of FIG. 3) that $LTG_{15}$ learns the following constraint set: $LTG_{15}$: $\{0\geq T_{15}, w_{153}<T_{15}, w_{152}\geq T_{15}, w_{153}+w_{152}<T_{15}, w_{151}\geq T_{15}, w_{151}+w_{152}+w_{153}<T_{15}, w_{152}+w_{151}\geq T_{15}\}$. FIG. 14g shows a schematic diagram of the initial output LTG, $LTG_{15}$ for $O_3$, with existing NN 140.

$LTG_{15}$ has been exposed to the full training set and has a solution when checked at blocks 42, therefore no new LTGs need to be added to NN 140 and so FIG. 14g becomes the schematic diagram of the final fully trained NN 140 which has learnt the Modulo-8 data set.

Figure 12:
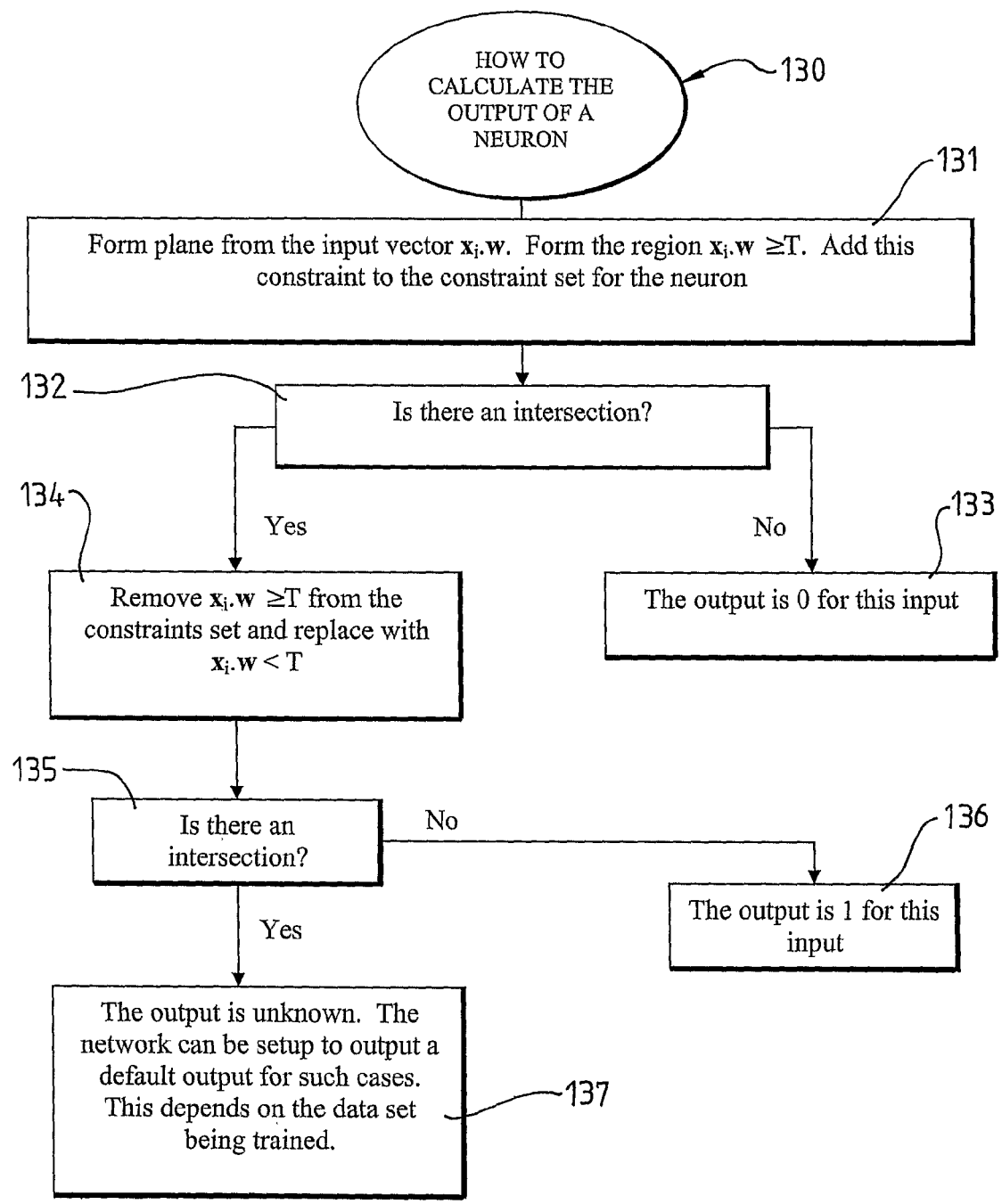
FIG. 12 is a flow diagram illustrating a method of determining whether input vectors of a constraints set are known or unknown, made in accordance with a preferred embodiment of the present invention.

It will now be considered how to deduce the unseen input in accordance with the method 130 of determining whether input vectors are known or unknown shown in FIG. 12.

Deducing the Output for the Test Input Vector:

It will now be evaluated how well NN 140 classifies unseen input vectors, in this case the unseen input vector is [1 0 1] and its associated output is [1 1 0]. If it can, then NN 140 can generalise from the data it has been trained with.

First, output, $O_1$ will be deduced: Since $T_{11}>0$, $w_{113}<T_{11}$, $w_{112}<T_{11}$ and $w_{112}+w_{113}\geq T_{11}$, so, $0<w_{113}<T_{11}$ and given $w_{111}\geq T_{11}$, therefore $w_{111}+w_{113}\geq T_{11}$. Hence the output of $LTG_{11}$ is 1. Also there is no solution if the constraint $w_{111}+w_{113}<T_{11}$ is added to $LTG_{11}$'s constraint set.

Adding both constraints $w_{121}+w_{123}<T_{12}$ and $w_{121}+w_{123}\geq T_{12}$ have a solution (block 137), the default in cases such as these is to output 1.

Since $LTG_{21}$ has $1\cdot w_{211}+1\cdot w_{212}$ and since $w_{211}+w_{212}\geq T_{21}$, then, $O_1$ will be 1.

The output for $O_2$ will now be deduced: Since $LTG_{13}$ can learn either $w_{131}+w_{133}\geq T_{13}$ and $w_{131}+w_{133}<T_{13}$ the output of $LTG_{13}$ is 1.

$LTG_{14}$ can also learn either $w_{141}+w_{143}\geq T_{14}$ and $w_{141}+w_{143}<T_{14}$ so it will output 1. Since $LTG_{22}$ has $1\cdot w_{231}+1\cdot w_{242}$ and since $w_{231}+w_{232}\geq T_{22}$, then, $O_3$ will be 1.

Finally, the output for $O_3$ will be deduced: Since $w_{151}+w_{152}+w_{153}<T_{15}$ and $0\geq T_{15}$ and $w_{151}+w_{152}\geq T_{15}$ then $w_{153}<T_{15}<0$. Despite $w_{151}\geq T_{15}$, $w_{151}+w_{152}+w_{153}<T_{15}$, therefore the output will be 0.

Hence, the correct output was deduced, or generalised as [1 1 0]. FIG. 14g shows the resultant NN 140. It is seen that connections are only made between the hidden layer and the output layer as necessary, also a hidden layer LTG is only added when required, as in $O_3$.

In this NN 140, it is interesting to note that there are far fewer training examples than there are weights and thresholds in the NN, and the NN acts as fully trained. It is a commonly held belief that many more input vectors are required to train a NN than the number of weights and thresholds in the NN. It was seen in this example that this is not so in all cases, that more training examples are needed than variables. This is because each input vector trains each weight in this DR training method 30.

The Number of LTGs in the Example:

When using DR training algorithm 30 of the present invention, seven LTGs were required to learn the data set in this example. It can be seen in FIG. 14g, that LTGs in the output layer 144 only receive input from those LTGs in hidden layer 142 that they require input from. Also, no unnecessary LTGs are allocated to NN 140. For example, since $LTG_{15}$ can produce the required output in all cases, no additional LTGs are added to produce $O_3$.

Now it has been demonstrated how DR training algorithm 30 works with an example, it will be examined how useful this algorithm is in extracting rules learnt during training by the NN.

Applicability of DR Training Algorithm for Rule Extraction

A significant advantage of DR training algorithm 30 of the present invention is that it can be used for rule extraction, because it exhibits at least the following properties:

a) When an LTG is added into a NN the propositional logic rule is determined between the new LTG and the other LTGs in that layer;

b) The weights are adapted by adding constraints on the volume in the weight-space, which reduce the region that causes the LTG to activate. This is because the LTG uses constraints, which are planes that delimit the activation region in the weight-space for the LTG. This allows the weight-space to be defined symbolically; and c) The preferred constraints define relationships between the weights and the threshold within the LTG, which encode the rules learnt by the NN during training.

As there is mapping between the input vector and the hyper-planes which delimit the volume in the weight-space that cause the LTG to activate, it is possible to find those precise input vectors which provide the most information. A discussion of the ability of the DR training algorithm 30 to find those input vectors that provide the boundaries on the weight-space that activate the LTGs will now be provided.

The objective of training feed-forward NNs with traditional methods is to find a single numerical value for each weight in the NN that represents the best possible average value that satisfies the training conditions of the data set that the NN has learnt. As all the weights (and threshold) for each LTG in a NN are represented as a single (hopefully) average numerical value, much of the information in the data set is lost during learning. Some of the information that is of interest but which is lost during training is all the surface information of the region that causes the LTG to activate. As most LTGs have more than two inputs, this region is defined in the LTG's weight-space as a (hyper) volume. Hence, the region that causes a LTG to activate is called the 'Activation Volume'. From the surface information: (a) The relationships between the inputs into the LTG, and hence the NN, can be determined; and, (b) The range of values that each weight can assume, which permits the NN to behave as required, can be derived.

Performing a sensitivity analysis on NNs trained with traditional methods is one way of attempting to retrieve this lost surface information.

While sensitivity analyses will not determine the relationships between the weights and inputs into the neuron, it can be used to determine the range of values each of the system's components can take that allows the system to perform as required. In this case the components are the weights for each of the neurons in the NN. Each weight has a range of values that allows the NN to perform as it is trained to. This range can be called the 'optimal range'.

The usual approach for performing sensitivity analyses on NNs trained with traditional training methods is to perform a statistical analysis of the NNs response. Statistical analyses are performed to study the general behaviour rather than the actual behaviour of neurons because there has been no analytical method of determining the ranges for each weight in the neuron's weight-space. Also, a sensitivity analysis will only allow the effect of modifying more than one weight at a time to be studied, when neurons are trained via traditional methods. Hence it is not possible to determine how well the single numeric values for the weights represent the average value of the relationships the neurons are required to learn.

However the best a sensitivity analysis can do is get statistical estimates of the ranges of weights in neurons. A sensitivity analysis has no way at all of being able to determine the surfaces of the activation volume. This is because the weights are examined one at a time, and it is hoped that each of the other weights is somewhat near its average value when the sensitivity analysis is being performed.

With DR training algorithm 30 of the present invention the surface information can be retrieved that allow the system to: (a) Determine the relationships between the weights and hence the inputs into the LTG; and, (b) Find more than the statistical ranges of the weights for each LTG. Not only can the exact range of the weights be determined, but also the surfaces of the activation volume that cause the LTG to activate can be determined.

As DR training algorithm 30 trains the LTGs preferably as a set of constraints none of the information about the training set is lost during training and these constraints can be analysed to find the ranges of the weights.

According to a further aspect of the present invention, a preferred method 150 that allows the surfaces of the activation volume for each LTG to be determined will now be discussed with reference to the flow diagram of FIG. 15.

The Activation Volume:

It has been shown earlier how to train a NN to learn a data set where the LTGs were trained by applying input vectors to the NN. The input vectors were converted to constraints, using the formula $x_i \cdot w$ that forms a (hyper) plane that bisects the weight-space. As $x_i \cdot w$ forms a constraint with the threshold T, a (hyper) volume is defined by the constraint such that:
a) If the LTG has learnt the constraint $x_i \cdot w \geq T$ then it means that this region or a subset of this region will cause the LTG to be activated, depending on the other constraints the LTG has learnt. The complement constraint, $x_i \cdot w < T$, defines a region which will entirely fail to activate the LTG; and,
b) If the LTG has learnt the constraint $x_i \cdot w < T$ then this region will not cause the LTG to activate. However, points that satisfy the complement constraint $x_i \cdot w \geq T$ may cause the LTG to active.

Hence, the (hyper) plane $x_i \cdot w$ forms a surface of that region that may cause the LTG to activate. When a number of input vectors have been learnt, then a volume is defined in the weight-space that may cause the LTG to activate and can be called an Activation Volume. To implement this computationally, each input vector's constraint is stored with each LTG that it can learn. This can result in redundancy of constraints as only the constraints that form the surface of the minimum volume in the weight-space that activates the LTG are of interest. To find the surfaces of the Minimum Activation Volume (hereinafter "MAV") in the weight-space, the constraints can be analysed. The surfaces of the activation volume contain all the information that the other constraints in the constraint set provide.

A MAV is the minimum volume constrained by the constraints that the LTG has learnt thus far given the training it has received. It is possible that this is not the minimum possible volume, as there may be other vectors not available during training that would further reduce the activation volume.

The other constraints learnt during training, which are not in the MAV, form something like contours about the MAV.

Once the surfaces of the MAV have been found the range of each weight can be determined by examining the MAV and also the relationships between the weights.

In summary, the constraints learnt during training are analysed to find the MAV. The MAV can be used to ascertain the ranges of weights for each LTG and the relationships between the weights, if performing a traditional sensitivity analysis.

Traditional training algorithms used to train LTGs in feedforward NNs have relied on finding a single numeric value for each input connection weight. Since each LTG has n input, the incoming connection weights can be considered as a vector. The single numeric values of these weights do not solve the training conditions uniquely, as there are a range of numeric values that satisfy the training conditions.

The training process when determining a single numeric value for the weights attempts to locate an average numeric value that represents the relationships between the weights that represent the rules embedded in the data that the NN is to learn during training.

However, it is the boundaries of the activation volume that define the relationships between the weights which in turn define which features in the input vectors are salient to the classification of the data set. That is why it is necessary to be able to determine the boundaries of the activation volume of a LTG if rule extraction can be performed. When using traditional training methods, information about which dimensions of the input vector are crucial to the classification of the data set is lost when the training algorithm focuses on finding an average value that solves the training conditions. Statistical methods and probability have been used to explain the behaviour of NNs. However both statistics and probability explain average behaviour of trained NNs, trained with random data sets and not specific information about NNs that have learnt a specific data set. The requirement of rule extraction from NNs is to determine the specific rules that allow a specific data set to be classified. Since the boundaries of the activation volume of neurons trained numerically cannot be determined, it is not possible to determine how well the numeric value the weight values found during training approximate the average behaviour of relationships inherent within the training set.

As the precise activation volume for each trained LTG can be ascertained, finding the MAV removes redundant surfaces from the volume, leaving the smallest possible volume that defines what the LTG has learnt. From this what rules the LTG and hence the NN has learnt during training can be determined, therefore this justifies finding the MAV.

Determining the Minimum Activation Volume (MAV)

During training of a NN a number of constraints are learnt. The shape of the activation volume depends on the data set the LTG is learning. It may be unbounded in one or more dimensions.

Figure 16A:
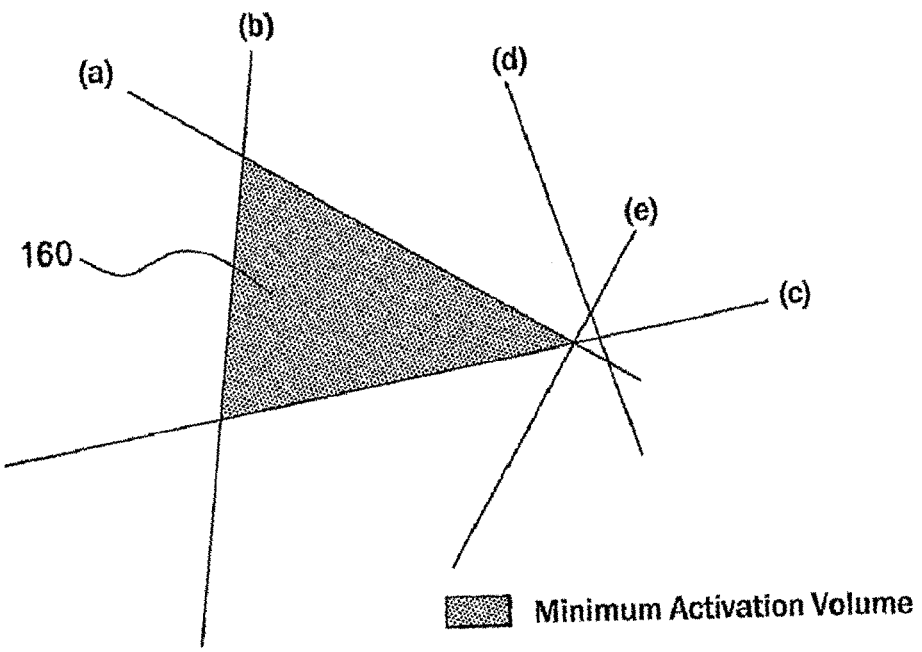
FIGS. 16a to 16e show generalised diagrams of the activation volume as well as other constraints learnt during training of a NN in accordance with a preferred embodiment of the present invention.

FIG. 16a depicts a generalised diagram of the activation volume as well as other constraints learnt during training. The constraints they form with the threshold must intersect the activation volume; otherwise the LTG could not learn the constraint.

Figure 16B:
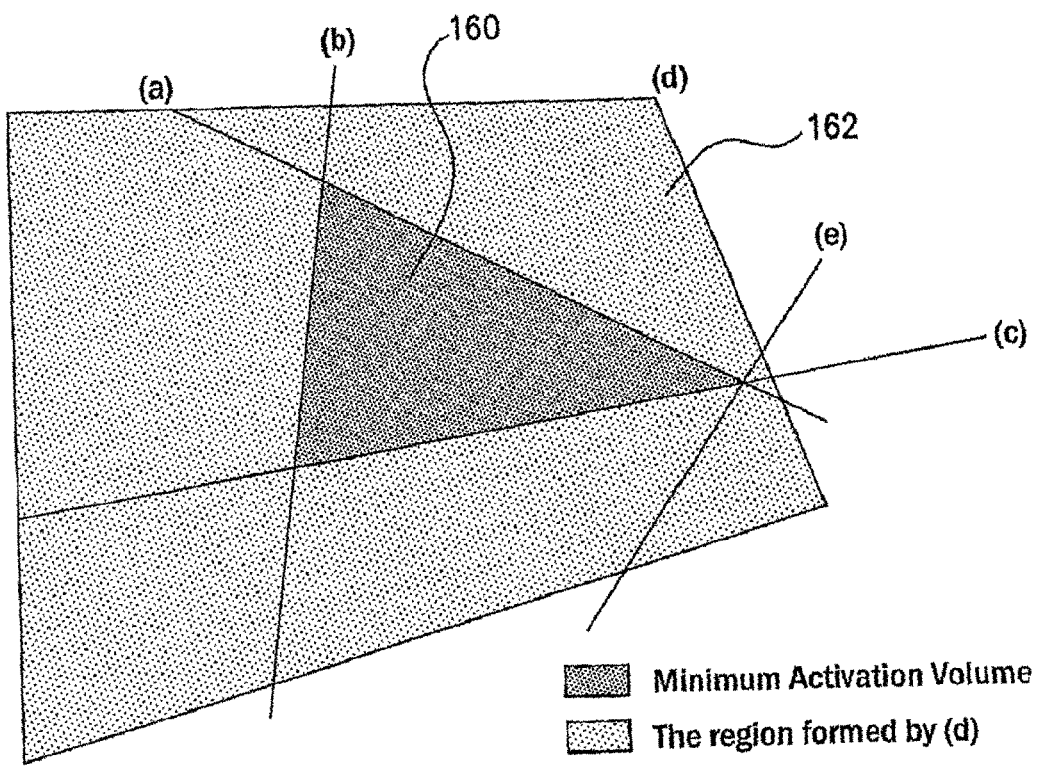

In FIG. 16a, surfaces (a), (b), (c), (d) and (e) are (hyper) planes formed by the various input vectors $x_i$ and w. The MAV 160 is bounded by surfaces defined by (a), (b) and (c) in FIG. 16a. The surfaces (d) and (e) do not intersect MAV 160, and hence do not form surfaces of the minimum volume. However the volume that they form does intersect MAV 160. As can be seen in FIG. 16b, the volume 162 formed by the surface (d), which is the light grey shaded region, intersects MAV 160, which is the dark grey region.

Figure 16C:
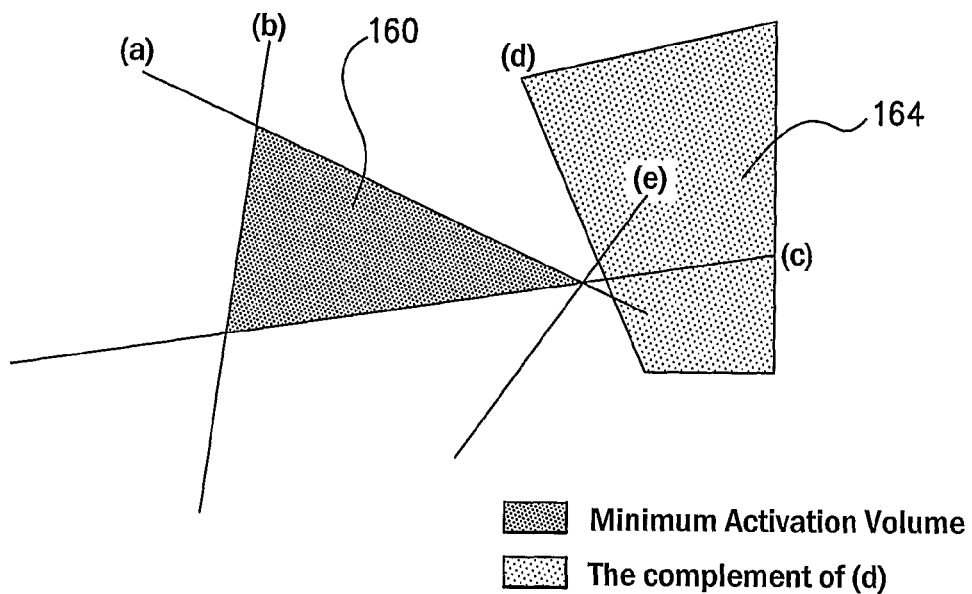

In FIG. 16c, it can be seen that the complement region 164 formed by the surface (d) does not intersect (dark grey) MAV region 160, therefore it can't be learnt.

Figure 16D:
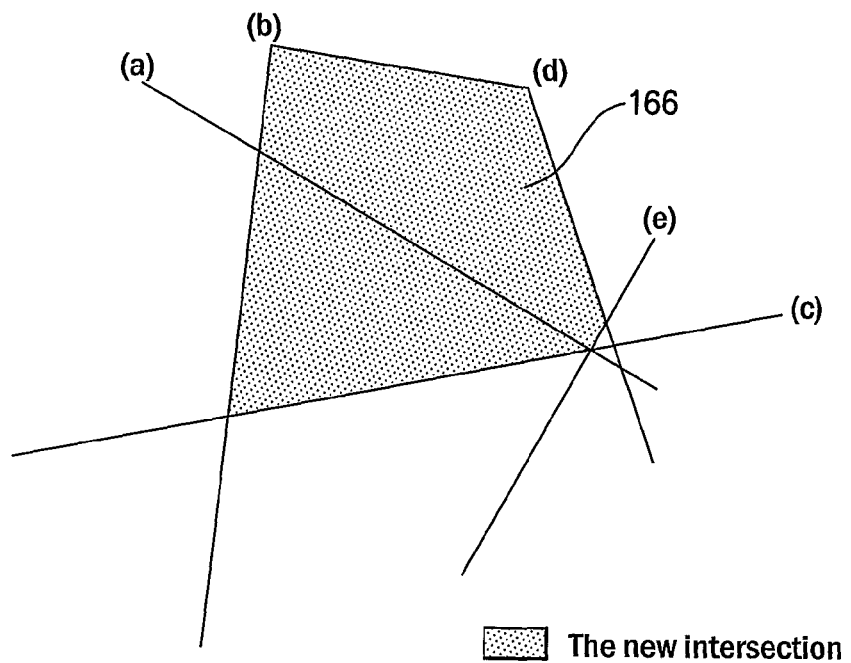

When analysing the constraints that the LTG has learnt, the complement of the constraints that do not form the minimal volume, i.e. (d) in FIG. 16d, cannot be learnt when constraint (a) is present, as seen in FIG. 16c. When (a) is removed then the complement of (d), see FIG. 16d, can be learnt, because an intersection 166 exists between the constraints that form MAV 160 and the complement of (d). In FIG. 16d, surface (a) remains in the drawing to illustrate its original location.

Figure 16E:
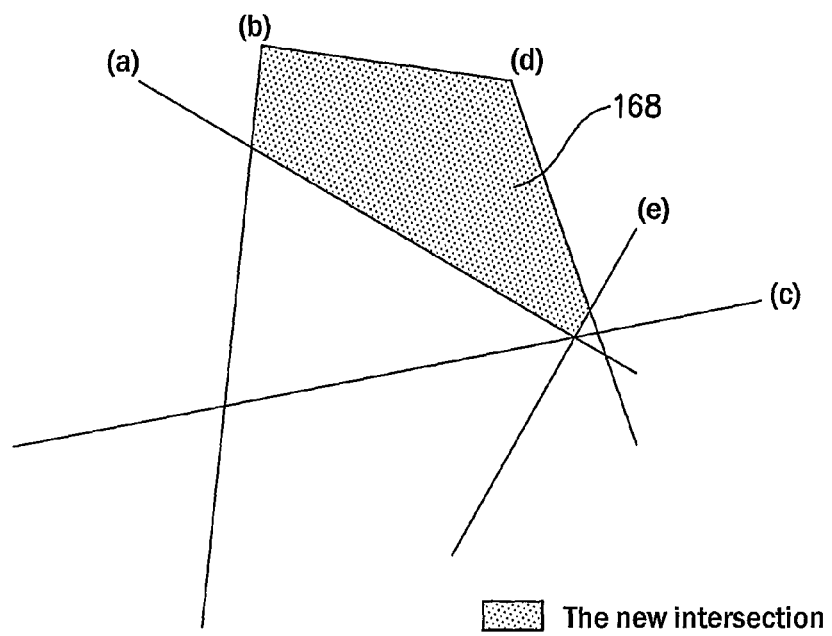

However, the LTG can learn the complement of constraint (a), when (d) and (e) are present, see FIG. 16e. In other words, an intersection 168 exists between the complement of (a), the other constraints that form MAV 160, and the other constraints already learnt by the LTG.

Theorem:

A constraint forms a surface of the activation volume if, when it is removed from the constraint set, its complement can be learnt.

Proof:

When a constraint forms a surface on the activation volume it means that there are no constraints between it and any of the other constraints that form surfaces of the activation volume that are constraining the relationship between $X_i \cdot w$ and the threshold T. Hence, the complement of a constraint can be learnt by the LTG when the constraint, which forms a surface of the activation volume, is removed.

This will now be illustrated by way of an example. If an LTG has learnt the following constraint set during training: $\{w_1+w_2<T, w_2 \geq T\}$; It is known that the plane $w_2=T$ forms a surface of the MAV because if the constraint $w_2 \geq T$ is removed from the constraint set, then the LTG will be able to learn its complement, $w_2<T$.

However, if an LTG has learnt the following constraint set during training: $\{w_1+w_2 \geq T, w_2 \geq T, 0<T, w_1 \geq T\}$; It is known that the plane $w_1+w_2=T$ is not on the surface of the MAV because if the constraint $w_1+w_2 \geq T$ is removed from the constraint set, the LTG cannot learn the complement $w_1+w_2<T$ instead.

A preferred embodiment of a method 150 of finding the MAV will now be described with reference to FIG. 15.

For each constraint in the constraint set of this LTG as represented by block 151, at least the following operations are performed: At block 152, remove each constraint from the constraint set one at a time, while leaving the rest of the constraints in the set unchanged; The constraint that is removed has its complement added to the set and then is tested, at block 153, to see if there is a solution; If there is a solution, then, at block 154, the constraint originally removed from the constraint set is added to the set defining the MAV; The complement of the original constraint is removed from the constraint set and the original returned to it; If there is no solution, then, at block 155, the method 150 continues onto the next constraint if it is determined at block 156 that there is more constraints in the constraint set; and, this method 150 is repeated (returns to block 152) for each constraint in the constraint set that the LTG learnt during training. If it is determined at block 156 that there are no more constraints, method 150 concludes at block 157.

The constraints added to the minimum set for the activation define the MAV, given the training that this LTG has received. These constraints can now be used to analyse the volume, to find the relationships between the weights within the LTG and to perform a sensitivity analysis on the LTG where it can be found precisely when the weights will move out of range, if desired.

It should be appreciated that the method 150 of finding the MAV is not just limited to NNs. It is considered that the method 150 of finding the MAV is also useful for other fields which use systems of constraints, such as CSPs which are used for optimisation and operational research type problems. This aspect of the present invention is therefore independent and not limited to use with DR training algorithm 30 of the present invention.

An Example of how to Determine the MAV

Assume that an LTG is trained with the following constraints: $\{0<T, w_1+w_2<T, w_1<T, w_2<T, w_3<T, w_1+w_3<T, w_2+w_3<T, w_1+w_2+w_3 \geq T\}$. It is known that there is a solution for the above constraints. Method 150 commences at block 151.

Firstly, at block 152, $0<T$ is removed, and the constraint $0 \geq T$ is added, so the constraint set under consideration becomes: $\{0 \geq T, w_1+w_2<T, w_1<T, w_2<T, w_3<T, w_1+w_3<T, w_2+w_3<T, w_1+w_2+w_3 \geq T\}$.

These constraints can be tested, at block 153, with Siestas prolog routines or any other suitable routine. No solution for these constraints is found at block 153, so it is known that $0<T$ is not one of the constraints that form a surface on the MAV. This constraint can be removed on the remaining set, at block 155, as the rest of the constraints contain all this information, in other words, this constraint provides no new information about what has been learnt by the LTG.

The next constraint, $w_1+w_2<T$, is then tested at block 152 after a check at block 156. This constraint is removed and its complement is added to the set: $\{w_1+w_2 \geq T, w_1 \geq T, w_2<T, w_3<T, w_1+w_3<T, w_2+w_3<T, w_1+w_2+w_3 \geq T\}$. In this case a solution is found at block 153, so it can be said that the original constraint is important to what the LTG has learnt, and must remain (block 154) in the constraint set.

The next constraint to be tested at block 152 is $w_1<T$. This constraint is removed and its complement is added to the set: $\{w_1+w_2<T, w_1 \geq T, w_2<T, w_3<T, w_1+w_3<T, w_2+w_3<T, w_1+w_2+w_3 \geq T\}$. When these constraints are tested at block 153, it is found that there is no solution. Hence the constraint $w_1<T$ can be removed at block 155.

The next constraint to be tested at block 152 is $w_2<T$. This constraint is removed and its complement is added to the set: $\{w_1+w_2<T, w_2 \geq T, w_3<T, w_1+w_3<T, w_2+w_3<T, w_1+w_2+w_3 \geq T\}$. When testing these constraints at block 153, no solution is found. Hence the constraint $w_2<T$ can be removed at block 155.

The next constraint to be tested at block 152 is $w_3<T$. This constraint is removed and its complement is added to the set: $\{w_1+w_2<T, w_3 \geq T, w_1+w_3<T, w_2+w_3<T, w_1+w_2+w_3 \geq T\}$. When these constraints are tested at block 153, no solution is found. Hence the constraint $w_3<T$ can be removed at block 155.

The next constraint to be tested at block 152 is $w_1+w_3<T$. This constraint is removed and its complement is added to the set: $\{w_1+w_2<T, w_1+w_3 \geq T, w_2+w_3<T, w_1+w_2+w_3 \geq T\}$. In this case, a solution is found when tested at block 153, and hence the original constraint is important to what the LTG has learnt, and must remain in the constraint set as represented by block 154.

The next constraint to be tested at block 152 is $w_2+w_3<T$. This constraint is removed and its complement is added to the set: $\{w_1+w_2<T, w_1+w_3<T, w_2+w_3\geq T, w_1+w_2+w_3\geq T\}$. In this case a solution is found at block 153, and hence the original constraint is important to what the LTG has learnt, and must remain in the constraint set (block 154).

The next constraint to be tested at block 152 is $w_1+w_2+w_3\geq T$. This constraint is removed and its complement is added to the set: $\{w_1+w_2<T, w_1+w_3<T, w_2+w_3<T, w_1+w_2+w_3<T\}$. In this case a solution is found at block 153, and hence the original constraint is important to what the LTG has learnt, and must remain in the constraint set, again as represented by block 154.

Hence the minimum constraints set is determined by method 150 to be: $\{w_1+w_2<T, w_1+w_3<T, w_2+w_3<T, w_1+w_2+w_3\geq T\}$.

The Order for Testing Constraints:

The order that constraints are tested in the constraint set by the method 150 of determining the MAV of the present invention is not important Constraints may be selected from any place in the set to be tested. Also it is irrelevant whether the constraints that form the MAV or not are chosen to be tested first. The present invention is therefore not limited to the specific example provided.

Information Contained within the MAV:

The MAV contains all the information about the constraints learnt. It is possible to remove constraints that do not form surfaces of the MAV, since all the information about what the LTG has learnt is contained within the surfaces of the MAV. There is no need to recover the constraints, but it will be demonstrated that it can be done.

An Example:

Given the minimum activation volume of: $\{w_1+w_2<T, w_1+w_3<T, w_2+w_3<T, w_1+w_2+w_3\geq T\}$; the set of removed constraints is: $\{0<T, w_1<T, w_2<T, <T\}$.

It can be demonstrated that the removed constraints can be recovered by adding the constraint to the LTG and its complement. This is shown to demonstrate that no information is lost when the MAV is found for an LTG and hence lossless compression of the data learnt during training.

If this constraint had been tested previously with the other removed constraints, it would still be able to learn the complement of this constraint.

Testing $0<T$ with the MAV:

Adding $0<T$ to the MAV has a solution. However, adding $0\geq T$ to the MAV, does not have a solution. Therefore the LTG will still continue to behave as originally trained, before the vector $0<T$ was removed from the constraints set.

Testing $w_1<T$ with the MAV:

Adding $w_1<T$ to the MAV, has a solution. However, adding $w_1\geq T$ to the MAV, does not have a solution. Therefore the LTG will still continue to behave as originally trained, before the vector $w_1<T$ was removed from the constraints set.

Testing $w_2<T$ with the MAV:

Adding $w_2<T$ to the MAV, has a solution. However, adding $w_2\geq T$ to the MAV, does not have a solution. Therefore the LTG will still continue to behave as originally trained, before the vector $w_2<T$ was removed from the constraints set.

Testing $w_3<T$ with the MAV:

Adding $w_3<T$ to the MAV, has a solution. However, adding $w_3\geq T$ to the MAV, does not have a solution. Therefore the LTG will still continue to behave as originally trained, before the vector $w_3<T$ was removed from the constraints set it.

In other words, the original constraints set: $\{0<T, w_1<T, w_2<T, w_3<T, w_1+w_2<T, w_1+w_3<T, w_2+w_3<T, w_1+w_2+w_3\geq T\}$; and the minimum constraint set: $\{w_1+w_2<T, w_1+w_3<T, w_2+w_3<T, w_1+w_2+w_3\geq T\}$ is equivalent in terms of the LTG's behaviour.

There are many benefits of finding the MAV. Some of these benefits are: (a) It potentially reduces the number of constraints required to be tested during learning and when determining the LTGs output; (b) It allows a sensitivity analysis to be performed on the trained LTG, if desired; and, (c) It allows the relationships between the weights to be determined.

Function minimisation techniques, such as Quine-McCluskey and iterated consensus, can be used on those input vectors constructed with independent inputs, after all the redundant input vectors have been removed, which is what is done when the MAV is found.

Performance Evaluation of the DR Training Algorithm

The results of experiments performed on DR training algorithm 30 of the present invention will now be described. These experiments evaluate the performance of the DR training algorithm 30 of the invention.

One of the primary aims of DR training algorithm 30 of the invention is to find the rules within data sets that allow the NN to produce the input vector's associated output.

Hence, the aim of the experiments conducted was to demonstrate that the DR algorithm 30 is an algorithm that will learn a variety of data types and will allow the rules to be extracted from the trained NN.

The standard procedure followed in these experiments was: (a) There was some data preparation; (b) The NN was trained with the data (c) The NN was tested to determine whether it could produce the output associated with the input vectors it was trained with and then could correctly produce output for input vectors that were unseen during the training process; (d) A comparison was made between NNs trained with backpropagation and the DR training algorithm 30 of the invention in terms of the percentage of correct input vectors from the test set. The test set was set aside for testing before the NNs were trained. This percentage was then compared with available results for other learning algorithms; and, (e) The number of exposures to the training input vectors required to train the NN was recorded.

Apart from quantifying the learning time for a data set by DR, another issue that was addressed is the determination of the rules learnt by the NN during training. The rules were extracted by performing a sensitivity analysis on the trained NN using the preferred methods described earlier in accordance with further aspects of the present invention. This provided information about the data set the NN is trained with. The types of data sets used to evaluate the performance of DR training algorithm 30 of the present invention will now be discussed.

Test Domains:

Feed-forward NNs can either be used to classify data or to perform function approximation. These two properties are aspects of the same behaviour since modelling the boundary that classifies data in the input space is equivalent to function approximation. While there are many potential applications that can benefit by using feed-forward NNs, the applications that do use feed-forward NNs are making use of either their function approximation or data classification properties.

For the purposes of evaluating the behaviour of the DR training algorithm 30, data sets were used that perform: (a) Function approximation; and, (b) Data classification.

The data set chosen for evaluating the DR training algorithm's 30 ability to perform function approximation was the Two-Spiral Problem, and for classification the German Credit Problem. Both data sets are standard problems for testing feed-forward NNs.

One data set that is often used for function approximation is the Two-Spiral Problem. This data set (see FIG. 17) is considered to be extremely hard to solve because the data set includes two spirals with a common start point but offset by 180 degrees from each other. Hence it is not easily linearly separable. A neuron generally uses linear separability to divide classes, and for complex data sets a number of neurons to divide the classes. When using Cartesian coordinates to describe the spirals in the Two-Spiral Problem, the data set is not easily linearly separable.

The German Credit Problem has records of 1000 debtors for a German credit institution. The records contain a number of debtor characteristics, such as their age, their residency status, their credit history, if they are employed, what the loan is for, etc, and the classification of the records states whether the debtor is a good credit risk. The objective of the trained NN is to predict whether customers seeking loans should be approved or not. The institution also states a preference for error if they are to occur. They would prefer to falsely identify someone as a bad credit risk than falsely identify someone as a good credit risk.

The formal definitions of these data sets are as follows:

Dataset 1: The Two-Spiral Problem—Alexis Wieland of the MITRE Corporation first suggested this data set. It is defined as having 194 input vectors of two entwined spirals, half of these data points produce output −1 and the other half produce output 1. Each spiral has three periods and 180 degrees separates each spiral. The input vectors have 2-dimensions which represent the floating point Cartesian coordinates of the location of each data point.

Dataset 2: German Credit Problem—this data set was provided by Professor Dr. Hans Hofmann of Universitat Hamburg. It has 1000 examples of clients who applied for credit. Each example is an input vector of 24 positive integer attributes, such as the age of the individual applying for credit, their credit history and other attributes considered relevant to an application for credit. The output of the NN classifies the client as a good or bad credit risk.

The criterion of choice of data sets was to demonstrate that DR learning is (a) As good as backpropagation, in other words it can learn data sets that backpropagation can learn; and (b) Better than backpropagation at letting rules to be extracted from the trained NN.

The German Credit Problem data set was chosen as it is well suited to be learnt by backpropagation, and the Two-Spiral Problem was chosen as it is considered hard for backpropagation to solve.

Data Preparation

Firstly, in accordance with a further aspect of the present invention, preferred methods used to prepare the data (block 31) into the format that will be used to train the NNs with the DR training algorithm 30 in these experiments will be discussed. One objective in preparing the data is to minimise the number of inputs into the NN, while still accurately encoding the data. Minimising the number of input into the NN translates into faster training lime, given that each time an input vector is learnt by the NN, the constraints must be tested to determine whether it can be learnt by the NN. It should be appreciated that the data conversion methods as will now be discussed are not limited to use with DR training algorithm 30 of the present invention. These data conversion methods could be useful for other known training algorithms and as such are considered independent aspects of the invention.

Binary Data:

As discussed earlier, the DR training algorithm 30 of the present invention is preferably trained with binary input vectors of the form $\{0,1\}^n$, where n is the number of input into the NN, which produces binary output. The input vector is converted into constraints that produce the desired output based on the binary value of the required output. If the data is binary, then there is no need to modify the data to be learnt. However, data is often not in a binary format and hence is preferably converted to a binary format before being learnt by the algorithm 30 of the present invention.

Integers:

Each dimension in the input vector represents some attribute of the input. If one of the attributes is an integer, then the integer is preferably converted to binary to be learnt by the DR training algorithm. A preferred embodiment of how the DR training algorithm 30 of the invention can learn integers will now be discussed.

Initially it is necessary to determine the number of bits required for the representation of the attribute in binary. To do this the range of integer values the attribute can take is calculated as: range=(maximum−minimum)+1. The number of bits required is then determined to encode the range in binary.

This is one simple approach to determining the number of bits required for encoding the attribute and does not take into consideration as to whether: (a) The attribute has negative integers. If there are negative integers it is possible to use either two's complement to represent numbers. However, an additional bit must be used to the number of bits used to represent positive values of the attribute. Alternatively, the range could be adjusted so that negative integers are not used; and, (b) The attribute can go out of range. Hence, there may be an attribute with the age of the individual. In the population of input vectors there may only be ages from 18 to 84. However, it may be necessary to expose the trained NN to an age attribute of 85. In this case it may be possible to encode the data in terms of sub-ranges, such as 40 to 59 years old, 60 years and over.

In the German credit data set, there are no negative integers to be considered. However the attribute of the age of the client ranges from 18 to 75. To encode the precise age in that range requires 6 bits. However, it is possible that age ranges may be more useful for encoding clients' ages, for instance, 18 to 25, 25 to 40, 40 to 60, and 60<which would also allow only 2 bits to be used to encode the field. This can be done to minimise the number of inputs into the LTG and still preserve most of the information in the data field. For instance, if trying to determine whether someone will be able to repay a bank loan, it is unlikely that a person of a particular age such as 37 will be more likely to repay a loan than if they are 38. However ranges of ages could play a significant role, given that people over 60 are less likely to be working, than those who are 40.

The number of bits required for encoding the values of attributes needs to be to considered for each attribute separately. Once the number of bits required to encode a range of integer values an attribute can take has been established, then each bit position can be considered as a separate input into the NN. Hence a single attribute may become several inputs into the NN.

This process is used for both input and output.

Floating-Point Data:

Since most data that the NN is to be trained with is floating-point data, it is useful to be able to train the NN to learn this kind of data. Therefore it is useful and preferred that floating-point data is able to be converted to binary data.

As with attributes that are integers, a number of bits must be assigned to represent the floating-point number in binary Again the range of values that the attribute can take is considered, as to whether the attribute could take values out of the range and whether the attribute can take negative values. However, it must also be considered how much precision is required to represent the data points of the attribute and the degree of error that is acceptable when representing the attribute.

This process is used for both input and output.

A preferred embodiment of how the DR training algorithm 30 of the invention can learn floating-point data will now be provided.

For the Two-Spiral Problem, the data set to be learnt is in Cartesian coordinates of form (x,y), where x,y∈R, and the output of the NN indicates which spiral a data point belongs to.

The two classes of data are taken from the polar coordinate formulation for the spiral of Archimedes, r=θ and r=−θ. There are 97 data points on each spiral and each spiral has 3 periods, this makes the points approximately 7.4 degrees apart. The points are then converted to Cartesian coordinates as required by the problem specification.

To ensure that there is adequate precision in the data points the data points are preferably rounded to two decimal places. The data points are then multiplied by 100 and then converted to binary. The twos complement of the number is used for negative floating point numbers. To be able to encode the input vector, 12 binary digits are used for each of the attributes which are the Cartesian coordinates (x,y) of the data point Instead of having two inputs into the NN, there are 24 bits. Limiting the coordinates to 12 binary positions ensures that the input space is accessible with sufficient precision.

An example data point from the spiral is considered, r=−θ in polar coordinates is (−Π/2,Π/2). Converting this point to Cartesian coordinates, the point becomes (0, −1.5708). These values are multiplied by 100 and rounded to the nearest integer and become (0, −157). These values are then finally converted to 12 digit binary numbers (000000000000, 111101100011). The input vector applied to the NN becomes 000000000000111101100011.

Now that binary and floating-point data has been covered, symbolic data will be discussed.

Symbolic Data: Symbolic data is non-numeric data, which is neither binary nor floating point, for computational purposes. It may refer to some non-quantifiable attributes the data has. A preferred embodiment of how DR training algorithm 30 of the invention can learn symbolic data will now be provided.

For an attribute such as gender, where the attribute has two possible values hence a single binary input can be assigned to encode the data, for example, female is 1 and male is 0. Other symbolic attributes may also be given binary values. A slightly more complex example of a symbolic attribute of colour may have three values: green, blue and yellow. It is possible to assign two bits to encode the values of this attribute. For instance two bits can be assigned to encode this field and binary values can be assigned arbitrarily, 01—green, 10—blue and 11—yellow. It should be understood that this is only one of many possible encoding techniques, as there are many other possible combinations that could have been used instead, such as 01—blue, 00—green and 10—yellow, etc. Other encoding strategies may be used instead such as three bits instead of two. Or the number of bits may differ according to how many values in this case colours, are being tested for in the attribute.

The main considerations when choosing a data encoding strategy depends on the data being classified and the classification required from the data.

For example, if one of the data attributes a NN is to learn is credit history and its values are poor, average, good and excellent, and the trained NN is to separate clients who are good credit risks from those who are not. It can be assumed that there is a correlation between clients with a good credit history and their potential ability to repay loans again.

Since there are four symbolic values that can be assigned to the attribute it is only necessary to have two bits to encode all four values. Care must be chosen in assigning the values as to what output is required of the data. For instance, if poor is encoded as 01, average is 10, good is 11, and excellent is 00, then if 'good' and 'excellent' are to be separated from the other values of 'poor' and 'average', then the data forms XOR in the input space and is hence not linearly separable. Although DR training algorithm 30 of the invention can learn this, because it is equivalent to XOR, additional LTGs are required to learn the data. This can be called encoding a 'symbolic conflict'. A symbolic conflict can be avoided by encoding differently such that the values are linearly separable in the input space. For instance, encoding 'good' as 11 and 'excellent' as 10, and 'poor' as 00 and 'average' as 01 avoids this problem. This way 'good'/'excellent' are linearly separable from 'poor'/'average'. The best method of encoding data depends on the data being encoded and as a result each attribute must be considered individually.

However, this is simplification, as it is assumed that there are additional attributes relationships other than credit history that also impact on predicting whether any client is a good credit risk.

While there may be no obvious connection between the output and the attribute values, it may not be always possible to avoid symbolic conflict. The DR training algorithm 30 of the invention is able to learn symbolic conflicts because it is able to add LTGs as required into the NN.

Now that methods of preparing non-binary data have been considered to be learnt by the DR training algorithm 30 of the invention, the experimental procedure will now be examined.

Experimental Procedure:

The same experiment was conducted for each of the domains described above. NNs were trained with data sets and the number of exposures to the data set was recorded. The performance of the NN was evaluated in terms of how well the NN was able to generalise unseen data after training and the results were compared to results of NNs trained with the same data that has been published.

Once training was completed the NN was tested to ensure that the NN can reproduce the correct output for the training set and can classify some part of a test set.

The data set tested on the respective NNs were outline above. The data sets were converted to binary using the same or similar preferred methods to those defined above.

Experimental Results

The results of the tests for the two data sets will now be examined. There am two sets of results that are of interest, those from the training and test phase. In the training phase it is of interest how many training passes were required to learn the data set. In the test phase it is of interest how many unseen input vectors were successfully classified.

The Two-Spiral Problem

Published Results of Known Algorithms:

Weiland trained a NN with a modified version of backpropagation in 150,000-200,000 epochs. But a solution was never found with standard backpropagation. However Lang and Witbrock trained a NN with 2-5-5-5-1 architecture, 2 input, 3 hidden layers of 5 hidden units each and 1 output unit, which learnt the data set in 20,000 epochs using standard backpropagation. Their NN however had each hidden layer unit receiving input directly from every unit in all the previous layers using 'shortcut' connections.

Figure 17:
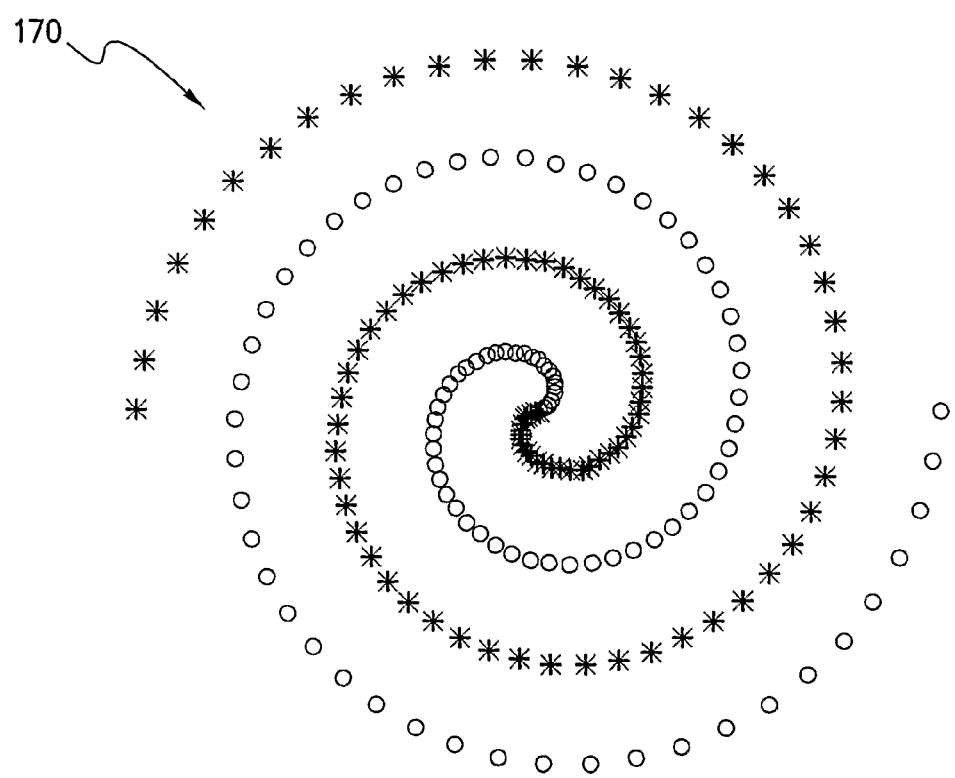
FIG. 17 shows a diagram of the data set for the Two-Spiral Problem which is a recognised data set used to test the training of a NN.

Experimental Results of the DR Training Algorithm of the Invention:

The data set 170 that the NN was trained with is shown in FIG. 17. Each spiral has 97 data points. The resultant trained NN has 24 inputs, 5 hidden LTGs and 1 output LTG. The LTGs were connected together using AND in all cases. The NN learnt in a single epoch.

Figure 18:
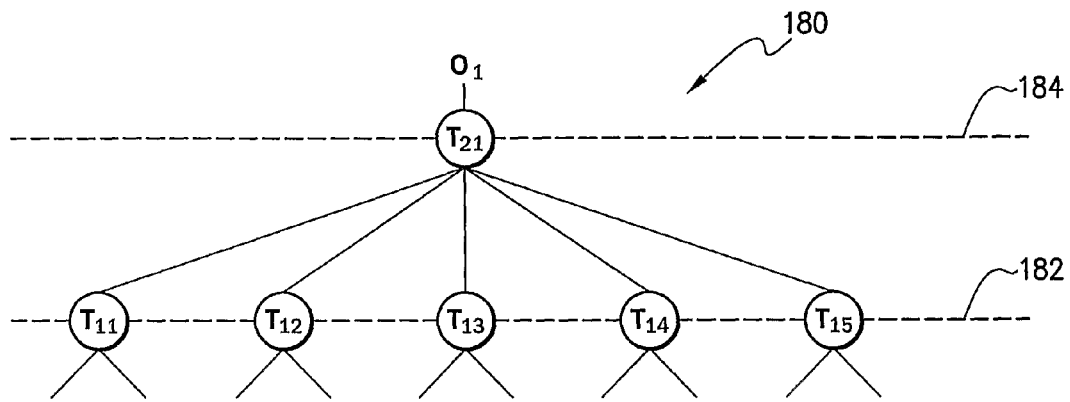
FIG. 18 schematically shows a NN that solves the test data set Two-Spiral Problem of FIG. 17, the NN being produced in accordance with a preferred embodiment of the NN training method of the present invention.

Discussion:

A schematic of the NN 180 produced is shown in FIG. 18. NN 180 trained in a single pass with the DR training algorithm 30 of the invention and the default for unknown input vectors was to output 1. The resultant NN 180 of the DR learning has a standard simple architecture over the one needed for backpropagation. The LTGs ($LTG_{11}$, $LTG_{12}$, $LTG_{13}$, $LTG_{14}$, and $LTG_{15}$) in the hidden layer 182 were connected together with an AND in all cases by the LTG $T_{21}$ in the output layer 184, as can be seen in FIG. 18. The data set 170 (FIG. 17) that NN 180 was trained with has two spirals of 3 periods each. Each spiral has 97 data points. NN 180 was able to recall 100% of the training vectors correctly.

NN 180 was tested with 80 input vectors for each spiral and no data point was from the training set. For those input vectors from the spiral that were to output 1, 21/80 input vectors were incorrectly classified. This gives an error rate of 26%.

Of the 80 input vectors from the spiral that were trained to output 0, 35/80 input vectors were incorrectly classified. This gives an error rate of 43%. The reason this result was so high is because the default output was 1 for LTGs where the input vector's output was unknown.

The average error rate of for both spirals is 34.5%. It was difficult to find comparable error rates for the two spiral problem, since NN 180 was deemed trained when it would be able to predict the correction output for the training set at 98%. It was also difficult to find the error rate for the Cascade-Correlation Architecture ("CAS") as it may be that the 1 was >0.5, and 0 was <0.5. Teng et al. deems the neuron to be active when it is >0.8 otherwise it is not activated. What is of greater interest to Fu et al, Teng et al. and Fahlman et al. was the number of units in the hidden layers and the number of epochs required or time to train the NN. In all cases DR training algorithm 30 of the invention required the least number of hidden units to learn the data set with 100% accuracy and only required 1 epoch. The DR training algorithm 30 required 5 hidden neurons, CAS required on average 12 hidden neurons and 1700 epochs; 2082±478 epochs 21.1±2.3 sub-NNs, which are 1 or more neurons; and 10 hidden units and learnt in a minimum of 1073.45 CPU s. The time it took the DR training algorithm 30 of the invention to learn the last input vector, and hence the longest it took to learn any other input vector for the Two-Spiral Problem was 15 minutes and 54 seconds. This was due to the use of the constraint satisfaction libraries, and that all that there were 5 LTGs in hidden layer 182 learning the last input vector. The average time to test an input vector was approximately 30 minutes. The time to learn the data set is significantly shorter than with backpropagation because NNs trained with backpropagation require a fixed-sized NN.

The error rate was smaller for the interior of the data set. Error rates were 23% and 33% within the first 1.5 periods for each spiral respectively. The increase in error is attributed to the higher density of training data points in the interior of the data set.

Figure 19:
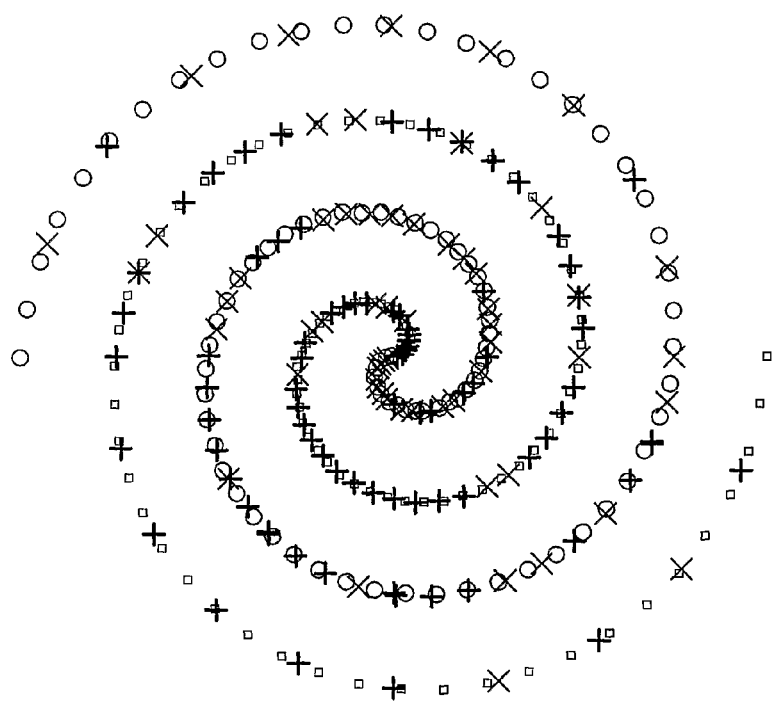
FIG. 19 shows a diagram of the results of the NN of FIG. 18, trained with the Two-Spiral Problem test data set of FIG. 17.

However, it had better success at predicting the spiral with r=θ. In FIG. 19 the results of the test data set are shown.

The '+' on the curve of '□' are input vectors that were correctly identified, and the 'x' on the curve of 'o' indicate input vectors that were also correctly identified. Otherwise they are incorrectly identified. Here it can be seen which parts of the input space that require giving additional training to improve NN's 180 ability to generalise. It is noted that this is traditionally a very difficult data set to train feed-forward NNs with.

For all input vectors there was incomplete learning for one or more LTGs in hidden layer 182 for NN 180, except for the last input vector. Most often there was incomplete learning in $LTG_{15}$.

NN 180 that was produced is less complex than the NN produced when using backpropagation. Further it is a difficult data set. It is believed that the results could be improved by training with an increased number of input vectors.

The DR training algorithm 30 of the invention can therefore perform as well as other approaches of training feed-forward NN regarding its ability to generalise. The DR training algorithm 30 is a different training method of training a similar structure.

The MAV for each of the LTGs in NN 180 will now be examined to determine what each of the LTGs learnt.

Figure 15:
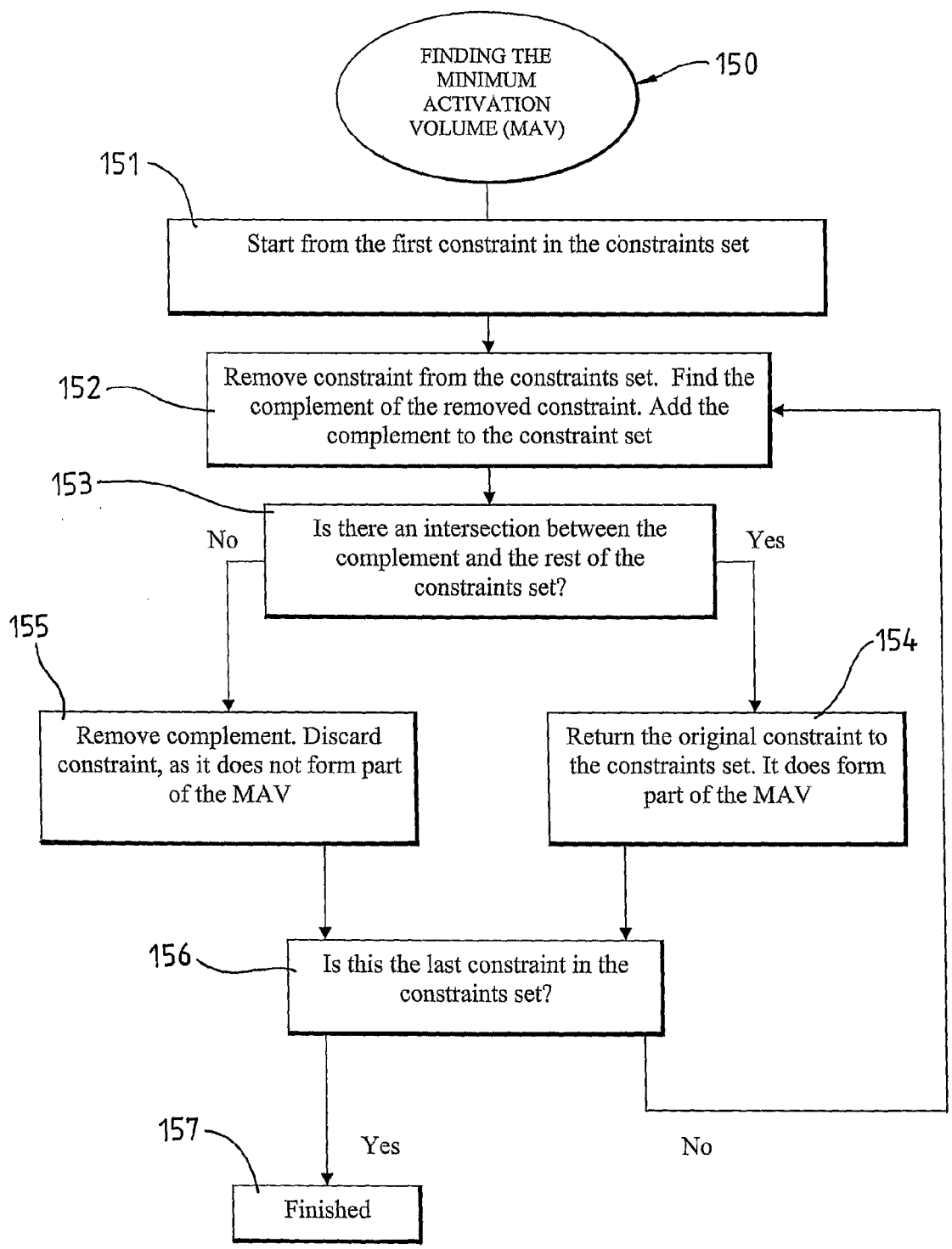
FIG. 15 is a flow diagram illustrating a method for determining the minimum activation volume (MAV) of a constraints set, made in accordance with a preferred embodiment of the present invention.

Determining the MAV for the LTGs in the Two-Spiral Problem:

For $LTG_{11}$, (with threshold $T_{11}$) finding the MAV using method 150 of FIG. 15 reduced the number of constraints to 29 from 194. This is a reduction, or compression, of 85.1%. All the other input vectors learnt by this LTG can be recovered from these points left that form the MAV for the LTG, as was discussed earlier. The weight-space has 24 dimensions.

Of the constraints, 13 input vectors formed $x_i \cdot w_{11} \geq T_{11}$ and the other 16 constraints formed $x_i \cdot w_{11} < T_{11}$.

What the LTGs have learnt can be graphed by examining the planes that form the surface of the region in the weight-space that causes the LTG to activate. These planes are represented as $x_i \cdot w_{1i}$. The weight-space is a transformation of the input space. To be able to determine what the LTG has learnt, the constraints in the MAV are converted back to the input vectors they were formed from. Then the process of how the original input vector was formed can be reversed from decimal to binary. A discussion of how this is undertaken was provided earlier where it was discussed how to prepare floating-point numbers. It will now be illustrated what each LTG in hidden layer 182 has learnt using the method of the invention.

Figure 20A:
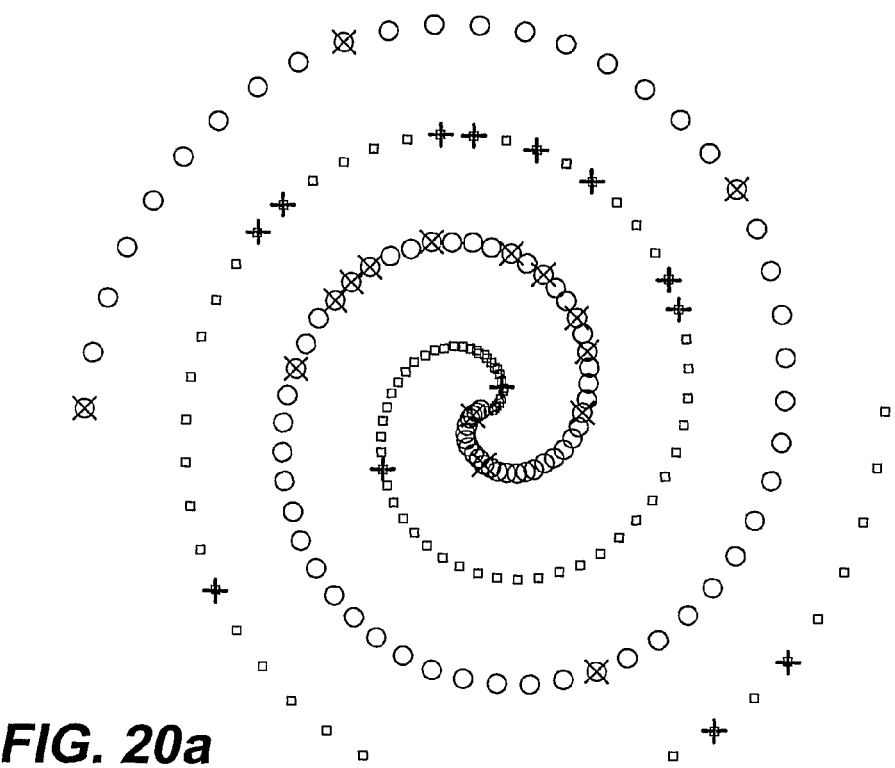
FIGS. 20a to 20e show diagrams of what each neuron in the hidden layer of the NN in FIG. 18 have learnt using the NN training method of the present invention when trained with the Two-Spiral Problem test data set of FIG. 17.

In FIG. 20a it can be seen what the first LTG, $LTG_{11}$, in hidden layer 182, has learnt. The 'o' and '□' indicate the original input vectors. The '□' represents the r=θ spiral, and the 'o' represents the r=–θ. The '+' indicates the input vectors left after finding the MAV for $LTG_{11}$ and represent the input vectors salient to classifying this data set. The 'x' indicates constraints that were learnt using $x_i \cdot w_{11} < T_{11}$. The '+' indicates constraints that were learnt using $x_i \cdot w_{11} \geq T_{11}$. This convention is followed for the succeeding LTGs. This is what this $LTG_{11}$ has learnt precisely. Also it is worth noting that the data set is learnt by encoding the data as surfaces of the volume defined in the weight-space and not the input-space.

Traditionally the input-space is analysed to linearly separate the classes being learnt. It is impossible to look at the weight-space because it is a 24 dimension space. This is the same for the rest of the LTGs in hidden layer 182. However this LTG, $LTG_{11}$, was unable to learn the entire data set. What $LTG_{12}$ learnt will now be considered.

Figure 20B:
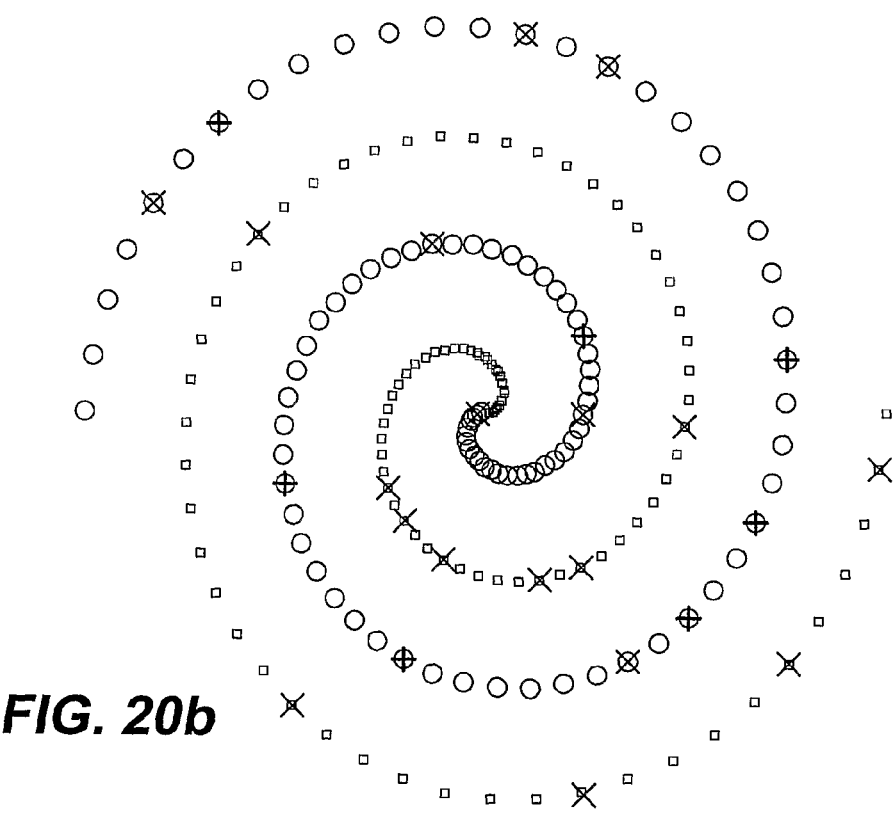

For $LTG_{12}$, finding the MAV reduced the number of constraints to 34 from 194. This is a reduction, or compression, of 82.5%. All constraints produced constraints that form $x_i \cdot w_{12} \geq T_{12}$ except 16 that form $x_1 \cdot w_{12} < T_{12}$. In FIG. 20b it can be seen what the second LTG, $LTG_{12}$, in hidden layer 182, has learnt.

Using the same conventions as in FIG. 20a, it can be seen that $LTG_{12}$ has learnt different input vectors. On the '□' spiral, r=θ, it can be seen that all the input vectors learnt are of that class, i.e. $x_i \cdot w_{12} \geq T_{12}$. However there are a number of input vectors on the 'o' spiral, r=−θ, that are also in this class. This is because this LTG, $LTG_{12}$, could not learn everything in this data set. Also the LTGs in hidden layer 182 outputs are connected together with AND by $LTG_{21}$, the output LTG. This means that if this LTG, $LTG_{12}$, produces the wrong result for those input vectors, a 1 instead of a 0, then just 1 other LTG in this layer can learn those input vectors and produce 0. What $LTG_{13}$ has learnt will now be considered.

Figure 20C:
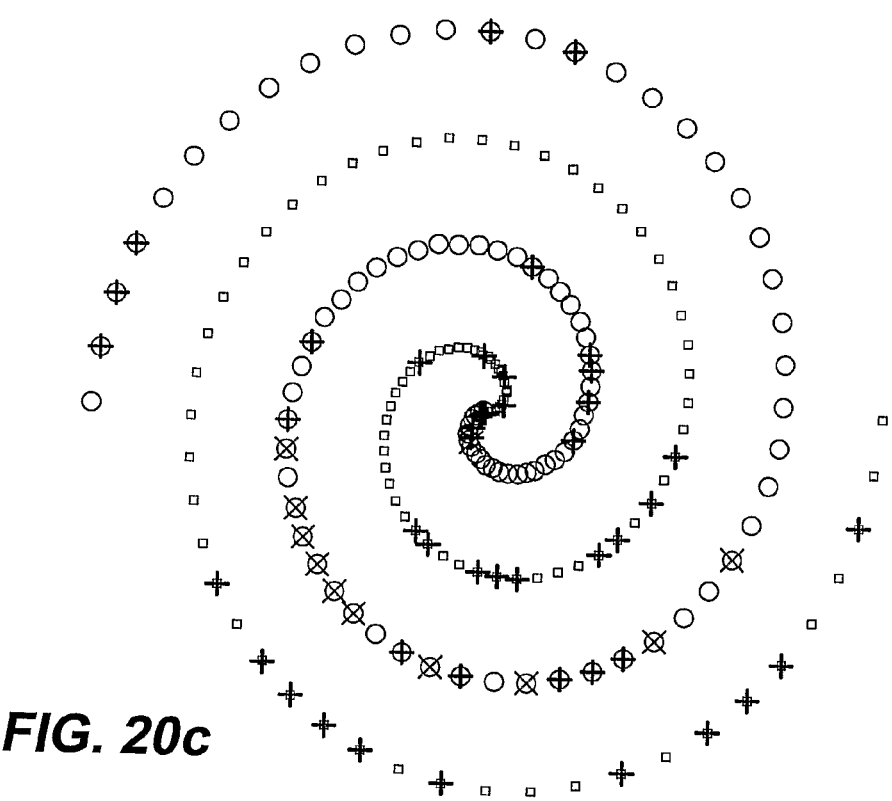

For $LTG_{13}$, finding the MAV reduced the number of constraints to 51 from 194. This is a reduction of 73.7% constraints. All constraints produced the form $x_i \cdot w_{13} \geq T_{13}$ except 10 that form $x_i \cdot w_{13} < T_{13}$. In FIG. 20c it can be seen what the third LTG, $LTG_{13}$, in hidden layer 182, has learnt.

Figure 20D:
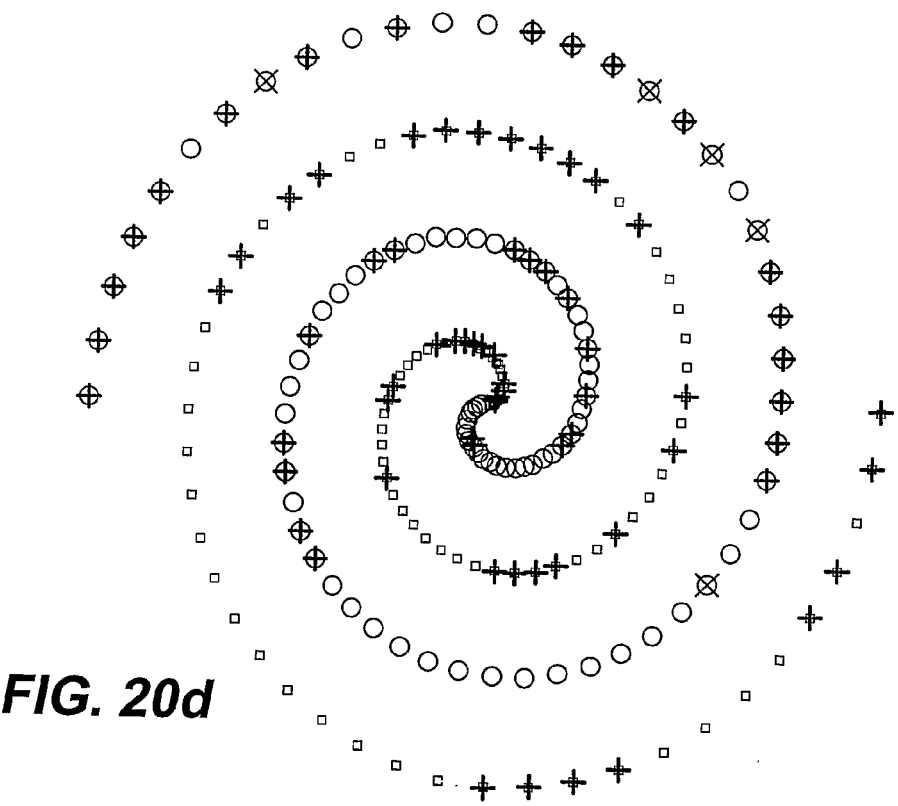

For $LTG_{14}$, finding the MAV reduced the number of constraints to 81 from 194. This is a reduction, or compression, of 58%. All constraints produced constraints that form $x_1 \cdot w_{14} \geq T_{14}$ except 6 constraints that form $x_i \cdot w_{14} < T_{14}$. In FIG. 20d it can be seen what the fourth LTG, $LTG_{14}$, in hidden layer 182, has learnt.

Figure 20E:
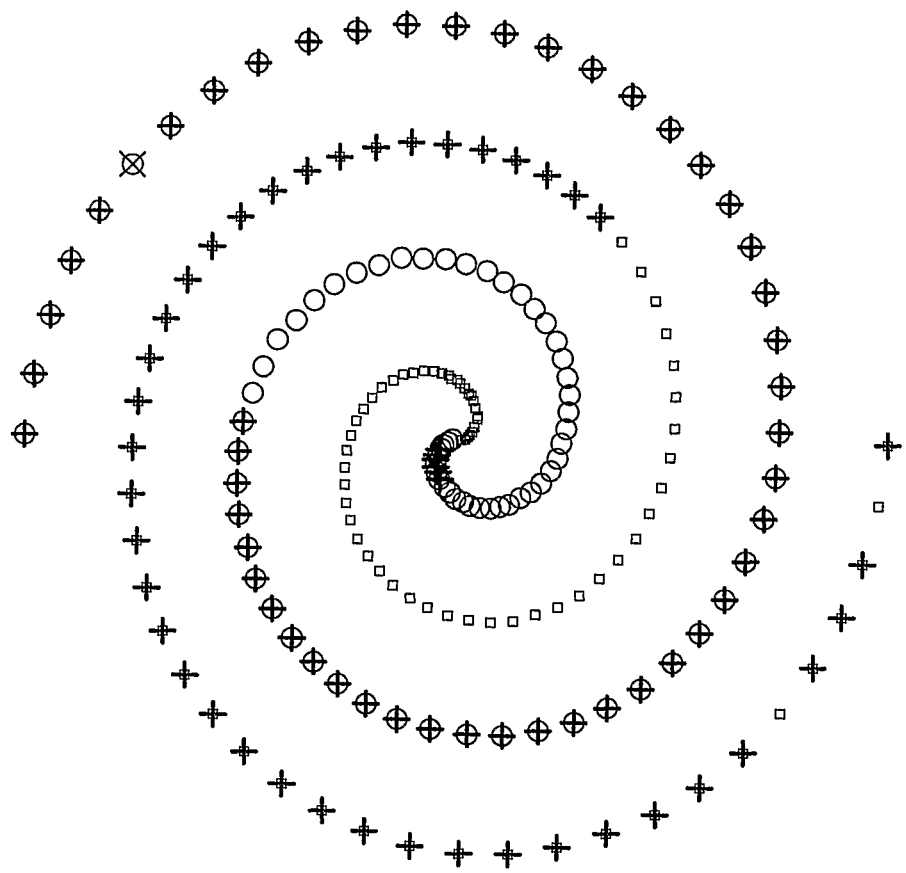

What $LTG_{15}$ has learnt will now be considered. For $LTG_{15}$, finding the MAV reduced the number of constraints to 159 from 194. This is a reduction, or compression, of 18%. All constraints learnt by the LTG produced the constraints that form $x_i \cdot w_{15} \geq T_{15}$, except for 1 input vector. In FIG. 20e it can be seen what the last of the LTGs, $LTG_{15}$, in hidden layer 182, has learnt.

The primary purpose of this LTG, $LTG_{15}$, is to learn the input vector that is indicated by the 'x'. It also has as many points in the r=θ spiral, indicated by the '□'.

For the LTGs in hidden layer 182 it can be seen that they have learnt different parts of the curves for the two spirals. It is important to remember that NN 180 was able to reproduce what it was taught with 100% accuracy.

The MAV was located also for $LTG_{21}$, or the output LTG for NN 180. As it formed AND between all its input connections, there were 32 constraints. This reduced to 6 constraints in the MAV. This is a reduction, or compression, of 81%.

Function minimisation cannot be applied to the input vectors found to define the MAV, this is because the data is dependent, in other words, the input vector defines a single value and thus function minimisation would render meaningless information.

The German Credit Problem

This data set has a cost matrix associated with it. The cost matrix is listed in Table 3. The columns give the predicted class and the rows give the true class. There is no cost if a client is predicted to be good and is good at repaying the loan, and similarly if a client is predicted to be a bad credit risk and is proven to be one. However, if someone is predicted to be a bad credit risk when they are in fact good, this will cost the lending institution interest. But worse still is the case when a client is predicted to be a good credit risk when in fact the client is a bad credit risk. There are two classes of error that need to be taken into consideration when calculating the costs of the NN.

TABLE 3

Cost Matrix for the German Credit Problem Data Set

|  | Good | bad |
|---|---|---|
| Good | 0 | 1 |
| Bad | 5 | 0 |

Published Results of Known Algorithms:

The error rates for backpropagation are listed in Table 4. These figures do not include the cost matrix, since backpropagation does not distinguish between classes of error as required for the cost matrix.

TABLE 4

Error rates for backpropagation

|  | Training Error | Testing Error |
|---|---|---|
| Backpropagation | 0.446 | 0.772 |

The time required to train and test the NN using backpropagation with this data set is listed in Table 5.

TABLE 5

Training time for backpropagation

|  | Training Time (Sec.) | Testing Time (Sec.) |
|---|---|---|
| Backpropagation | 5950.0 | 3.0 |

Figure 21:
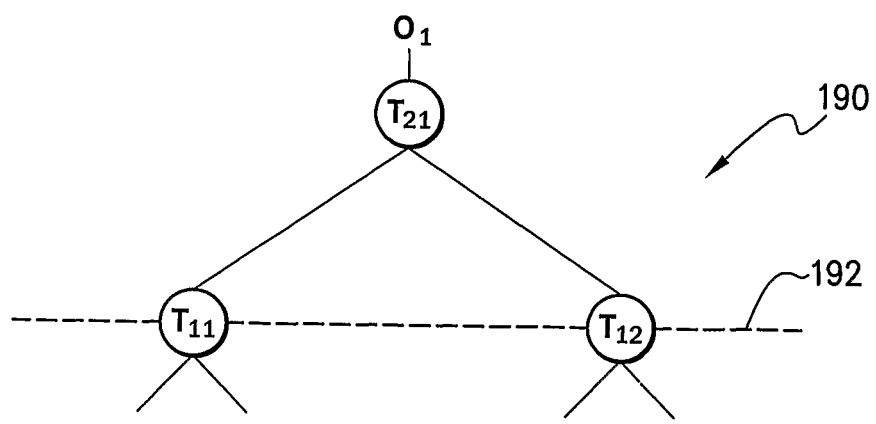
FIG. 21 schematically shows a NN that solves the German Credit Data Set Problem, the NN being produced in accordance with a preferred embodiment of the NN training method of the present invention.

Experimental Results of the DR Training Algorithm of the Invention:

Training with this data set produced a NN that had 1 output, and 2 hidden layer LTGs. The hidden layer LTGs were connected together via an OR connection. There are 1000 input vectors in the data set. A test set of 100 input vectors was randomly selected from the data set of 1000 vectors. A schematic diagram of the NN 190 produced after training is shown in FIG. 21.

Of the 100 input vectors set aside for testing purposes, there were 4 input vectors incorrectly identified of the 89 input vectors that produce 0 for an output. Hence 85 input vectors were correctly identified. There were 9 input vectors correctly identified of the 11 to input vectors that produce 1 for an output in the test set. Hence 2 input vectors were incorrectly identified. These results are summarised in Table 6.

TABLE 6

Summary of results for the German credit problem

|  | Incorrect | Correct | Total | Percentage |
|---|---|---|---|---|
| Output 1 | 2 | 9 | 11 | 18% |
| Output 0 | 4 | 85 | 89 | 4.4% |
| Total | 6 | 94 | 100 | 6% |

The error rate for input vectors that produce 1 was found to be slightly high at 18%. The error rate for input vectors that produce 0 is 4.4%. The total error is 6%. Additional training is believed to decrease the error rate for input vectors with both kinds of output. NN 190 was able to reproduce what it had learnt with 100% accuracy.

All error results were better than those for backpropagation, where there was training error of 0.446 and testing error of 0.772. The training and testing results were given in Table 4.

This experiment illustrates a significant advantages that the DR training algorithm 30 of the present invention offers over known training algorithms, such as backpropagation. The error can never reduce to 0 for backpropagation because the weights represent an average value that attempts to encode the rules inherent in the data set that they are trying to learn. The single weight value in each perceptron when using backpropagation cannot represent precisely the required weight values for each input vector that will allow it to learn to produce the exact output for each input vector. This is one of the benefits of finding the region in the weight-space as it allows the precise output for each input vector.

NN 190 was trained with a total of 268 input vectors, 168 of these input vectors produced 1 and the other 100 input vectors produce 0. These input vectors were chosen randomly from the remaining 900 input vectors, not used for testing. Mom input vectors could have been used for training.

NN 190 was trained with <⅓ of the data set available for training, and produced an error rate better than that for backpropagation.

The results of these experiments have shown that faster constraints testing methods are preferred if the DR training algorithm 30 of the invention is to be used for real data sets.

The results of the experiments also showed that the amount of time required to learn each input vector increased according to the number of input vectors already learnt. There are at least two ways this could be improved and these are: (1) To use parallel processors; or, (2) To use a more efficient constraints testing algorithm. State-of-the-art processors with a lot of memory are also believed to be able to improve the operation of the DR training algorithm 30.

Of the hundred input vectors reserved for testing, 11 input vectors produce output of 1, and the other 89 input vectors produce 0 as an output. There were proportionally few input vectors that produce 1 in the total data set. However since there is a bias towards outputting 0 when it was not known what the output should be, it was decided to train with a proportionally greater number of input vectors that output 1, so NN 190 would learn how to output 1 successfully. This bias of outputting 0 in preference to 1 was chosen because it is specified that there is a 5:1 preference for false negative to a false positive. This is based on the cost matrix which indicates that it prefers a classification error of false negative to false positive of 5:1. In other words, it would prefer to classify clients as bad credit risks, when in fact they are good credit risks, in preference to falsely identifying a client as a good credit risk when in fact they are bad.

Hence when applying the cost matrix in Table 3, the cost is 14. It is not possible to determine the cost with traditional NN training algorithms since only an average error is collected when testing the NNs.

Although the training time was longer than that for backpropagation as a result of the library functions testing the constraints, the DR training algorithm 30 of the invention required only 1 pass of the data set to learn the input vectors and only ⅓ of the available data set to train NN 190.

Determining the MAV for the LTGs in the German Credit Problem:

The MAV was located for the LTGs in NN 190 using the method 150 for determining the MAV of FIG. 15. It was found that finding the MAV for LTGs during training, for the last LTG in the layer or the current output LTG could mean that NN 190 would forget what it had learnt This is because constraints are modified when copied into newly added LTGs into a layer, as was described earlier where it was discussed how to implement the logic when adding LTGs into a NN.

Of the 268 constraints formed during training, 45 remained after finding the MAV for $LTG_{11}$. This is a reduction of 83% of the constraints defining the weight-space for the LTG. Of these constraints, 18 produced constraints of the form $x_i \cdot w_{11} \geq T_{11}$.

When the constraints formed during training were examined, what the LTG has learnt can be read in the form of $(x_i \cdot w_{11} \geq T_{11}$ OR $x_{i+1} \cdot w_{11} \geq T_{11}$ OR ... OR $x_{i+n} \cdot w_{11} \geq T_{11})$ AND NOT $(x_j \cdot w_{11} < T_{11})$ AND NOT $(x_{j+i} \cdot w_{11} < T_{11})$ AND NOT ....

Since it is in this form it lends itself to logical analysis and which variables are irrelevant to the classification of this data set can be derived.

The use of function minimisation techniques, such as Quine-McCluskey or iterated consensus, to find the variables which are of specific interest, given the input are independent as is generally the case here. Since all redundant input vectors can be removed by finding the MAV, it makes the task of using function minimisation techniques much easier and helps overcome their potential exponential complexity.

However, it is more interesting to know what those constraints represent, since some variables in the original data set were converted to multiple bit positions.

It was the input vector [100011101010100000100011001101010001010001]→1 that caused the second LTG, $LTG_{12}$, to be added to hidden layer 192 and a new output LTG. Breaking the vector into fields [10 00 111 0101 01 000 001 00 011 00 11 01 01 00 01 0 10 0 0 1]. This vector translates to: 'The client has no checking account, loan is to be <12 months, all existing credits paid back on time, wants a loan for furniture/equipment, wants to borrow between 1000 and 5000 DM, client has been employed for <1 year, percentage of disposable income <1%, female married/divorced, no guarantor, been living at the same address 4 or more years, the client has some savings or life insurance, she is between the ages of 25 and 40, no installment plans, she owns her house, no other credits at this bank, she is a skilled worker, she is not liable to provide maintenance for anyone, no phone in her name, and she is a foreign worker'.

Of the 268 constraints formed during training, 139 remained after finding the MAV for $LTG_{12}$. This is a reduction of 48% of the constraints defining the weight-space for the LTG. Of these constraints, 14 produced constraints such that $x_i \cdot w_{11} \geq T_{12}$.

The output LTG, $LTG_{21}$, formed an OR between its input connections. As a result it formed 4 constraints. The number of constraints was reduced to 3 after determining the MAV. This is a reduction of 25% on the number of constraints.

For a data set such as this, with 42 dimensions, it is highly desirable to automate this process. Even after finding the MAV for each LTG in hidden layer 192, there are still 45 and 139 constraints or rules to examine and without automating this process it can be difficult. However, a rough rule based on what the LTGs have learnt to determine clients who are good credit risks can be said to be something like: 'Does not rent or owns their own home or has property/savings or (critical debts and a guarantor)'

However, given that NN 190 did not classify two of the input vectors from the test set correctly, there is at least one additional feature in the data set that NN 190 has not learnt yet.

Summary of Experimental Results for Both Data Sets

Based on the criterion of comparison, the accuracy of the rules learnt in both cases is extremely high, given that in both cases the NNs 180,190 were able to reproduce the training set with 100% accuracy. This is contrasted with the average weight value that backpropagation ascertains during training. Necessarily there will be some error in the output when the NN is tested on the data it was trained with when using backpropagation. The speed with which an input vector is classified is based on the time required for the constraints handling routines to execute. The time to learn a data set is relatively slow given that the algorithm relies on constraints handling libraries also. However it is believed that appropriate code and/or hardware used to perform the algorithm 30 would learn an input vector in less than 1 sec. Also the data set can be learnt in a single pass of the data set. This is contrasted with backpropagation where it is not known whether the NN will ever learn the data set.

Further, it was seen that the rules learnt during training were highly comprehensible. Whereas the rules encoded in NNs trained with numerical algorithms, such as backpropagation, are nearly completely incomprehensible.

The present invention therefore provides many benefits associated with the use of feed-forward NNs. The major contributions can be summarised as follows: (a) A novel method of training neurons, preferably LTGs; (b) An algorithm 30 that trains feed-forward NNs based on the novel method of training LTGs, that: (i) Dynamically allocates LTGs as required to learn the data set; (ii) Learns in a signal pass; and (iii) Allows a simple method 150 to determine the rules learnt during training to be easily read from the resultant NN; and, (c) Allows a simple method 130 of analysing what the LTG has learnt.

The novel method of training LTGs finds relationships between the weights and the threshold of each LTG. This allows LTGs to learn and recall input precisely. In other words, the input can be reproduced exactly, instead of an approximate value that traditional methods of training neurons hope to produce.

The method of training LTGs in accordance with the invention finds volumes in the weight-space of each LTG that causes the LTG to active and encodes relationships between the inputs into the LTG into the surface of the volume.

The method allows LTGs to be interrogated to determine whether they have learnt or can learn an input vector, and hence whether it knows how to classify an input vector. This test provides an easy method to determine when it is required to allocate an LTG into the NN.

The method allows LTGs to perform all the functions that neurons trained with traditional methods perform, such as recalling previously learnt input and generalisation.

The primary application of the novel training method of training neurons, preferably LTGs, in accordance with the invention is the development of a DR learning algorithm 30 that allocates neurons as required to a NN to learn a data set. This is a significant contribution to the field of NNs.

This method of training feed-forward NNs solves the problem of fixed-sized NNs, which may have too many or too few neurons in the NN.

One of the most important features of the DR training algorithm 30 of the invention is its ability to learn a data set in a single pass. This is a major contribution to the field of NNs as it eliminates the problem of potentially exponential training time. Whilst the training time is dependent on the speed of the constraints handling software required to interrogate the LTG to determine whether an input has been or can be learnt, it does mean that the NN will learn in a deterministic amount of time.

A useful method for converting data into an appropriate format prior to training is also provided which can be utilised to improve the training time of a NN. Similarly, a useful method for pre-sorting data to be trained by a NN is also provided which can be utilised to improve data classification efficiency. These methods are considered useful to all NN training algorithms.

Another major benefit of the invention is its ability to provide an insight into the behaviour of feed-forward NNs, especially the rules that have been learnt during the course of training. As the training method is relational, it means that it is finding relationships between the input, and those relationships are stored as the surface of the region in the weight-space of the volume that causes the LTG to activate. A useful method 150 is provided that allows these relationships to be recovered by finding the MAV which can then be used to do a traditional sensitivity analysis. The logical relationships used to connect LTGs into layers can also be read directly from the NN.

Traditional training methods for feed-forward NNs compress rules learnt during training into a single numeric value where much information about the data set is lost. It is not possible from traditional training methods to determine how accurately the numeric value represents the best possible average that the numeric value is trying to represent.

The DR training algorithm 30 of the invention preferably converts all the input vectors into constraints and stores the relationships contained within the constraints as surfaces of the volume in the weight-space that activates the LTG. This allows all input to be recalled and provides a method of being able to reduce the constraints set to a minimum number of constraints by using the method 150 of determining the MAV according to a further aspect of the invention. By finding an LTG's MAV, no information is lost when constraints are removed from the LTGs constraints set.

The method 150 of finding the MAV is not limited to NNs. It is considered that the method of finding the MAV is also useful for other fields which use systems of constraints, such as CSPs which are used for optimisation and operational research type problems.

The experiments performed have shown that it is not necessarily the case that more input vectors are needed to train a NN than there are weights in the NN to be trained. This is because each input vector is training each weight in the NN. DR learning provides a simple test to easily identify which input vectors cause LTGs to be added to the NN. It is not always necessary to train with the full data set.

A potential cause for NNs to fail to generalise was discussed earlier, where it was stated that a NN was insufficiently trained and as a result, does not know the output of an unseen input vector. Conversely, in accordance with a further aspect of the present invention, a method 130 is provided which can be used to determine whether a NN knows what the output for unseen input vectors is and can clearly identify which input vectors are unknown. Thus a NN can identify which input vectors it requires additional training on.

The method 130 of determining whether input vectors are known or unknown is not limited to NNs. It is considered that the method of classifying input vectors is also useful for other fields which use systems of constraints, such as the analysis of strings of data, as for example DNA. Similarly, the method of classifying input vectors could also be used for CSPs and operational research applications.

The invention will be understood to embrace many further modifications, as will be readily apparent to persons skilled in the art and which will be deemed to reside within the broad scope and ambit of the invention, there having been set forth herein only the broad nature of the invention and certain specific embodiments by way of example.

The invention claimed is:

1. An artificial neural network, implemented on one or more computers, comprising a plurality of neurons arranged in layers, the artificial neural network being arranged to receive a new neuron into a layer of the artificial neural network during training, the new neuron being added to the neural network when no other neuron in that layer for a selected output can learn a relationship associated with an input vector of a data set being learnt, wherein:

the new neuron being updated with both the relationship which could not be learnt by any other neuron in that layer and a modified data set from a last trained neuron in that layer that contributes to the selected output of the neural network, wherein the modified data set is formed by copying all learnt relationships from the last trained neuron into the new neuron and modifying the copied relationship based upon the relationship which could not be learnt by any other neuron in that layer; and, one or more output neurons being updated to accept input from the new neuron.

2. The artificial neural network according to claim 1, wherein the artificial neural network is arranged to be trained by:

(i) initialising the neural network by selecting an output of the neural network to be trained and connecting an output neuron of the neural network to one or more input neuron(s) in an input layer of the neural network for the selected output;

(ii) preparing a data set to be learnt by the neural network; and (iii) applying the prepared data set to the neural network to be learnt by applying an input vector of the prepared data set to a first hidden layer of the neural network, or an output layer of the neural network if the neural network does not have at least one hidden layer, and determining whether at least one neuron for the selected output in each layer of the neural network can learn to produce the associated output for the input vector, wherein:

if at least one neuron for the selected output in each layer of the neural network can learn to produce the associated output for the input vector, and if there are more input vectors of the prepared data set to learn, repeat (iii) for the next input vector, else repeat (i) to (iii) for the next output of the neural network if there are more outputs to be trained;

if no neuron in a hidden layer for the selected output of the neural network can learn to produce the associated output for the input vector, the new neuron is added to that layer, and that new neuron is updated with a modified data set formed by copying input-output associations learnt by a last trained neuron and modifying the input-output associations based upon the last association that could not be learned, to learn the associated output which could not be learnt by any other neurons in that layer for the selected output, and if there are more input vectors of the data set to learn, repeat (iii) for the next input vector, else repeat (i) to (iii) for the next output of the neural network if there are more outputs to be trained;

if the output neuron for the selected output of the neural network cannot learn to produce the associated output for the input vector, that output neuron becomes a neuron of a hidden layer of the neural network, the new neuron is added to this hidden layer, and that new neuron is updated with a modified data set formed by copying input-output associations learnt by the output neuron and modifying the input-output associations based upon the last association that could not be learned, to learn the associated output which could not be learnt by the output neuron, and a new output neuron is added to the neural network for the selected output, and if there are more input vectors of the data set to learn, repeat (iii) for the next input vector, else repeat (i) to (iii) for the next output of the neural network if there are more outputs to be trained.

3. The artificial neural network as claimed in claim 2, wherein (ii) preparing the data set is performed before (i) initializing the neural network.

4. The artificial neural network as claimed in claim 2, wherein the neurons of the neural network are Linear Threshold Gates (LTGs).

5. The artificial neural network as claimed in claim 4, wherein in said (iii), to determine whether an LTG can learn to produce the associated output for the input vector comprises determining whether the input-output associations of the LTG representing a relationship between weights and a threshold of the LTG has a solution given what the LTG has previously learnt.

6. The The artificial neural network as claimed in claim 5, wherein said relationship is a constraint, and wherein the input vector and the LTG's weight vector form a relationship with the LTG's threshold based on the selected output of the neural network.

7. The artificial neural network as claimed in claim 6, wherein to learn a constraint is to be able to add the constraint to a constraint set of an LTG.

8. The artificial neural network as claimed in claim 7, wherein to be able to add the constraint to a constraint set of an LTG there must be a solution between all the constraints.

9. The artificial neural network as claimed in claim 7, wherein initialising the neural network further includes clearing the constraints set of the output LTG so that the constraints set of the output LTG is empty.

10. The artificial neural network as claimed in claim 2, wherein preparing the data set to be learnt comprises: converting the data set into a predefined data format before the data set is presented to the neural network for training; determining whether there are any inconsistencies in the data set before the data set is presented to the neural network for training; sorting the data set before the data set is presented to the neural network for training; and, determining whether there is an input vector having a value of zero for all inputs available in the data set before the data set is presented to the neural network for training, and if there is an input vector having a value of zero for all inputs available in the data set, the data set is ordered so that the input vector having a value of zero for all inputs is presented to the neural network to be trained first.

11. The artificial neural network as claimed in claim 10, wherein said predefined data format is binary or floating-point data format.

12. The artificial neural network as claimed in claim 10, wherein determining whether there are any inconsistencies in the data set before the data set is presented to the neural network includes: determining whether there are two or more identical input vectors which produce different output.

13. The artificial neural network as claimed in claim 12, wherein if it is determined that two or more identical input vectors produce a different output, only one of the input vectors is used.

14. The artificial neural network as claimed in claim 10, wherein sorting the data set before the data set is presented to the neural network for training includes: sorting the input vectors of the data set into at least two sets, separating the input vectors that output one from the input vectors that produce zero for that output, and selecting one of the at least two sets to be trained first; and sorting the data set.

15. The artificial neural network as claimed in claim 14, wherein a single sorted data set for the input layer currently being trained is created from the at least two separated data sets before the data is presented to the neural network for training.

16. The artificial neural network as claimed in claim 6, wherein if a new LTG is added to a hidden layer to learn a constraint that could not be learnt by any other LTG in the hidden layer in accordance with (iii): the new LTG is connected to all LTGs in a next layer which contribute to the selected output of the neural network, and a constraints set of the LTGs in the next layer which receive input from the new LTG are updated to accept input from the new LTG; if the hidden layer with the new LTG is not the first hidden layer of the neural network, the new LTG is connected to and receives input from all LTGs in a preceding hidden layer which contribute to the selected output of the neural network; and, a constraints set of the new LTG is updated to include a copy of the constraint which could not be learnt by any other LTG in that hidden layer and a modified data set, expressed for the new LTG as a modified constraints set formed from the constraints set of the last trained LTG in that hidden layer by modifying the relationships between constraints as follows, wherein T is neuron threshold:

if $x_i \cdot w > T$ could not be learnt, modify all constraints as $x_i \cdot w < T$ from the last trained LTGs constraints set, else if $x_i \cdot w < T$ could not be learnt, modify all constraints as $x_i \cdot w > T$ from the last trained LTGs constraints set.

17. The artificial neural network as claimed in claim 6, wherein if a new output LTG is added to the neural network in accordance with (iii): the new output LTG is connected to and receives input from the LTGs in the hidden layer; if the hidden layer is not the first hidden layer of the neural network, the new LTG in the hidden layer is connected to and receives input from all LTGs in a preceding hidden layer which contribute to the selected output of the neural network; the constraints set of the new LTG added to the hidden layer is updated to include a copy of the constraint which could not be learnt by the previous output LTG and a modified data set, expressed for the new LTG as a modified constraints set formed from the constraints set of the previous output LTG in that hidden layer by modifying the relationships between constraints as follows, wherein T is neuron threshold:

if $x_i \cdot w > T$ could not be learnt, modify all constraints as $x_i \cdot w < T$ from the previous output LTGs constraints set, else if $x_i \cdot w < T$ could not be learnt, modify all constraints as $x_i \cdot w > T$ from the previous output LTGs constraints set; and, the new output LTG combines its inputs in a predefined logical relationship according to what could not be learnt by the previous output LTG.

18. The artificial neural network as claimed in claim 17, wherein when a new output LTG is added to the neural network in accordance with (iii), the predefined logical relationship formed between the inputs into this new output LTG is logical OR, logical AND, or any other equivalent logical relationship.

19. The artificial neural network as claimed in claim 18, wherein logical OR is used for the neural output to be learned if the input vector that could not be learnt by the previous output LTG produces an output one, and logical AND is used for the neural output to be learned if the input vector that could not be learnt by the previous output LTG produces an output zero.

20. The artificial neural network of claim 14 wherein, the sorting the data set comprises sorting the data set with a Self Organising Map (SOM).

21. A method comprising,
one or more of receiving, transmitting, and applying, one or more associations learned by the artificial neural network of claim 1 or data based on one or more associations learned by the artificial neural network of claim 1.

22. A method comprising, one or more of receiving, transmitting, and applying, one or more associations learned by the artificial neural network of claim 4, or data based on one or more associations learned by the artificial neural network of claim 4.

23. A method comprising, one or more of receiving, transmitting, and applying, one or more associations learned by the artificial neural network of claim 14, or data based on one or more associations learned by the artificial neural network of claim 14.

24. A method for adding a new neuron into a layer of a neural network during training, the new neuron being added to the neural network when no other neuron in that layer for a selected output can learn a relationship associated with an input vector of a data set being learnt, said method including:

updating the new neuron with both the relationship which could not be learnt by any other neuron in that layer and a modified data set from a last trained neuron in that layer that contributes to the selected output of the neural network, wherein the modified data set is formed by copying all learnt relationships from the last trained neuron into the new neuron and modifying the copied relationships based upon the relationship which could not be learnt by any other neuron in that layer; and, updating one or more output neurons to accept input from the new neuron.

25. The method as claimed in claim 24, wherein the neurons of the neural network are LTGs.

26. The method as claimed in claim 25, wherein said relationship is a relationship between weights and a threshold of an LTG.

27. The method as claimed in claim 25, wherein said relationship is a constraint, and wherein the input vector of the data set and an LTG's weight vector form a relationship with the LTG's threshold based on the output of the neural network.

28. A method comprising, one or more of receiving, transmitting, and applying, one or more associations learned by the artificial neural network of claim 24 or data based on one or more associations learned by the artificial neural network of claim 24.

29. A method comprising, one or more of receiving, transmitting, and applying, one or more associations learned by the artificial neural network of claim 25 or data based on one or more associations learned by the method of claim 25.

30. A non-transitory computer readable medium containing computer program instructions, which when executed by one or more processors cause the one or more processors to perform:
- adding a new neuron into a layer of a neural network during training, the new neuron being added to the neural network when no other neuron in that layer for a selected output can learn a relationship associated with an input vector of a data set being learnt, said method including:
- updating the new neuron with both the relationship which could not be learnt by any other neuron in that layer and a modified data set from a last trained neuron in that layer that contributes to the selected output of the neural network, wherein the modified data set is formed by copying all learnt relationships from the last trained neuron into the new neuron and modifying the copied relationships based upon the relationship which could not be learnt by any other neuron in that layer; and,
- updating one or more output neurons to accept input from the new neuron.

* * * * *